United States Patent
Bray et al.

(10) Patent No.: US 12,478,279 B2
(45) Date of Patent: Nov. 25, 2025

(54) SYSTEMS AND METHODS FOR MEASURING TISSUE IMPEDANCE

(71) Applicant: Smith & Nephew PLC, Watford (GB)

(72) Inventors: David Michael Bray, Edinburgh (GB); Felix Clarence Quintanar, Hull (GB)

(73) Assignee: Smith & Nephew PLC, Watford (GB)

(*) Notice: Subject to any disclaimer, the term of this patent is extended or adjusted under 35 U.S.C. 154(b) by 1049 days.

(21) Appl. No.: 17/440,663

(22) PCT Filed: Mar. 10, 2020

(86) PCT No.: PCT/EP2020/056322
§ 371 (c)(1),
(2) Date: Sep. 17, 2021

(87) PCT Pub. No.: WO2020/187643
PCT Pub. Date: Sep. 24, 2020

(65) Prior Publication Data
US 2022/0151506 A1 May 19, 2022

(30) Foreign Application Priority Data

Mar. 19, 2019 (GB) .................................. 1903698
Nov. 6, 2019 (GB) .................................. 1916129

(51) Int. Cl.
*A61B 5/053* (2021.01)
*A61B 5/00* (2006.01)
(Continued)

(52) U.S. Cl.
CPC .............. *A61B 5/053* (2013.01); *A61B 5/445* (2013.01); *A61B 5/4836* (2013.01);
(Continued)

(58) Field of Classification Search
CPC ....... A61B 5/053; A61B 5/445; A61B 5/4836; A61B 5/6833; A61B 2562/046;
(Continued)

(56) References Cited

U.S. PATENT DOCUMENTS 3,896,802 A 7/1975 Williams
4,334,530 A 6/1982 Hassell
(Continued)

FOREIGN PATENT DOCUMENTS

CN 105232229 A 1/2016
CN 105395184 A 3/2016
(Continued)

OTHER PUBLICATIONS

Pinkle, C. (Nov. 16, 2016). The Why and How of Differential Signaling. All About Circuits. https://www.allaboutcircuits.com/technical-articles/the-why-and-how-of-differential-signaling/ (hereinafter—Pinkle) (Year: 2016).*
(Continued)

*Primary Examiner* — Justin Xu
(74) *Attorney, Agent, or Firm* — Knobbe, Martens, Olson & Bear, LLP

(57) ABSTRACT

A system can include excitation pads that can apply an excitation signal to tissue of a patient. The excitation pads can be connected to an electronic circuit that communicates the excitation signal to the excitation pads. The system can include a measurement sensor that can measure voltage of the tissue. The system can include a controller that can determine impedance of the tissue. The controller can be in communication with the excitation pads, the electronic circuit, and the measurement sensor. The controller can generate the excitation signal. The controller can obtain a current measurement of the excitation signal after it has been communicated through at least a portion of the electronic
(Continued)

circuit. The current measurement can correspond to the excitation signal before it is applied to the tissue. The controller can determine impedance of the tissue based on the voltage measurement and the current measurement of the excitation signal.

21 Claims, 26 Drawing Sheets

(51) Int. Cl.
*A61F 13/05* (2024.01)
*A61M 1/00* (2006.01)

(52) U.S. Cl.
CPC ............ *A61B 5/6833* (2013.01); *A61F 13/05* (2024.01); *A61M 1/73* (2021.05); *A61M 1/913* (2021.05); *A61M 1/915* (2021.05); *A61M 1/916* (2021.05); *A61M 1/985* (2021.05); *A61B 2562/046* (2013.01); *A61M 1/96* (2021.05)

(58) Field of Classification Search
CPC ......... A61F 13/05; A61M 1/73; A61M 1/913; A61M 1/915; A61M 1/916; A61M 1/985; A61M 1/96; A61M 2205/3313; A61M 2205/3317; A61M 2205/3324; A61M 2205/35; A61M 2230/205; A61M 2230/208; A61M 2230/65
See application file for complete search history.

(56) References Cited

U.S. PATENT DOCUMENTS

| | | |
|---|---|---|
| 5,090,410 A | 2/1992 | Saper et al. |
| 5,253,654 A | 10/1993 | Thomas et al. |
| 5,635,201 A | 6/1997 | Fabo |
| 5,642,096 A | 6/1997 | Leyerer et al. |
| 5,678,448 A | 10/1997 | Fullen et al. |
| 5,690,610 A | 11/1997 | Ito et al. |
| 5,836,990 A | 11/1998 | Li |
| 6,095,992 A | 8/2000 | Augustine |
| 6,178,342 B1 | 1/2001 | Borgos et al. |
| 6,370,425 B1 | 4/2002 | Oguma |
| 6,381,482 B1 | 4/2002 | Jayaraman et al. |
| 6,517,484 B1 | 2/2003 | Wilk et al. |
| 6,551,252 B2 | 4/2003 | Sackner et al. |
| 6,731,987 B1 | 5/2004 | McAdams et al. |
| 7,077,832 B2 | 7/2006 | Fleischmann |
| 7,088,591 B2 | 8/2006 | Kishimoto et al. |
| 7,201,063 B2 | 4/2007 | Taylor |
| 7,206,623 B2 | 4/2007 | Blank et al. |
| 7,289,205 B2 | 10/2007 | Yaroslavsky et al. |
| 7,316,652 B2 | 1/2008 | Dalgaard et al. |
| 7,429,255 B2 | 9/2008 | Thompson |
| 7,520,875 B2 | 4/2009 | Bernabei |
| 7,521,292 B2 | 4/2009 | Rogers et al. |
| 7,569,742 B2 | 8/2009 | Haggstrom et al. |
| 7,625,117 B2 | 12/2009 | Haslett et al. |
| 7,687,678 B2 | 3/2010 | Jacobs |
| 7,846,141 B2 | 12/2010 | Weston |
| 7,877,866 B1 | 2/2011 | Greenberg et al. |
| 7,884,258 B2 | 2/2011 | Boehringer et al. |
| 7,904,133 B2 | 3/2011 | Gehman et al. |
| 7,922,676 B2 | 4/2011 | Daskal et al. |
| 7,942,869 B2 | 5/2011 | Houbolt et al. |
| 7,945,302 B2 | 5/2011 | Mcadams |
| 8,019,401 B1 | 9/2011 | Smith et al. |
| 8,032,210 B2 | 10/2011 | Finneran et al. |
| 8,060,174 B2 | 11/2011 | Simpson et al. |
| 8,079,247 B2 | 12/2011 | Russell et al. |
| 8,111,165 B2 | 2/2012 | Ortega et al. |
| 8,116,841 B2 | 2/2012 | Bly et al. |
| 8,182,425 B2 | 5/2012 | Stamatas et al. |
| 8,238,996 B2 | 8/2012 | Burnes et al. |
| 8,241,231 B2 | 8/2012 | Bausewein et al. |
| 8,332,053 B1 | 12/2012 | Patterson et al. |
| 8,333,874 B2 | 12/2012 | Currie |
| 8,366,692 B2 | 2/2013 | Weston et al. |
| 8,480,641 B2 | 7/2013 | Jacobs |
| 8,525,340 B2 | 9/2013 | Eckhardt et al. |
| 8,579,872 B2 | 11/2013 | Coulthard et al. |
| 8,644,911 B1 | 2/2014 | Panasyuk et al. |
| 8,663,106 B2 | 3/2014 | Stivoric et al. |
| 8,682,442 B2 | 3/2014 | Mcadams |
| 8,783,948 B2 | 7/2014 | Panda et al. |
| 8,788,009 B2 | 7/2014 | Greene et al. |
| 8,800,386 B2 | 8/2014 | Taylor |
| 8,818,478 B2 | 8/2014 | Scheffler et al. |
| 8,848,187 B2 | 9/2014 | Uematsu et al. |
| 8,894,590 B2 | 11/2014 | Lamoise et al. |
| 8,925,392 B2 | 1/2015 | Esposito et al. |
| 8,934,957 B2 | 1/2015 | Dias et al. |
| 8,934,965 B2 | 1/2015 | Rogers et al. |
| 8,943,897 B2 | 2/2015 | Beauvais et al. |
| 8,948,839 B1 | 2/2015 | Longinotti-Buitoni et al. |
| 8,997,588 B2 | 4/2015 | Taylor |
| 9,000,251 B2 | 4/2015 | Murphy et al. |
| 9,042,075 B2 | 5/2015 | Borini et al. |
| 9,192,531 B2 | 11/2015 | Wu |
| 9,220,455 B2 | 12/2015 | Sarrafzadeh et al. |
| 9,226,402 B2 | 12/2015 | Hsu |
| 9,282,897 B2 | 3/2016 | Ross, Jr. et al. |
| 9,314,175 B2 | 4/2016 | Jacofsky et al. |
| 9,320,473 B2 | 4/2016 | Shuler |
| 9,372,123 B2 | 6/2016 | Li et al. |
| 9,378,450 B1 | 6/2016 | Mei et al. |
| 9,380,698 B1 | 6/2016 | Li et al. |
| 9,386,947 B2 | 7/2016 | Johnson |
| 9,393,354 B2 | 7/2016 | Freedman et al. |
| 9,402,988 B2 | 8/2016 | Buchanan et al. |
| 9,408,573 B2 | 8/2016 | Welch et al. |
| 9,427,179 B2 | 8/2016 | Mestrovic et al. |
| 9,439,599 B2 | 9/2016 | Thompson et al. |
| 9,483,726 B2 | 11/2016 | Mei et al. |
| 9,494,474 B2 | 11/2016 | Servati et al. |
| 9,511,215 B2 | 12/2016 | Skiba |
| 9,516,758 B2 | 12/2016 | Arora et al. |
| 9,526,439 B2 | 12/2016 | Connelly et al. |
| 9,554,484 B2 | 1/2017 | Rogers et al. |
| 9,572,507 B2 | 2/2017 | Moore et al. |
| 9,582,072 B2 | 2/2017 | Connor |
| 9,585,620 B2 | 3/2017 | Paquet et al. |
| 9,587,991 B2 | 3/2017 | Padiy |
| 9,592,007 B2 | 3/2017 | Nuovo et al. |
| 9,603,560 B2 | 3/2017 | Monty et al. |
| 9,610,388 B2 | 4/2017 | Aceto et al. |
| 9,613,911 B2 | 4/2017 | Rogers et al. |
| 9,629,584 B2 | 4/2017 | Macia et al. |
| 9,675,238 B2 | 6/2017 | Iida et al. |
| 9,687,195 B2 | 6/2017 | Sims et al. |
| 9,717,565 B2 | 8/2017 | Blair |
| 9,829,471 B2 | 11/2017 | Hammond et al. |
| 9,907,103 B2 | 2/2018 | Chen et al. |
| 9,999,711 B2 | 6/2018 | Weston et al. |
| 10,004,643 B2 | 6/2018 | Luckemeyer et al. |
| 10,046,096 B2 | 8/2018 | Askem et al. |
| 10,080,524 B1 | 9/2018 | Xi |
| 10,086,117 B2 | 10/2018 | Locke et al. |
| 10,117,705 B2 | 11/2018 | Chernov et al. |
| 10,152,789 B2 | 12/2018 | Carnes et al. |
| 10,166,387 B2 | 1/2019 | Bergelin et al. |
| 10,182,740 B2 | 1/2019 | Tonar et al. |
| 10,206,604 B2 | 2/2019 | Bergelin et al. |
| 10,207,031 B2 | 2/2019 | Toth |
| 10,209,213 B2 | 2/2019 | Kang et al. |
| 10,285,620 B2 | 5/2019 | Jung et al. |
| 10,321,862 B2 | 6/2019 | Dalene et al. |
| 10,463,773 B2 | 11/2019 | Haggstrom et al. |
| 10,687,984 B2 | 6/2020 | Rovaniemi |
| 10,702,153 B2 | 7/2020 | Shamim et al. |
| 10,716,490 B2 | 7/2020 | Connolly |
| 10,791,984 B2 | 10/2020 | Kantrowitz et al. |

(56) References Cited

U.S. PATENT DOCUMENTS

| | | |
|---|---|---|
| 10,857,038 B2 | 12/2020 | Zamierowski et al. |
| 11,013,910 B2 | 5/2021 | Lawson et al. |
| 11,026,847 B2 | 6/2021 | Piotrowski et al. |
| 11,229,553 B2 | 1/2022 | Chen et al. |
| 11,647,922 B2 | 5/2023 | Scherer |
| 11,850,121 B2 | 12/2023 | Rapp |
| 2002/0016536 A1 | 2/2002 | Benni |
| 2002/0135752 A1 | 9/2002 | Sokolov et al. |
| 2003/0033032 A1 | 2/2003 | Lind et al. |
| 2003/0208148 A1 | 11/2003 | Sullivan |
| 2003/0210810 A1 | 11/2003 | Gee, Jr. et al. |
| 2003/0216630 A1 | 11/2003 | Jersey-Willuhn et al. |
| 2003/0216663 A1 * | 11/2003 | Jersey-Willuhn ...... A61B 5/412 977/932 |
| 2004/0230132 A1 | 11/2004 | Shehada |
| 2005/0088832 A1 | 4/2005 | Su et al. |
| 2005/0240107 A1 | 10/2005 | Alfano et al. |
| 2005/0280531 A1 | 12/2005 | Fadem et al. |
| 2006/0052678 A1 | 3/2006 | Drinan et al. |
| 2006/0058690 A1 | 3/2006 | Bartnik et al. |
| 2006/0094979 A1 | 5/2006 | Masuo et al. |
| 2006/0181791 A1 | 8/2006 | Van Beek et al. |
| 2006/0234383 A1 | 10/2006 | Gough |
| 2006/0241495 A1 | 10/2006 | Kurtz |
| 2007/0055209 A1 | 3/2007 | Patel et al. |
| 2007/0173892 A1 | 7/2007 | Fleischer et al. |
| 2007/0191754 A1 | 8/2007 | Aali |
| 2007/0260421 A1 | 11/2007 | Berner, Jr. et al. |
| 2007/0293748 A1 | 12/2007 | Engvall et al. |
| 2008/0081973 A1 | 4/2008 | Hoarau |
| 2008/0167535 A1 | 7/2008 | Stivoric et al. |
| 2008/0258717 A1 | 10/2008 | Igney et al. |
| 2008/0287747 A1 | 11/2008 | Mestrovic et al. |
| 2008/0319282 A1 | 12/2008 | Tran |
| 2008/0319283 A1 | 12/2008 | Cotton et al. |
| 2009/0149800 A1 | 6/2009 | Durand |
| 2009/0177051 A1 | 7/2009 | Arons et al. |
| 2009/0177110 A1 | 7/2009 | Lyden et al. |
| 2009/0209830 A1 | 8/2009 | Nagle et al. |
| 2009/0209896 A1 | 8/2009 | Selevan |
| 2009/0234206 A1 | 9/2009 | Gaspard et al. |
| 2009/0245601 A1 | 10/2009 | Cohen et al. |
| 2010/0022990 A1 | 1/2010 | Karpowicz et al. |
| 2010/0025831 A1 | 2/2010 | Yamazaki et al. |
| 2010/0166252 A1 | 7/2010 | Ahmed et al. |
| 2010/0168727 A1 | 7/2010 | Hancock et al. |
| 2010/0305473 A1 | 12/2010 | Yuzhakov |
| 2011/0004088 A1 | 1/2011 | Grossman |
| 2011/0015591 A1 | 1/2011 | Hanson et al. |
| 2011/0054283 A1 | 3/2011 | Shuler |
| 2011/0130697 A1 | 6/2011 | Nagle et al. |
| 2011/0140703 A1 | 6/2011 | Chiao et al. |
| 2011/0190639 A1 | 8/2011 | Peltie et al. |
| 2011/0218757 A1 | 9/2011 | Callsen et al. |
| 2011/0242532 A1 | 10/2011 | Mckenna |
| 2011/0245682 A1 | 10/2011 | Robinson et al. |
| 2011/0245710 A1 | 10/2011 | Jensen |
| 2011/0301441 A1 | 12/2011 | Bandic et al. |
| 2012/0029306 A1 | 2/2012 | Paquet et al. |
| 2012/0029307 A1 | 2/2012 | Paquet et al. |
| 2012/0029410 A1 | 2/2012 | Koenig et al. |
| 2012/0165717 A1 | 6/2012 | Al Khaburi |
| 2012/0190989 A1 | 7/2012 | Kaiser et al. |
| 2012/0265120 A1 | 10/2012 | Beisang, III et al. |
| 2012/0271265 A1 | 10/2012 | Langdon |
| 2012/0277559 A1 | 11/2012 | Kohl-Bareis et al. |
| 2012/0316538 A1 | 12/2012 | Heiser et al. |
| 2012/0330252 A1 | 12/2012 | Stokes et al. |
| 2013/0041235 A1 | 2/2013 | Rogers et al. |
| 2013/0064772 A1 | 3/2013 | Swiss et al. |
| 2013/0121544 A1 | 5/2013 | Sarrafzadeh et al. |
| 2013/0123722 A1 | 5/2013 | Pratt et al. |
| 2013/0151223 A1 | 6/2013 | Zamierowski et al. |
| 2013/0200268 A1 | 8/2013 | Rafferty et al. |
| 2013/0261409 A1 | 10/2013 | Pathak et al. |
| 2013/0271278 A1 | 10/2013 | Duesterhoft et al. |
| 2013/0274563 A1 | 10/2013 | Duesterhoft et al. |
| 2013/0274629 A1 | 10/2013 | Duesterhoft et al. |
| 2013/0317367 A1 | 11/2013 | Shuler |
| 2014/0012108 A1 | 1/2014 | Mcpeak |
| 2014/0018637 A1 | 1/2014 | Bennett et al. |
| 2014/0024905 A1 | 1/2014 | Sarrafzadeh et al. |
| 2014/0031663 A1 | 1/2014 | Gallego et al. |
| 2014/0072190 A1 | 3/2014 | Wu et al. |
| 2014/0075658 A1 | 3/2014 | Mcguin |
| 2014/0107495 A1 | 4/2014 | Marinelli et al. |
| 2014/0107498 A1 | 4/2014 | Bower et al. |
| 2014/0147611 A1 | 5/2014 | Ackerman, Jr. |
| 2014/0203797 A1 | 7/2014 | Stivoric et al. |
| 2014/0206947 A1 | 7/2014 | Isserow et al. |
| 2014/0232516 A1 | 8/2014 | Stivoric et al. |
| 2014/0235166 A1 | 8/2014 | Molettiere et al. |
| 2014/0243709 A1 | 8/2014 | Gibson et al. |
| 2014/0276166 A1 | 9/2014 | Drori et al. |
| 2014/0296749 A1 | 10/2014 | Reid, Jr. et al. |
| 2014/0298927 A1 | 10/2014 | Allin et al. |
| 2014/0298928 A1 | 10/2014 | Duesterhoft et al. |
| 2014/0303463 A1 | 10/2014 | Robinson et al. |
| 2014/0324120 A1 | 10/2014 | Bogie et al. |
| 2014/0340857 A1 | 11/2014 | Hsu et al. |
| 2014/0343478 A1 | 11/2014 | Brennan et al. |
| 2014/0350882 A1 | 11/2014 | Everett et al. |
| 2015/0018792 A1 | 1/2015 | Marsiquet et al. |
| 2015/0025343 A1 | 1/2015 | Gareau et al. |
| 2015/0138330 A1 | 5/2015 | Krishnamoorthi |
| 2015/0141767 A1 | 5/2015 | Rogers et al. |
| 2015/0148760 A1 | 5/2015 | Dodd et al. |
| 2015/0150479 A1 | 6/2015 | Yoshino et al. |
| 2015/0182166 A1 | 7/2015 | Evans et al. |
| 2015/0223716 A1 | 8/2015 | Korkala et al. |
| 2015/0257644 A1 | 9/2015 | Cao |
| 2015/0265191 A1 | 9/2015 | Harding et al. |
| 2015/0292968 A1 | 10/2015 | Vogt et al. |
| 2015/0313476 A1 | 11/2015 | Pisani et al. |
| 2015/0313533 A1 | 11/2015 | Rapp et al. |
| 2015/0327777 A1 | 11/2015 | Kostic et al. |
| 2015/0335254 A1 | 11/2015 | Fastert et al. |
| 2015/0335287 A1 | 11/2015 | Neuman et al. |
| 2015/0335288 A1 | 11/2015 | Toth et al. |
| 2015/0351970 A1 | 12/2015 | Dagger et al. |
| 2015/0359485 A1 | 12/2015 | Berg et al. |
| 2015/0374309 A1 | 12/2015 | Farkas et al. |
| 2016/0015962 A1 | 1/2016 | Shokoueinejad Maragheh et al. |
| 2016/0022223 A1 | 1/2016 | Grundfest et al. |
| 2016/0029900 A1 | 2/2016 | Laplante et al. |
| 2016/0030132 A1 | 2/2016 | Cheung et al. |
| 2016/0038045 A1 | 2/2016 | Shapiro |
| 2016/0038083 A1 | 2/2016 | Ding et al. |
| 2016/0051147 A1 | 2/2016 | Cohen et al. |
| 2016/0058380 A1 | 3/2016 | Lee et al. |
| 2016/0066854 A1 | 3/2016 | Mei et al. |
| 2016/0069743 A1 | 3/2016 | Mcquilkin et al. |
| 2016/0074234 A1 | 3/2016 | Abichandani et al. |
| 2016/0081601 A1 | 3/2016 | Ballam et al. |
| 2016/0100790 A1 | 4/2016 | Cantu et al. |
| 2016/0100987 A1 | 4/2016 | Hartwell et al. |
| 2016/0129469 A1 | 5/2016 | Kulinsky et al. |
| 2016/0143534 A1 | 5/2016 | Hyde et al. |
| 2016/0157779 A1 | 6/2016 | Baxi et al. |
| 2016/0213269 A1 | 7/2016 | Lam et al. |
| 2016/0228049 A1 | 8/2016 | Nackaerts et al. |
| 2016/0232807 A1 | 8/2016 | Ghaffari et al. |
| 2016/0242331 A1 | 8/2016 | Park et al. |
| 2016/0249810 A1 | 9/2016 | Darty et al. |
| 2016/0262672 A1 | 9/2016 | Hammond et al. |
| 2016/0262687 A1 | 9/2016 | Vaidyanathan et al. |
| 2016/0270700 A1 | 9/2016 | Baxi |
| 2016/0287177 A1 | 10/2016 | Huppert et al. |
| 2016/0302729 A1 | 10/2016 | Starr et al. |
| 2016/0310023 A1 | 10/2016 | Chachisvilis et al. |
| 2016/0317057 A1 | 11/2016 | Li et al. |
| 2016/0331263 A1 | 11/2016 | Cailler et al. |
| 2016/0331322 A1 | 11/2016 | Son et al. |
| 2016/0338591 A1 | 11/2016 | Lachenbruch et al. |

(56) References Cited

U.S. PATENT DOCUMENTS

| | | |
|---|---|---|
| 2016/0354001 A1 | 12/2016 | Buckley et al. |
| 2016/0367189 A1 | 12/2016 | Aimone et al. |
| 2016/0367192 A1 | 12/2016 | Iyengar et al. |
| 2016/0367406 A1 | 12/2016 | Barnett |
| 2017/0000407 A1 | 1/2017 | Saxby et al. |
| 2017/0007853 A1 | 1/2017 | Alford et al. |
| 2017/0027498 A1 | 2/2017 | Larson et al. |
| 2017/0079740 A1 | 3/2017 | Hufnagel et al. |
| 2017/0086519 A1 | 3/2017 | Vigano' et al. |
| 2017/0086709 A1 | 3/2017 | Khine et al. |
| 2017/0095208 A1 | 4/2017 | Oberleitner et al. |
| 2017/0146474 A1 | 5/2017 | Bedell et al. |
| 2017/0156594 A1 | 6/2017 | Stivoric et al. |
| 2017/0156621 A1 | 6/2017 | Bettinger et al. |
| 2017/0156658 A1* | 6/2017 | Maharbiz ............... A61B 5/053 |
| 2017/0164865 A1 | 6/2017 | Rafferty et al. |
| 2017/0164876 A1 | 6/2017 | Hyde et al. |
| 2017/0172439 A1 | 6/2017 | Zhu et al. |
| 2017/0202711 A1 | 7/2017 | Cernasov et al. |
| 2017/0224271 A1 | 8/2017 | Lachenbruch et al. |
| 2017/0231015 A1 | 8/2017 | Jang et al. |
| 2017/0258972 A1 | 9/2017 | Weston |
| 2017/0296080 A1* | 10/2017 | Yoon ...................... A61B 5/316 |
| 2017/0319075 A1 | 11/2017 | Homan et al. |
| 2017/0326004 A1 | 11/2017 | Long et al. |
| 2017/0367644 A1 | 12/2017 | Sharman et al. |
| 2018/0003579 A1 | 1/2018 | Esposito et al. |
| 2018/0008177 A1 | 1/2018 | Shimuta et al. |
| 2018/0055697 A1 | 3/2018 | Mihali et al. |
| 2018/0056087 A1 | 3/2018 | Ribeiro et al. |
| 2018/0070880 A1 | 3/2018 | Trembly et al. |
| 2018/0074547 A1 | 3/2018 | Smadi et al. |
| 2018/0116877 A1 | 5/2018 | Ineichen |
| 2018/0132287 A1 | 5/2018 | Cheng et al. |
| 2018/0192514 A1 | 7/2018 | Seo |
| 2018/0200414 A1 | 7/2018 | Askem et al. |
| 2018/0206758 A1 | 7/2018 | Feldkamp et al. |
| 2018/0235484 A1 | 8/2018 | Mozdzierz |
| 2018/0296397 A1 | 10/2018 | Askem et al. |
| 2019/0021911 A1 | 1/2019 | Askem et al. |
| 2019/0060126 A1 | 2/2019 | Ribble et al. |
| 2019/0076298 A1 | 3/2019 | Quintanar et al. |
| 2019/0083025 A1 | 3/2019 | Aung et al. |
| 2019/0133812 A1 | 5/2019 | Seres et al. |
| 2019/0159938 A1 | 5/2019 | Askem et al. |
| 2019/0175098 A1 | 6/2019 | Burns |
| 2019/0192066 A1 | 6/2019 | Schoess et al. |
| 2019/0231939 A1 | 8/2019 | Askem et al. |
| 2019/0290496 A1 | 9/2019 | Brownhill et al. |
| 2019/0374387 A1 | 12/2019 | Ribble et al. |
| 2020/0054218 A1 | 2/2020 | Xi |
| 2020/0078482 A1 | 3/2020 | Yoon et al. |
| 2020/0078499 A1 | 3/2020 | Gadde et al. |
| 2020/0100711 A1 | 4/2020 | Choudhury et al. |
| 2020/0147407 A1 | 5/2020 | Efremkin |
| 2020/0281512 A1 | 9/2020 | Grubb et al. |
| 2020/0281513 A1 | 9/2020 | Grubb et al. |
| 2020/0281529 A1 | 9/2020 | Grubb et al. |
| 2020/0289346 A1 | 9/2020 | Hansen et al. |
| 2020/0330258 A1 | 10/2020 | Hansen et al. |
| 2020/0360547 A1 | 11/2020 | Smith et al. |
| 2021/0137446 A1 | 5/2021 | Brownhill et al. |
| 2021/0145359 A1 | 5/2021 | Hunt et al. |
| 2021/0212855 A1 | 7/2021 | Hansen et al. |

FOREIGN PATENT DOCUMENTS

| | | |
|---|---|---|
| CN | 106102322 A | 11/2016 |
| CN | 109350362 A | 2/2019 |
| DE | 102012211015 A1 | 1/2014 |
| DE | 102013013013 A1 | 2/2015 |
| EP | 1112715 A1 | 7/2001 |
| EP | 1118308 A1 | 7/2001 |
| EP | 1138259 A2 | 10/2001 |
| EP | 1754441 A1 | 2/2007 |
| EP | 2454990 A2 | 5/2012 |
| EP | 2565630 A1 | 3/2013 |
| EP | 3231478 A1 | 10/2017 |
| EP | 3409190 A1 | 12/2018 |
| EP | 3499510 A1 | 6/2019 |
| EP | 3837520 A1 | 6/2021 |
| GB | 1476894 A | 6/1977 |
| GB | 2316171 A | 2/1998 |
| GB | 2563602 A | 12/2018 |
| JP | 2009225863 A | 10/2009 |
| KR | 20120119523 A | 10/2012 |
| KR | 101224629 B1 | 1/2013 |
| KR | 20140024743 A | 3/2014 |
| KR | 20140058041 A | 5/2014 |
| KR | 20160071044 A | 6/2016 |
| KR | 20190105898 A | 9/2019 |
| NL | 1027236 C2 | 4/2006 |
| WO | WO-0021433 A1 | 4/2000 |
| WO | WO-0043046 A2 | 7/2000 |
| WO | WO-03067229 A1 | 8/2003 |
| WO | WO-2006041997 A2 | 4/2006 |
| WO | WO-2007030379 A2 | 3/2007 |
| WO | WO-2008006150 A1 | 1/2008 |
| WO | WO-2008010604 A1 | 1/2008 |
| WO | WO-2009052607 A1 | 4/2009 |
| WO | WO-2009120951 A2 | 10/2009 |
| WO | WO-2009141777 A1 | 11/2009 |
| WO | WO-2010020919 A1 | 2/2010 |
| WO | WO-2010105053 A2 | 9/2010 |
| WO | WO-2011082420 A1 | 7/2011 |
| WO | WO-2011123848 A1 | 10/2011 |
| WO | WO-2012141999 A1 | 10/2012 |
| WO | WO-2013026999 A1 | 2/2013 |
| WO | WO-2013044226 A2 | 3/2013 |
| WO | WO-2014036577 A1 | 3/2014 |
| WO | WO-2014116816 A1 | 7/2014 |
| WO | WO-2015112095 A1 | 7/2015 |
| WO | WO-2015168720 A1 | 11/2015 |
| WO | WO-2016025438 A1 | 2/2016 |
| WO | WO-2016030752 A1 | 3/2016 |
| WO | WO-2016058032 A1 | 4/2016 |
| WO | WO-2016073777 A1 | 5/2016 |
| WO | WO-2016100218 A1 | 6/2016 |
| WO | WO-2016110564 A1 | 7/2016 |
| WO | WO-2016187136 A1 | 11/2016 |
| WO | WO-2016205872 A1 | 12/2016 |
| WO | WO-2016205881 A1 | 12/2016 |
| WO | WO-2017021006 A1 | 2/2017 |
| WO | WO-2017021965 A2 | 2/2017 |
| WO | WO-2017033058 A1 | 3/2017 |
| WO | WO-2017037479 A1 | 3/2017 |
| WO | WO-2017041014 A1 | 3/2017 |
| WO | WO-2017041385 A1 | 3/2017 |
| WO | WO-2017041386 A1 | 3/2017 |
| WO | WO-2017041387 A1 | 3/2017 |
| WO | WO-2017119996 A1 | 7/2017 |
| WO | WO-2017205728 A1 | 11/2017 |
| WO | WO-2017214188 A1 | 12/2017 |
| WO | WO-2018035612 A1 | 3/2018 |
| WO | WO-2018060417 A1 | 4/2018 |
| WO | WO-2018064569 A1 | 4/2018 |
| WO | WO-2018115461 A1 | 6/2018 |
| WO | WO-2018144938 A1 | 8/2018 |
| WO | WO-2018144941 A1 | 8/2018 |
| WO | WO-2018144943 A1 | 8/2018 |
| WO | WO-2018144946 A1 | 8/2018 |
| WO | WO-2018185138 A1 | 10/2018 |
| WO | WO-2018189265 A1 | 10/2018 |
| WO | WO-2018209090 A1 | 11/2018 |
| WO | WO-2018211458 A1 | 11/2018 |
| WO | WO-2018234443 A1 | 12/2018 |
| WO | WO-2019014186 A1 | 1/2019 |
| WO | WO-2019020550 A2 | 1/2019 |
| WO | WO-2019020551 A1 | 1/2019 |
| WO | WO-2019020666 A1 | 1/2019 |
| WO | WO-2019030384 A2 | 2/2019 |
| WO | WO-2019048624 A1 | 3/2019 |
| WO | WO-2019048626 A1 | 3/2019 |
| WO | WO-2019048638 A1 | 3/2019 |

(56) References Cited

FOREIGN PATENT DOCUMENTS

| WO | WO-2019063481 A1 | 4/2019 |
|---|---|---|
| WO | WO-2019063488 A2 | 4/2019 |
| WO | WO-2019067264 A1 | 4/2019 |
| WO | WO-2019072531 A1 | 4/2019 |
| WO | WO-2019076967 A2 | 4/2019 |
| WO | WO-2019096828 A1 | 5/2019 |
| WO | WO-2019140441 A2 | 7/2019 |
| WO | WO-2019140444 A1 | 7/2019 |
| WO | WO-2019140448 A1 | 7/2019 |
| WO | WO-2019140449 A1 | 7/2019 |
| WO | WO-2019193141 A1 | 10/2019 |
| WO | WO-2019216883 A1 | 11/2019 |
| WO | WO-2019230183 A1 | 12/2019 |
| WO | WO-2019238180 A1 | 12/2019 |
| WO | WO-2019238181 A1 | 12/2019 |
| WO | WO-2019238182 A1 | 12/2019 |
| WO | WO-2019238195 A1 | 12/2019 |
| WO | WO-2019238196 A1 | 12/2019 |
| WO | WO-2019238197 A1 | 12/2019 |
| WO | WO-2019238198 A1 | 12/2019 |
| WO | WO-2020002416 A1 | 1/2020 |
| WO | WO-2020043806 A1 | 3/2020 |
| WO | WO-2020139541 A1 | 7/2020 |
| WO | WO-2020157103 A1 | 8/2020 |
| WO | WO-2020159677 A1 | 8/2020 |
| WO | WO-2020167547 A1 | 8/2020 |
| WO | WO-2020242876 A1 | 12/2020 |
| WO | WO-2021059209 A1 | 4/2021 |

OTHER PUBLICATIONS

Aubakir B., et al., "Vital Sign Monitoring Utilizing Eulerian Video Magnification and Thermography," 38th Annual International Conference of the IEEE Engineering in Medicine and Biology Society, Aug. 16, 2016, pp. 3527-3530 (4 pages).

Bandodkar A.J., et al., "Battery-Free, Skin-Interfaced Microfluidic/Electronic Systems for Simultaneous Electrochemical, Colorimetric and Volumetric Analysis of Sweat," Science Advances, vol. 5 (1), Jan. 18, 2019, retrieved from http://advances.sciencemag.org/content/5/1/eaav3294, 16 pages.

Boussarsar M., et al., "Conception of Patient Isolation System for Bioimpedance Measure," 11th International conference on Sciences and Techniques of Automatic control & computer engineering, Dec. 31, 2010, Retrieved from https://www.researchgate.net/profile/Mongi_Lahiani/publication/313771620_Conception_of_Patient_isolation_system_for_bioimpedance_measure/links/58a57f4792851cf0e394b56d/Conception-of-Patient-isolation-system-for-bioimpedance-measure.pdf on Apr. 9, 2020, 12 pages.

Cauwe M., et al., "Technology Development for a Low-Cost, Roll-to-Roll Chip Embedding Solution Based on PET Foils," 18th European Microelectronics and Packaging Conference (EMPC), IEEE, Sep. 12, 2011, 6 pages.

Farooqui M.F., et al., "Low Cost Inkjet Printed Smart Bandage for Wireless Monitoring of Chronic Wounds," Scientific Reports, vol. 6, Jun. 29, 2016, 14 pages.

Geng Y., et al., "A Hybrid Low Power Biopatch for Body Surface Potential Measurement," IEEE Journal of Biomedical and Health Informatics, vol. 17, No. 3, May 1, 2013, pp. 591-599.

George J., et al., "Reliability of Plastic-Encapsulated Electronic Components in Supersaturated Steam Environments," IEEE Transactions on Components, Packaging and Manufacturing Technology, vol. 5 (10), Oct. 2015, pp. 1423-1431.

Iannetta Jr. R.A., et al., "Successful Case Histories of Polymer Based Circuitry on Flexible Film Substrates," Electro/94 International Conference Proceedings Combined Volumes, IEEE, XP010149465, May 10-12, 1994, pp. 885-889.

International Appl. No. PCT/EP2020/056322, International Search Report mailed May 8, 2020, 4 pages.

Kekonen A., et al., "Bioimpedance Sensor Array for Long-Term Monitoring of Wound Healing from Beneath the Primary Dressings and Controlled Formation of H2O2 Using Low-Intensity Direct Current," Sensors, vol. 19, 2019, pp. 1-12.

Little Miss Plasters, kidstravelclub.co.uk., retrieved from http://www.kidstravelclub.co.uk/little-miss-girls-childrens-plasters on Aug. 26, 2016, 2 pages.

Lu B., et al., "A Study of the Autofluorescence of Parylene Materials for µTAS Applications," Lab on Chip, vol. 10 (14), Jul. 2010, pp. 1826-1834.

McLeod A.J., et al., "Motion Magnification for Endoscopic Surgery," Progress in Biomedical Optics and Imaging, SPIE—International Society for Optical Engineering, Mar. 12, 2014, vol. 9036, 8 pages.

Mehmood N., et al., "Applications of Modern Sensors and Wireless Technology in Effective Wound Management: Modern Sensors and Wireless Technology," Journal of Biomedical Materials Research Part B, vol. 102, 2014, pp. 885-895.

Mostafalu P., et al., "Wireless Flexible Smart Bandage for Continuous Monitoring of Wound Oxygenation," IEEE Transactions on Biomedical Circuits and Systems, vol. 9 (5), Oct. 2015, pp. 670-677 (8 pages).

Narusawa H., "The Corona Discharge Causes Short Destruction that had Bad Influence on a Power Switching Circuit," Adphox Corporation, Jan. 1, 2009, retrieved from http://www.adphox.co.jp/keisokuki/ke-english-corona/CORONA_DISCHARGE_EN.pdf, 12 pages.

Pang Q., et al., "Smart Flexible Electronics-Integrated Wound Dressing for Real-Time Monitoring and On-Demand Treatment of Infected Wounds," Advanced Science, vol. 7, Jan. 10, 2020, 1902673, 10 pages.

Raviglione A., et al., "Real-Time Smart Textile-Based System to Monitor Pressure Offloading of Diabetic Foot Ulcers," Journal of Diabetes Science and Technology, vol. 11 (5), Sep. 2017, pp. 894-898.

Rose D.P., et al., "Adhesive RFID Sensor Patch for Monitoring of Sweat Electrolytes," IEEE Transactions on Biomedical Engineering, vol. 62 (6), Jun. 2015, first published on Nov. 11, 2015, pp. 1457-1465.

Sirtoli V.G., et al., "Design of Current Sources for Load Common Mode Optimization," Journal of Electrical Bioimpedance, vol. 9, No. 1, Nov. 30, 2008, pp. 59-71.

Wakita J., et al., "Variations in Optical Absorption and Fluorescence Spectra for Polyimide Thin Films Caused by Structural Isomerism," Journal of Photopolymer Science and Technology, Jan. 1, 2003, 1 page.

Willis B., "Conformal Coating Inspection & Coating Faults," Vision Engineering, Jul. 21, 2016, retrieved from http://www.visioneng.com/wp-content/uploads/2017/11/Conformal-Coating-Inspection-and-Defects.21JUL16.pdf, 35 pages.

Willis B., "Guide to Conformal Coating & Cleaning Defects Contents," Mar. 1, 2014, retrieved from http://coatingguide.smartgroup.org/Files%20pdf/Coating%20Defects%20V2%2014March2014.pdf, vol. 1, 31 pages.

International Preliminary Report on Patentability for Application No. PCT/EP2020/056322, mailed on Sep. 30, 2021, 11 pages.

\* cited by examiner

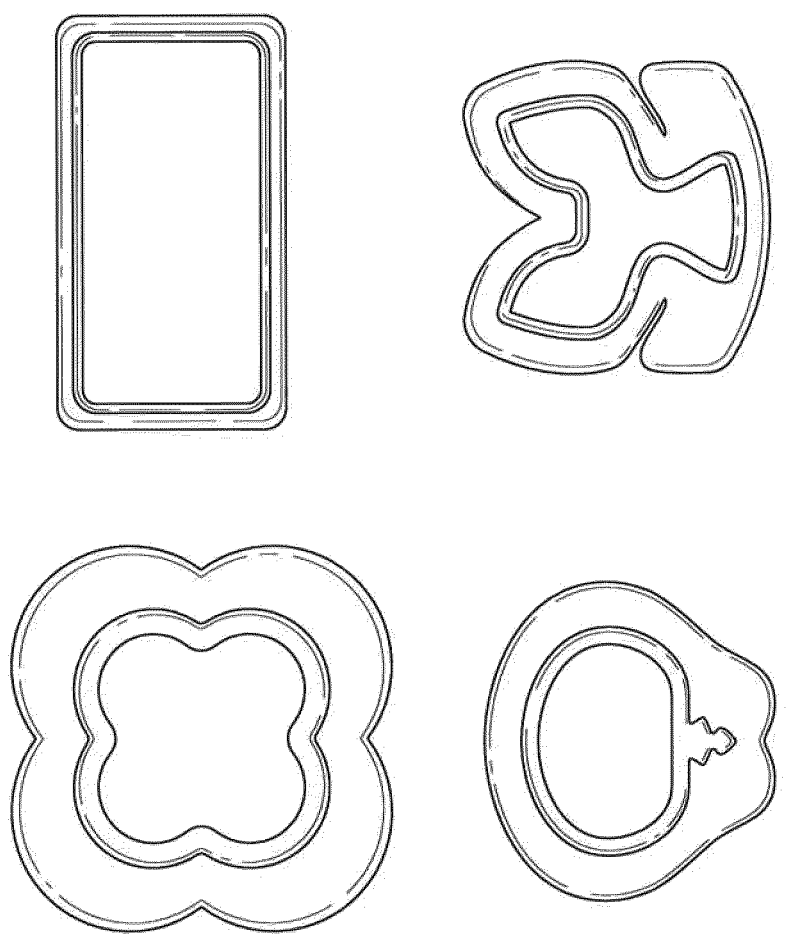

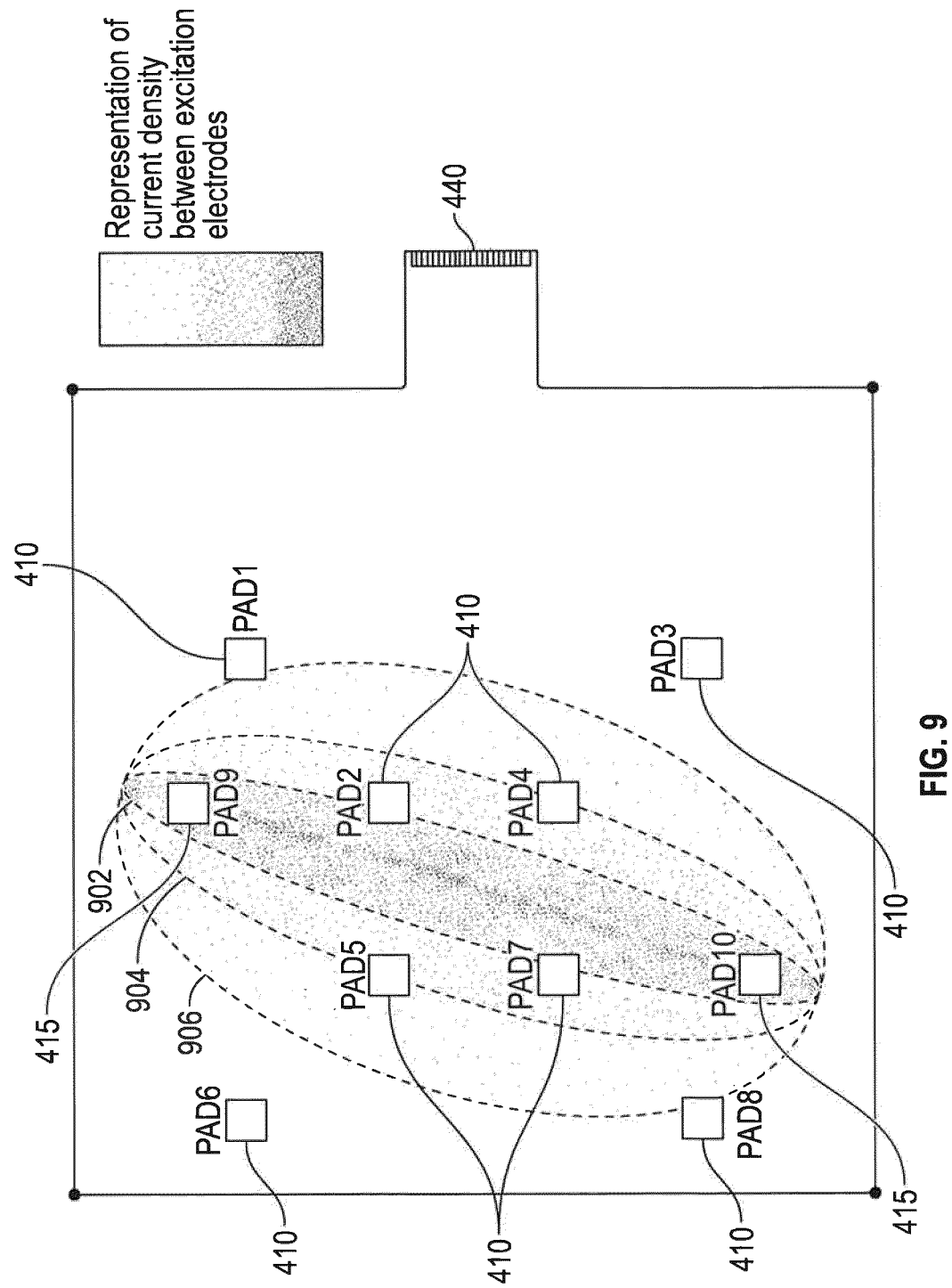

SYSTEMS AND METHODS FOR MEASURING TISSUE IMPEDANCE

CROSS-REFERENCE TO RELATED APPLICATIONS

This application is a U.S. national stage application of International Patent Application No. PCT/EP2020/056322, filed Mar. 10, 2020, which claims priority to U.K. Provisional Application No. GB1903698.7, filed on Mar. 19, 2019, and also claims priority to U.K. Provisional Application No. 1916129.8, filed on Nov. 6, 2019, the disclosure of each of which is hereby incorporated by reference in its entirety.

FIELD

Embodiments of the present disclosure relate to apparatuses, systems, and methods for the monitoring and/or treatment of tissues using one or more sensors, including measuring tissue impedance.

DESCRIPTION OF THE RELATED ART

Nearly all areas of medicine may benefit from improved information regarding the state of the tissue, organ, or system to be treated, particularly if such information is gathered in real-time during treatment. Many types of treatments are still routinely performed without the use of sensor data collection; instead, such treatments rely upon visual inspection by a caregiver or other limited means rather than quantitative sensor data. For example, in the case of wound treatment via dressings and/or negative pressure wound therapy, data collection is generally limited to visual inspection by a caregiver and often the underlying wounded tissue may be obscured by bandages or other visual impediments. Even intact, unwounded skin may have underlying damage that is not visible to the naked eye, such as a compromised vascular or deeper tissue damage that may lead to an ulcer. Similar to wound treatment, during orthopedic treatments requiring the immobilization of a limb with a cast or other encasement, only limited information is gathered on the underlying tissue. In instances of internal tissue repair, such as a bone plate, continued direct sensor-driven data collection is not performed. Further, braces and/or sleeves used to support musculoskeletal function do not monitor the functions of the underlying muscles or the movement of the limbs. Outside of direct treatments, common hospital room items such as beds and blankets could be improved by adding capability to monitor patient parameters.

Therefore, there is a need for improved sensor monitoring, particularly through the use of sensor-enabled substrates which can be incorporated into existing treatment regimes.

SUMMARY

Some embodiments of the present disclosure provide improved monitoring and/or therapy apparatus for measuring impendence or conductance of tissue.

A monitoring and/or therapy apparatus can include a plurality of excitation pads, at least one measurement sensor, and a controller. The plurality of excitation pads can be configured to apply an excitation signal to tissue of a patient. The plurality of excitation pads can be connected to an electronic circuit that is configured to communicate the excitation signal to the plurality of excitation pads. The at least one measurement sensor can be configured to measure a voltage of the tissue in response to application of the excitation signal. The controller can be in communication with the plurality of excitation pads, the electronic circuit, and the at least one measurement sensor. The controller can be configured to generate the excitation signal and measure a current of the excitation signal after it has been communicated through at least a portion of the electronic circuit and before the excitation signal is applied to the tissue via the plurality of excitation pads. The controller can be configured to determine impedance of the tissue based at least in part on the voltage measured by the at least one measurement sensor and the current of the excitation signal. In some cases, measurement of the current of the excitation signal after it has been communicated through at least the portion of the electronic circuit allows for removal or reduction of distortion due to the at least the portion of the electronic circuit from the determined impedance of the tissue.

The apparatus of the preceding paragraph and/or any of the apparatuses disclosed herein can include any combination of the following features described in this paragraph, among other features described herein. The at least one measurement sensor can include at least two measurement sensors. The apparatus can include a selection circuit connected to each of the at least two measurement sensors. The selection circuit can be configured to select a voltage measured by one of the at least two measurement sensors or a voltage measured between the at least two measurement sensors. The controller can be configured to receive the selected voltage from the selection circuit and determine the impedance based at least in part on the selected voltage. The controller can be configured to communicate one or more selection signals to the selection circuit to select the voltage from one of the at least two measurement sensors or the measured voltage. The selection circuit can select the measurement sensor based at least in part on the one or more selection signals received from the controller.

The apparatus of any of the preceding paragraphs and/or any of the apparatuses disclosed herein can include any combination of the following features described in this paragraph, among other features described herein. The apparatus can include an excitation measurement circuit connected to the plurality of excitation pads, the controller, and the electronic circuit. The excitation measurement circuit can be configured to measure the current of the excitation signal after it has been communicated through at least the portion of the electronic circuit. The plurality of excitation pads can include two excitation pads. The at least one measurement sensor can include eight measurement sensors. The excitation signal can include a differential signal. The plurality of excitation pads and the at least one measurement sensor can be positioned on a substrate configured to be placed in a wound. The sensor sheet or substrate can be substantially flexible so as to conform to the wound.

The apparatus of any of the preceding paragraphs and/or any of the apparatuses disclosed herein can include any combination of the following features described in this paragraph, among other features described herein. The electronic circuit can be configured to at least one of filter or buffer the excitation signal before it is applied to the tissue via the plurality of excitation pads. The controller can be configured to measure the current of the excitation signal after the electronic circuit filters and/or buffers the excitation signal. The electronic circuit can be configured to convert the excitation signal into a differential signal. The controller can be configured to determine the impedance of the tissue by dividing the measured voltage by the measured current of the excitation signal. The portion of the electronic circuit can include circuitry configured to condition the excitation signal. The circuitry configured to condition the excitation signal can be configured to one or more of filter or buffer the excitation signal. The excitation signal can include a square wave with a frequency of about 50 kHz. The excitation signal can include a sinusoidal wave with a frequency of about 50 kHz.

Some embodiments of the present disclosure provide improved method of operating a monitoring and/or therapy apparatus, such as the apparatus of any of the preceding paragraphs and/or any of the apparatuses described herein.

A method of operating a monitoring and/or therapy apparatus, which can include a controller that includes electronic circuitry, can include generating an excitation signal and communicating the excitation signal to an electronic circuit, and receiving a first signal corresponding to a first measurement of the excitation signal. The first measurement can correspond to the excitation signal after it has been communicated through at least a portion of the electronic circuit and before it is applied to tissue of a patient via a plurality of excitation pads. The method can include receiving a second signal corresponding to a second measurement of the excitation signal. The second measurement of the excitation signal can correspond to the excitation signal after it has been applied to the tissue of the patient. The method can include determining impedance or conductance of the tissue based at least in part on the first signal and the second signal.

The method of the preceding paragraph and/or any of the methods disclosed herein can include any combination of the following steps or features described in this paragraph, among other features described herein. The first measurement can include a current measurement and the second measurement can include a voltage measurement. The first measurement can include a voltage measurement. The second measurement can include a current measurement. The second measurement can include a voltage measurement. The first measurement can include a current measurement. Impedance or conductance of the tissue can be determined by dividing the second signal by the first signal or vice versa. The method can include communicating a selection signal to a selection circuit to select the first measurement from a plurality of first measurements. Each of the plurality of first measurements can correspond to measurements taken by a plurality of measurement sensors. The method can include communicating a selection signal to a selection circuit to select the second measurement from a plurality of second measurements. Each of the plurality of second measurements can correspond to measurements taken by a plurality of measurement sensors.

The method of any of the preceding paragraphs and/or any of the methods disclosed herein can include any combination of the following steps or features described in this paragraph, among other features described herein. The plurality of measurement sensors or at least one measurement sensor can include eight measurement sensors. The method can include receiving the first signal from the selection circuit. The method can include receiving the second signal from the selection circuit. A plurality of excitation pads can be configured to apply the excitation signal to the tissue of the patient. The method can include receiving the second signal from an excitation measurement circuit configured to measure the second signal. The method can include receiving the first signal from an excitation measurement circuit configured to measure the first signal. The excitation measurement circuit can be connected to the plurality of excitation pads and the electronic circuit.

The method of any of the preceding paragraphs and/or any of the methods disclosed herein can include any combination of the following steps or features described in this paragraph, among other features described herein. The plurality of excitation pads can include two excitation pads. The excitation signal can include a differential signal. The plurality of excitation pads and the plurality of measurement sensors or at least one measurement sensor can be positioned on a substantially flexible substrate configured to be in contact with a wound. The method can include determining the second measurement from the second signal. The method can include determining the second measurement based on demodulating the second signal. The demodulating can include decomposing the second signal into an in-phase component and a quadrature component. Determining the second measurement can include adding the in-phase component and the quadrature component. Addition can include root mean square computation. The excitation signal can include a square wave with a frequency of about 50 kHz. The excitation signal can include a sinusoidal wave with a frequency of about 50 kHz. The portion of the electronic circuit can include circuitry configured to condition the excitation signal. The circuitry configured to condition the excitation signal can be configured to one or more of filter or buffer the excitation signal.

Any of the features, components, or details of any of the arrangements or embodiments disclosed in this application, including without limitation any of the pump embodiments, any of the negative pressure wound therapy embodiments, any of the wound dressing embodiments, or any of the optical sensor embodiments disclosed below, are interchangeably combinable with any other features, components, or details of any of the arrangements or embodiments disclosed herein to form new arrangements and embodiments.

BRIEF DESCRIPTION OF THE DRAWINGS

Embodiments of the present disclosure will now be described hereinafter, by way of example only, with reference to the accompanying drawings in which:

FIG. 1G illustrates a wound treatment system employing a wound dressing capable of absorbing and storing wound exudate to be used without negative pressure;

FIG. 9 illustrates current density between excitation pads.

DETAILED DESCRIPTION

Figure 1A:
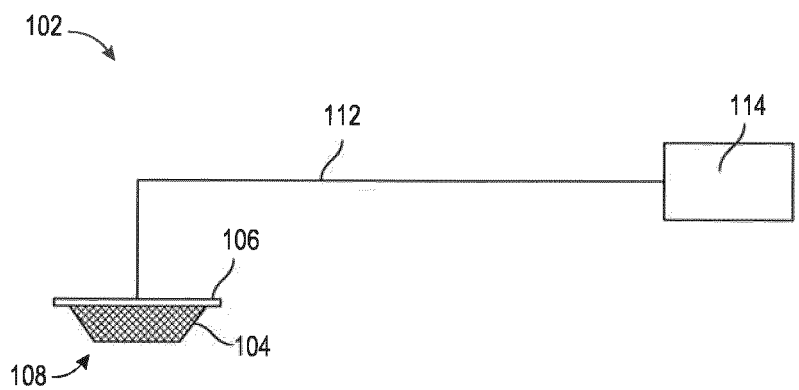
FIG. 1A illustrates a negative pressure wound treatment system.

Embodiments disclosed herein relate to apparatuses and methods of at least one of monitoring or treating biological tissue with sensor-enabled substrates. The embodiments disclosed herein are not limited to treatment or monitoring of a particular type of tissue or injury, instead the sensor-enabled technologies disclosed herein are broadly applicable to any type of therapy that may benefit from sensor-enabled substrates. Some implementations utilize sensors and data collection relied upon by health care providers to make both diagnostic and patient management decisions.

Some embodiments disclosed herein relate to the use of sensors mounted on or embedded within substrates configured to be used in the treatment of both intact and damaged human or animal tissue. Such sensors may collect information about the surrounding tissue and transmit such information to a computing device or a caregiver to be utilized in further treatment. In certain embodiments, such sensors may be attached to the skin anywhere on the body, including areas for monitoring arthritis, temperature, or other areas that may be prone to problems and require monitoring. Sensors disclosed herein may also incorporate markers, such as radiopaque markers, to indicate the presence of the device, for example prior to performing an MRI or other technique.

The sensor embodiments disclosed herein may be used in combination with clothing. Non-limiting examples of clothing for use with embodiments of the sensors disclosed herein include shirts, pants, trousers, dresses, undergarments, outer-garments, gloves, shoes, hats, and other suitable garments. In certain embodiments, the sensor embodiments disclosed herein may be welded into or laminated into/onto the particular garments. The sensor embodiments may be printed directly onto the garment and/or embedded into the fabric. Breathable and printable materials such as microporous membranes may also be suitable.

Sensor embodiments disclosed herein may be incorporated into cushioning or bed padding, such as within a hospital bed, to monitor patient characteristics, such as any characteristic disclosed herein. In certain embodiments, a disposable film containing such sensors could be placed over the hospital bedding and removed/replaced as needed.

In some implementations, the sensor embodiments disclosed herein may incorporate energy harvesting, such that the sensor embodiments are self-sustaining. For example, energy may be harvested from thermal energy sources, kinetic energy sources, chemical gradients, or any suitable energy source.

The sensor embodiments disclosed herein may be utilized in rehabilitation devices and treatments, including sports medicine. For example, the sensor embodiments disclosed herein may be used in braces, sleeves, wraps, supports, and other suitable items. Similarly, the sensor embodiments disclosed herein may be incorporated into sporting equipment, such as helmets, sleeves, and/or pads. For example, such sensor embodiments may be incorporated into a protective helmet to monitor characteristics such as acceleration, which may be useful in concussion diagnosis.

The sensor embodiments disclosed herein may be used in coordination with surgical devices, for example, the NAVIO surgical system by Smith & Nephew Inc. In some implementations, the sensor embodiments disclosed herein may be in communication with such surgical devices to guide placement of the surgical devices. In some implementations, the sensor embodiments disclosed herein may monitor blood flow to or away from the potential surgical site or ensure that there is no blood flow to a surgical site. Further surgical data may be collected to aid in the prevention of scarring and monitor areas away from the impacted area.

To further aid in surgical techniques, the sensors disclosed herein may be incorporated into a surgical drape to provide information regarding tissue under the drape that may not be immediately visible to the naked eye. For example, a sensor embedded flexible drape may have sensors positioned advantageously to provide improved area-focused data collection. In certain implementations, the sensor embodiments disclosed herein may be incorporated into the border or interior of a drape to create fencing to limit/control the surgical theater.

Sensor embodiments as disclosed herein may also be utilized for pre-surgical assessment. For example, such sensor embodiments may be used to collect information about a potential surgical site, such as by monitoring skin and the underlying tissues for a possible incision site. For example, perfusion levels or other suitable characteristics may be monitored at the surface of the skin and deeper in the tissue to assess whether an individual patient may be at risk for surgical complications. Sensor embodiments such as those disclosed herein may be used to evaluate the presence of microbial infection and provide an indication for the use of antimicrobials. Further, sensor embodiments disclosed herein may collect further information in deeper tissue, such as identifying pressure ulcer damage and/or the fatty tissue levels.

The sensor embodiments disclosed herein may be utilized in cardiovascular monitoring. For example, such sensor embodiments may be incorporated into a flexible cardiovascular monitor that may be placed against the skin to monitor characteristics of the cardiovascular system and communicate such information to another device and/or a caregiver. For example, such a device may monitor pulse rate, oxygenation of the blood, and/or electrical activity of the heart. Similarly, the sensor embodiments disclosed herein may be utilized for neurophysiological applications, such as monitoring electrical activity of neurons.

The sensor embodiments disclosed herein may be incorporated into implantable devices, such as implantable orthopedic implants, including flexible implants. Such sensor embodiments may be configured to collect information regarding the implant site and transmit this information to an external source. An internal source may also provide power for such an implant.

The sensor embodiments disclosed herein may also be utilized for monitoring biochemical activity on the surface of the skin or below the surface of the skin, such as lactose buildup in muscle or sweat production on the surface of the skin. In some cases, other characteristics may be monitored, such as glucose concentration, urine concentration, tissue pressure, skin temperature, skin surface conductivity, skin surface resistivity, skin hydration, skin maceration, and/or skin ripping.

Sensor embodiments as disclosed herein may be incorporated into Ear, Nose, and Throat (ENT) applications. For example, such sensor embodiments may be utilized to monitor recovery from ENT-related surgery, such as wound monitoring within the sinus passage.

Sensor embodiments disclosed herein may encompass sensor printing technology with encapsulation, such as encapsulation with a polymer film. Such a film may be constructed using any polymer described herein, such as polyurethane. Encapsulation of the sensor embodiments may provide waterproofing of the electronics and protection from local tissue, local fluids, and other sources of potential damage.

In certain embodiments, the sensors disclosed herein may be incorporated into an organ protection layer. Such a sensor-embedded organ protection layer may both protect the organ of interest and confirm that the organ protection layer is in position and providing protection. Further, a sensor-embedded organ protection layer may be utilized to monitor the underlying organ, such as by monitoring blood flow, oxygenation, and other suitable markers of organ health. A sensor-enabled organ protection layer may be used to monitor a transplanted organ, such as by monitoring the fat and muscle content of the organ. Further, sensor-enabled organ protection layers may be used to monitor an organ during and after transplant, such as during rehabilitation of the organ.

The sensor embodiments disclosed herein may be incorporated into treatments for wounds (disclosed in greater detail below) or in a variety of other applications. Non-limiting examples of additional applications for the sensor embodiments disclosed herein include: monitoring and treatment of intact skin, cardiovascular applications such as monitoring blood flow, orthopedic applications such as monitoring limb movement and bone repair, neurophysiological applications such as monitoring electrical impulses, and any other tissue, organ, system, or condition that may benefit from improved sensor-enabled monitoring.

Wound Therapy

Some embodiments disclosed herein relate to wound therapy for a human or animal body. Therefore, any reference to a wound herein can refer to a wound on a human or animal body, and any reference to a body herein can refer to a human or animal body. The disclosed technology embodiments may relate to preventing or minimizing damage to physiological tissue or living tissue, or to the treatment of damaged tissue (for example, a wound as described herein) wound with or without reduced pressure, including for example a source of negative pressure and wound dressing components and apparatuses. The apparatuses and components comprising the wound overlay and packing materials or internal layers, if any, are sometimes collectively referred to herein as dressings. In some cases, the wound dressing can be provided to be utilized without reduced pressure.

Some embodiments disclosed herein relate to wound therapy for a human or animal body. Therefore, any reference to a wound herein can refer to a wound on a human or animal body, and any reference to a body herein can refer to a human or animal body. The disclosed technology embodiments may relate to preventing or minimizing damage to physiological tissue or living tissue, or to the treatment of damaged tissue (for example, a wound as described herein).

As used herein the expression "wound" may include an injury to living tissue may be caused by a cut, blow, or other impact, typically one in which the skin is cut or broken. A wound may be a chronic or acute injury. Acute wounds occur as a result of surgery or trauma. They move through the stages of healing within a predicted timeframe. Chronic wounds typically begin as acute wounds. The acute wound can become a chronic wound when it does not follow the healing stages resulting in a lengthened recovery. It is believed that the transition from acute to chronic wound can be due to a patient being immuno-compromised.

Chronic wounds may include for example: venous ulcers (such as those that occur in the legs), which account for the majority of chronic wounds and mostly affect the elderly, diabetic ulcers (for example, foot or ankle ulcers), peripheral arterial disease, pressure ulcers, or epidermolysis bullosa (EB).

Examples of other wounds include, but are not limited to, abdominal wounds or other large or incisional wounds, either as a result of surgery, trauma, sterniotomies, fasciotomies, or other conditions, dehisced wounds, acute wounds, chronic wounds, subacute and dehisced wounds, traumatic wounds, flaps and skin grafts, lacerations, abrasions, contusions, burns, diabetic ulcers, pressure ulcers, stoma, surgical wounds, trauma and venous ulcers or the like.

Wounds may also include a deep tissue injury. Deep tissue injury is a term proposed by the National Pressure Ulcer Advisory Panel (NPUAP) to describe a unique form of pressure ulcers. These ulcers have been described by clinicians for many years with terms such as purple pressure ulcers, ulcers that are likely to deteriorate and bruises on bony prominences.

Wound may also include tissue at risk of becoming a wound as discussed herein. For example, tissue at risk may include tissue over a bony protuberance (at risk of deep tissue injury/insult) or pre-surgical tissue (for example, knee tissue) that may has the potential to be cut (for example, for joint replacement/surgical alteration/reconstruction).

Some embodiments relate to methods of treating a wound with the technology disclosed herein in conjunction with one or more of the following: advanced footwear, turning a patient, offloading (such as, offloading diabetic foot ulcers), treatment of infection, systemix, antimicrobial, antibiotics, surgery, removal of tissue, affecting blood flow, physiotherapy, exercise, bathing, nutrition, hydration, nerve stimulation, ultrasound, electrostimulation, oxygen therapy, microwave therapy, active agents ozone, antibiotics, antimicrobials, or the like.

Alternatively or additionally, a wound may be treated using topical negative pressure (TNP) and/or traditional advanced wound care, which is not aided by the using of applied negative pressure (may also be referred to as non-negative pressure therapy).

Advanced wound care may include use of an absorbent dressing, an occlusive dressing, use of an antimicrobial and/or debriding agents in a wound dressing or adjunct, a pad (for example, a cushioning or compressive therapy, such as stockings or bandages), or the like.

A wound dressing can comprise one or more absorbent layer(s). The absorbent layer may be a foam or a superabsorbent.

The disclosed technology may be used in conjunction with a non-negative pressure dressing. A non-negative pressure wound dressing suitable for providing protection at a wound site may comprise an absorbent layer for absorbing wound exudate and an obscuring element for at least partially obscuring a view of wound exudate absorbed by the absorbent layer in use. The obscuring element may be partially translucent. The obscuring element may be a masking layer.

The non-negative pressure wound dressing can comprise the wound contact layer and the absorbent layer overlies the wound contact layer. The wound contact layer can carry an adhesive portion for forming a substantially fluid tight seal over the wound.

The wound dressing as can further comprise layer of a superabsorbent fiber, or a viscose fiber or a polyester fiber.

The wound dressing can further comprise a backing layer. The backing layer may be a transparent or opaque film. Typically the backing layer comprises a polyurethane film (typically a transparent polyurethane film).

In some cases, the foam may be an open cell foam, or closed cell foam, typically an open cell foam. The foam can be hydrophilic.

The wound dressing may comprise a transmission layer and the layer can be foam. The transmission layer may be a polyurethane foam laminated to a polyurethane film.

The non-negative pressure wound dressing may be a compression bandage. Compression bandages are known for use in the treatment of oedema and other venous and lymphatic disorders, e.g., of the lower limbs. The compression bandage may comprise a bandage system comprising an inner skin facing layer and an elastic outer layer, the inner layer comprising a first ply of foam and a second ply of an absorbent nonwoven web, the inner layer and outer layer being sufficiently elongated so as to be capable of being wound about a patient's limb.

Negative Pressure Wound Therapy

In some cases, treatment of wounds can be performed using negative pressure wound therapy. It will be understood that embodiments of the present disclosure are generally applicable to use in TNP systems. Briefly, negative pressure wound therapy assists in the closure and healing of many forms of "hard to heal" wounds by reducing tissue oedema; encouraging blood flow and granular tissue formation; removing excess exudate and may reduce bacterial load (and thus infection risk). In addition, the therapy allows for less disturbance of a wound leading to more rapid healing. TNP therapy systems may also assist on the healing of surgically closed wounds by removing fluid and by helping to stabilize the tissue in the apposed position of closure. A further beneficial use of TNP therapy can be found in grafts and flaps where removal of excess fluid is important and close proximity of the graft to tissue is required in order to ensure tissue viability.

Negative pressure therapy can be used for the treatment of open or chronic wounds that are too large to spontaneously close or otherwise fail to heal by means of applying negative pressure to the site of the wound. Topical negative pressure (TNP) therapy or negative pressure wound therapy (NPWT) involves placing a cover that is impermeable or semi-permeable to fluids over the wound, using various means to seal the cover to the tissue of the patient surrounding the wound, and connecting a source of negative pressure (such as a vacuum pump) to the cover in a manner so that negative pressure is created and maintained under the cover. It is believed that such negative pressures promote wound healing by facilitating the formation of granulation tissue at the wound site and assisting the body's normal inflammatory process while simultaneously removing excess fluid, which may contain adverse cytokines or bacteria.

Some of the dressings used in NPWT can include many different types of materials and layers, for example, gauze, pads, foam pads or multi-layer wound dressings. One example of a multi-layer wound dressing is the PICO dressing, available from Smith & Nephew, includes a wound contact layer and a superabsorbent layer beneath a backing layer to provide a canister-less system for treating a wound with NPWT. The wound dressing may be sealed to a suction port providing connection to a length of tubing, which may be used to pump fluid out of the dressing or to transmit negative pressure from a pump to the wound dressing. Additionally, RENASYS-F, RENASYS-G, RENASYS-AB, and RENASYS-F/AB, available from Smith & Nephew, are additional examples of NPWT wound dressings and systems. Another example of a multi-layer wound dressing is the ALLEVYN Life dressing, available from Smith & Nephew, which includes a moist wound environment dressing that is used to treat the wound without the use of negative pressure.

As is used herein, reduced or negative pressure levels, such as −X mmHg, represent pressure levels relative to normal ambient atmospheric pressure, which can correspond to 760 mmHg (or 1 atm, 29.93 inHg, 101.325 kPa, 14.696 psi, etc.). Accordingly, a negative pressure value of −X mmHg reflects absolute pressure that is X mmHg below 760 mmHg or, in other words, an absolute pressure of (760−X) mmHg. In addition, negative pressure that is "less" or "smaller" than X mmHg corresponds to pressure that is closer to atmospheric pressure (such as, −40 mmHg is less than −60 mmHg). Negative pressure that is "more" or "greater" than −X mmHg corresponds to pressure that is further from atmospheric pressure (such as, −80 mmHg is more than −60 mmHg). In some cases, local ambient atmospheric pressure is used as a reference point, and such local atmospheric pressure may not necessarily be, for example, 760 mmHg.

In some implementations of wound closure devices described herein, increased wound contraction can lead to increased tissue expansion in the surrounding wound tissue. This effect may be increased by varying the force applied to the tissue, for example by varying the negative pressure applied to the wound over time, possibly in conjunction with increased tensile forces applied to the wound via embodiments of the wound closure devices. In some cases, negative pressure may be varied over time for example using a sinusoidal wave, square wave, or in synchronization with one or more physiological indices (such as, heartbeat).

Any of the embodiments disclosed herein can be used in combination with any of the features disclosed in one or more of WO2010/061225, US2016/114074, US2006/0142560, and U.S. Pat. No. 5,703,225, which describe absorbent materials; WO2013/007973, which describes non-negative pressure wound dressings; GB1618298.2 (filed on 28 Oct. 2016), GB1621057.7 (filed on 12 Dec. 2016), and GB1709987.0 (filed on 22 Jun. 2017), which describe multi-layered wound dressings; EP2498829 and EP1718257, which describe wound dressings; WO2006/110527, U.S. Pat. No. 6,759,566, and US2002/0099318, which describe compression bandages; U.S. Pat. Nos. 8,235,955 and 7,753,894, which describe wound closure devices; WO2013/175306, WO2016/174048, US2015/0190286, US2011/0282309, and US2016/0339158, which describe negative pressure wound therapy dressings, wound dressing components, wound treatment apparatuses, and methods. The disclosure of each of these applications is hereby incorporated by reference in its entirety.

NPWT System Overview

FIG. 1A illustrates an embodiment of a negative or reduced pressure wound treatment (or TNP) system 102 comprising a wound filler 108 placed inside a wound cavity 104, the wound cavity sealed by a wound cover 106. The wound filler 108 in combination with the wound cover 106 can be referred to as wound dressing. A single or multi lumen tube or conduit 112 is connected the wound cover 106 with a pump assembly 114 configured to supply reduced pressure. The wound cover 106 can be in fluidic communication with the wound cavity 104. In any of the system embodiments disclosed herein, as in the embodiment illustrated in FIG. 1A, the pump assembly can be a canisterless pump assembly (meaning that exudate is collected in the wound dressing or is transferred via tube 112 for collection to another location). However, any of the pump assembly embodiments disclosed herein can be configured to include or support a canister. Additionally, in any of the system embodiments disclosed herein, any of the pump assembly embodiments can be mounted to or supported by the dressing, or adjacent to the dressing.

The wound filler 108 can be any suitable type, such as hydrophilic or hydrophobic foam, gauze, inflatable bag, and so on. The wound filler 108 can be conformable to the wound cavity 104 such that it substantially fills the cavity. The wound cover 106 can provide a substantially fluid impermeable seal over the wound cavity 104. The wound cover 106 can have a top side and a bottom side, and the bottom side adhesively (or in any other suitable manner) seals with wound cavity 104. The conduit 112 or lumen or any other conduit or lumen disclosed herein can be formed from polyurethane, PVC, nylon, polyethylene, silicone, or any other suitable material.

The wound cover 106 can have a port (not shown) configured to receive an end of the conduit 112. For example, the port can be RENASYS Soft Port available from Smith & Nephew. In other embodiments, the conduit 112 can otherwise pass through or under the wound cover 106 to supply reduced pressure to the wound cavity 104 so as to maintain a desired level of reduced pressure in the wound cavity. The conduit 112 can be any suitable article configured to provide at least a substantially sealed fluid flow pathway between the pump assembly 114 and the wound cover 106, so as to supply the reduced pressure provided by the pump assembly 114 to wound cavity 104.

The wound cover 106 and the wound filler 108 can be provided as a single article or an integrated single unit. In some cases, no wound filler is provided and the wound cover by itself may be considered the wound dressing. The wound dressing may then be connected, via the conduit 112, to a source of negative pressure, such as the pump assembly 114. The pump assembly 114 can be miniaturized and portable, although larger conventional pumps such can also be used.

The wound cover 106 can be located over a wound site to be treated. The wound cover 106 can form a substantially sealed cavity or enclosure over the wound site. In some cases, the wound cover 106 can be configured to have a film having a high water vapor permeability to enable the evaporation of surplus fluid, and can have a superabsorbing material contained therein to safely absorb wound exudate. It will be appreciated that throughout this specification reference is made to a wound. In this sense it is to be understood that the term wound is to be broadly construed and encompasses open and closed wounds in which skin is torn, cut or punctured or where trauma causes a contusion, or any other surficial or other conditions or imperfections on the skin of a patient or otherwise that benefit from reduced pressure treatment. A wound is thus broadly defined as any damaged region of tissue where fluid may or may not be produced. Examples of such wounds include, but are not limited to, acute wounds, chronic wounds, surgical incisions and other incisions, subacute and dehisced wounds, traumatic wounds, flaps and skin grafts, lacerations, abrasions, contusions, burns, diabetic ulcers, pressure ulcers, stoma, surgical wounds, trauma and venous ulcers or the like. The components of the TNP system described herein can be particularly suited for incisional wounds that exude a small amount of wound exudate.

Some embodiments of the system are designed to operate without the use of an exudate canister. Some embodiments can be configured to support an exudate canister. In some cases, configuring the pump assembly 114 and tubing 112 so that the tubing 112 can be quickly and easily removed from the pump assembly 114 can facilitate or improve the process of dressing or pump changes, if necessary. Any of the pump embodiments disclosed herein can be configured to have any suitable connection between the tubing and the pump.

The pump assembly 114 can be configured to deliver negative pressure of approximately −80 mmHg, or between about −20 mmHg and 200 mmHg in some implementations. Note that these pressures are relative to normal ambient atmospheric pressure thus, −200 mmHg would be about 560 mmHg in practical terms. The pressure range can be between about −40 mmHg and −150 mmHg. Alternatively a pressure range of up to −75 mmHg, up to −80 mmHg or over −80 mmHg can be used. Also a pressure range of below −75 mmHg can be used. Alternatively a pressure range of over approximately −100 mmHg, or even 150 mmHg, can be supplied by the pump assembly 114.

In operation, the wound filler 108 is inserted into the wound cavity 104 and wound cover 106 is placed so as to seal the wound cavity 104. The pump assembly 114 provides a source of a negative pressure to the wound cover 106, which is transmitted to the wound cavity 104 via the wound filler 108. Fluid (such as, wound exudate) is drawn through the conduit 112, and can be stored in a canister. In some cases, fluid is absorbed by the wound filler 108 or one or more absorbent layers (not shown).

Wound dressings that may be utilized with the pump assembly and other embodiments of the present application include RENASYS-F, RENASYS-G, RENASYS AB, and Pico Dressings available from Smith & Nephew. Further description of such wound dressings and other components of a negative pressure wound therapy system that may be used with the pump assembly and other embodiments of the present application are found in U.S. Patent Publication Nos. 2011/0213287, 2011/0282309, 2012/0116334, 2012/0136325, and 2013/0110058, which are incorporated by reference in their entirety. In other embodiments, other suitable wound dressings can be utilized.

Wound Dressing Overview

Figure 1B:
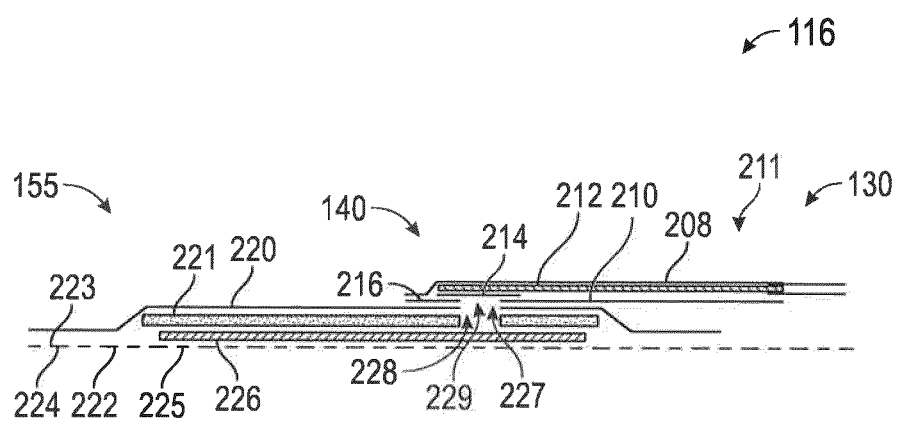
FIG. 1B illustrates a wound dressing.

FIG. 1B illustrates a cross-section through a wound dressing 155. FIG. 1B also illustrates a fluidic connector 116. The wound dressing 155 can be similar to the wound dressing described in International Patent Publication WO2013175306 A2, which is incorporated by reference in its entirety. Alternatively, the wound dressing 155 can be any wound dressing embodiment disclosed herein or any combination of features of any number of wound dressing embodiments disclosed herein, can be located over a wound site to be treated. The wound dressing 155 may be placed as to form a sealed cavity over the wound, such as the wound cavity 104. In some cases, the wound dressing 155 includes a top or cover layer, or backing layer 220 attached to an optional wound contact layer 222, both of which are described in greater detail below. These two layers 220, 222 can be joined or sealed together so as to define an interior space or chamber. This interior space or chamber may comprise additional structures that may be adapted to distribute or transmit negative pressure, store wound exudate and other fluids removed from the wound, and other functions which will be explained in greater detail below. Examples of such structures, described below, include a transmission layer 226 and an absorbent layer 221.

As used herein the upper layer, top layer, or layer above refers to a layer furthest from the surface of the skin or wound while the dressing is in use and positioned over the wound. Accordingly, the lower surface, lower layer, bottom layer, or layer below refers to the layer that is closest to the surface of the skin or wound while the dressing is in use and positioned over the wound.

The wound contact layer 222 can be a polyurethane layer or polyethylene layer or other flexible layer which is perforated, for example via a hot pin process, laser ablation process, ultrasound process or in some other way or otherwise made permeable to liquid and gas. The wound contact layer 222 has a lower surface 224 (for example, facing the wound) and an upper surface 223 (for example, facing away from the wound). The perforations 225 can comprise through holes in the wound contact layer 222 which enable fluid to flow through the layer 222. The wound contact layer 222 helps prevent tissue ingrowth into the other material of the wound dressing. In some cases, the perforations are small enough to meet this requirement while still allowing fluid to flow therethrough. For example, perforations formed as slits or holes having a size ranging from 0.025 mm to 1.2 mm are considered small enough to help prevent tissue ingrowth into the wound dressing while allowing wound exudate to flow into the dressing. In some configurations, the wound contact layer 222 may help maintain the integrity of the entire dressing 155 while also creating an air tight seal around the absorbent pad in order to maintain negative pressure at the wound. In some cases, the wound contact layer is configured to allow unidirectional or substantially one-way or unidirectional flow of fluid through the wound contact layer when negative pressure is applied to the wound. For example, the wound contact layer can permit fluid to flow away from the wound through the wound contact layer, but not allow fluid to flow back toward the wound. In certain cases, the perforations in the wound contact layer are configured to permit such one-way or unidirectional flow of fluid through the wound contact layer.

The wound contact layer 222 may also act as a carrier for an optional lower and upper adhesive layer (not shown). For example, a lower pressure sensitive adhesive may be provided on the lower surface 224 of the wound dressing 155 whilst an upper pressure sensitive adhesive layer may be provided on the upper surface 223 of the wound contact layer. The pressure sensitive adhesive, which may be a silicone, hot melt, hydrocolloid or acrylic based adhesive or other such adhesives, may be formed on both sides or optionally on a selected one or none of the sides of the wound contact layer. When a lower pressure sensitive adhesive layer is utilized may be helpful to adhere the wound dressing 155 to the skin around a wound site. In some cases, the wound contact layer may comprise perforated polyurethane film. The lower surface of the film may be provided with a silicone pressure sensitive adhesive and the upper surface may be provided with an acrylic pressure sensitive adhesive, which may help the dressing maintain its integrity. In some cases, a polyurethane film layer may be provided with an adhesive layer on both its upper surface and lower surface, and all three layers may be perforated together.

A layer 226 of porous material can be located above the wound contact layer 222. This porous layer, or transmission layer, 226 allows transmission of fluid including liquid and gas away from a wound site into upper layers of the wound dressing. In particular, the transmission layer 226 can ensure that an open air channel can be maintained to communicate negative pressure over the wound area even when the absorbent layer has absorbed substantial amounts of exudates. The layer 226 can remain open under the typical pressures that will be applied during negative pressure wound therapy as described above, so that the whole wound site sees an equalized negative pressure. The layer 226 may be formed of a material having a three dimensional structure. For example, a knitted or woven spacer fabric (for example Baltex 7970 weft knitted polyester) or a non-woven fabric could be used.

In some cases, the transmission layer 226 comprises a 3D polyester spacer fabric layer including a top layer (that is to say, a layer distal from the wound-bed in use) which is a 84/144 textured polyester, and a bottom layer (that is to say, a layer which lies proximate to the wound bed in use) which is a 10 denier flat polyester and a third layer formed sandwiched between these two layers which is a region defined by a knitted polyester viscose, cellulose or the like monofilament fiber. Other materials and other linear mass densities of fiber could of course be used.

Whilst reference is made throughout this disclosure to a monofilament fiber it will be appreciated that a multistrand alternative could of course be utilized. The top spacer fabric thus has more filaments in a yarn used to form it than the number of filaments making up the yarn used to form the bottom spacer fabric layer.

This differential between filament counts in the spaced apart layers helps control moisture flow across the transmission layer. Particularly, by having a filament count greater in the top layer, that is to say, the top layer is made from a yarn having more filaments than the yarn used in the bottom layer, liquid tends to be wicked along the top layer more than the bottom layer. In use, this differential tends to draw liquid away from the wound bed and into a central region of the dressing where the absorbent layer 221 helps lock the liquid away or itself wicks the liquid onwards towards the cover layer where it can be transpired.

In some cases, to improve the liquid flow across the transmission layer 226 (that is to say perpendicular to the channel region formed between the top and bottom spacer layers, the 3D fabric may be treated with a dry cleaning agent (such as, but not limited to, Perchloro Ethylene) to help remove any manufacturing products such as mineral oils, fats or waxes used previously which might interfere with the hydrophilic capabilities of the transmission layer.

An additional manufacturing step can subsequently be carried in which the 3D spacer fabric is washed in a hydrophilic agent (such as, but not limited to, Feran Ice 30 g/l available from the Rudolph Group). This process step helps ensure that the surface tension on the materials is so low that liquid such as water can enter the fabric as soon as it contacts the 3D knit fabric. This also aids in controlling the flow of the liquid insult component of any exudates.

A layer 221 of absorbent material can be provided above the transmission layer 226. The absorbent material, which comprise a foam or non-woven natural or synthetic material, and which may optionally comprise a super-absorbent material, forms a reservoir for fluid, particularly liquid, removed from the wound site. In some cases, the layer 221 may also aid in drawing fluids towards the backing layer 220.

The material of the absorbent layer 221 may also prevent liquid collected in the wound dressing 155 from flowing freely within the dressing, and can act so as to contain any liquid collected within the dressing. The absorbent layer 221 also helps distribute fluid throughout the layer via a wicking action so that fluid is drawn from the wound site and stored throughout the absorbent layer. This helps prevent agglomeration in areas of the absorbent layer. The capacity of the absorbent material must be sufficient to manage the exudates flow rate of a wound when negative pressure is applied. Since in use the absorbent layer experiences negative pressures the material of the absorbent layer is chosen to absorb liquid under such circumstances. A number of materials exist that are able to absorb liquid when under negative pressure, for example superabsorber material. The absorbent layer 221 may typically be manufactured from ALLEVYN™ foam, Freudenberg 114-224-4 or Chem-Posite™ 11C-450. In some cases, the absorbent layer 221 may comprise a composite comprising superabsorbent powder, fibrous material such as cellulose, and bonding fibers. In some cases, the composite is an airlaid, thermally-bonded composite.

In some cases, the absorbent layer 221 is a layer of non-woven cellulose fibers having super-absorbent material in the form of dry particles dispersed throughout. Use of the cellulose fibers introduces fast wicking elements which help quickly and evenly distribute liquid taken up by the dressing. The juxtaposition of multiple strand-like fibers leads to strong capillary action in the fibrous pad which helps distribute liquid. In this way, the super-absorbent material is efficiently supplied with liquid. The wicking action also assists in bringing liquid into contact with the upper cover layer to aid increase transpiration rates of the dressing.

An aperture, hole, or orifice 227 can be provided in the backing layer 220 to allow a negative pressure to be applied to the dressing 155. In some cases, the fluidic connector 116 is attached or sealed to the top of the backing layer 220 over the orifice 227 made into the dressing 155, and communicates negative pressure through the orifice 227. A length of tubing may be coupled at a first end to the fluidic connector 116 and at a second end to a pump unit (not shown) to allow fluids to be pumped out of the dressing. Where the fluidic connector is adhered to the top layer of the wound dressing, a length of tubing may be coupled at a first end of the fluidic connector such that the tubing, or conduit, extends away from the fluidic connector parallel or substantially to the top surface of the dressing. The fluidic connector 116 may be adhered and sealed to the backing layer 220 using an adhesive such as an acrylic, cyanoacrylate, epoxy, UV curable or hot melt adhesive. The fluidic connector 116 may be formed from a soft polymer, for example a polyethylene, a polyvinyl chloride, a silicone or polyurethane having a hardness of 30 to 90 on the Shore A scale. In some cases, the fluidic connector 116 may be made from a soft or conformable material.

In some cases, the absorbent layer 221 includes at least one through hole 228 located so as to underlie the fluidic connector 116. The through hole 228 may be the same size as the opening 227 in the backing layer, or may be bigger or smaller. As illustrated in FIG. 1B a single through hole can be used to produce an opening underlying the fluidic connector 116. It will be appreciated that multiple openings could alternatively be utilized. Additionally should more than one port be utilized according to certain embodiments of the present disclosure one or multiple openings may be made in the absorbent layer and the obscuring layer in registration with each respective fluidic connector. Although not essential to certain embodiments of the present disclosure the use of through holes in the super-absorbent layer may provide a fluid flow pathway which remains unblocked in particular when the absorbent layer is near saturation.

The aperture or through-hole 228 can be provided in the absorbent layer 221 beneath the orifice 227 such that the orifice is connected directly to the transmission layer 226 as illustrated in FIG. 1B. This allows the negative pressure applied to the fluidic connector 116 to be communicated to the transmission layer 226 without passing through the absorbent layer 221. This ensures that the negative pressure applied to the wound site is not inhibited by the absorbent layer as it absorbs wound exudates. In other embodiments, no aperture may be provided in the absorbent layer 221, or alternatively a plurality of apertures underlying the orifice 227 may be provided. In further alternative embodiments, additional layers such as another transmission layer or an obscuring layer such as described in International Patent Publication WO2014020440, the entirety of which is hereby incorporated by reference, may be provided over the absorbent layer 221 and beneath the backing layer 220.

The backing layer 220 is can be gas impermeable, but moisture vapor permeable, and can extend across the width of the wound dressing 155. The backing layer 220, which may for example be a polyurethane film (for example, Elastollan SP9109) having a pressure sensitive adhesive on one side, is impermeable to gas and this layer thus operates to cover the wound and to seal a wound cavity over which the wound dressing is placed. In this way an effective chamber is made between the backing layer 220 and a wound site where a negative pressure can be established. The backing layer 220 can be sealed to the wound contact layer 222 in a border region around the circumference of the dressing, ensuring that no air is drawn in through the border area, for example via adhesive or welding techniques. The backing layer 220 protects the wound from external bacterial contamination (bacterial barrier) and allows liquid from wound exudates to be transferred through the layer and evaporated from the film outer surface. The backing layer 220 can include two layers; a polyurethane film and an adhesive pattern spread onto the film. The polyurethane film can be moisture vapor permeable and may be manufactured from a material that has an increased water transmission rate when wet. The moisture vapor permeability of the backing layer can increase when the backing layer becomes wet. The moisture vapor permeability of the wet backing layer may be up to about ten times more than the moisture vapor permeability of the dry backing layer.

The absorbent layer 221 may be of a greater area than the transmission layer 226, such that the absorbent layer overlaps the edges of the transmission layer 226, thereby ensuring that the transmission layer does not contact the backing layer 220. This provides an outer channel of the absorbent layer 221 that is in direct contact with the wound contact layer 222, which aids more rapid absorption of exudates to the absorbent layer. Furthermore, this outer channel ensures that no liquid is able to pool around the circumference of the wound cavity, which may otherwise seep through the seal around the perimeter of the dressing leading to the formation of leaks. As illustrated in FIG. 1B, the absorbent layer 221 may define a smaller perimeter than that of the backing layer 220, such that a boundary or border region is defined between the edge of the absorbent layer 221 and the edge of the backing layer 220.

As shown in FIG. 1B, the wound dressing 155 can comprise an aperture 228 in the absorbent layer 221 situated underneath the fluidic connector 116. In use, for example when negative pressure is applied to the dressing 155, a wound facing portion of the fluidic connector may thus come into contact with the transmission layer 226, which can thus aid in transmitting negative pressure to the wound site even when the absorbent layer 221 is filled with wound fluids. The backing layer 220 may be at least partly adhered to the transmission layer 226. In some cases, the aperture 228 is at least 1-2 mm larger than the diameter of the wound facing portion of the fluidic connector 11, or the orifice 227.

For example, in embodiments with a single fluidic connector 116 and through hole, it may be preferable for the fluidic connector 116 and through hole to be located in an off-center position. Such a location may permit the dressing 155 to be positioned onto a patient such that the fluidic connector 116 is raised in relation to the remainder of the dressing 155. So positioned, the fluidic connector 116 and the filter 214 may be less likely to come into contact with wound fluids that could prematurely occlude the filter 214 so as to impair the transmission of negative pressure to the wound site.

Turning now to the fluidic connector 116, the connector can include a sealing surface 216, a bridge 211 with a proximal end (closer to the negative pressure source) and a distal end 140, and a filter 214. The sealing surface 216 can form the applicator that is sealed to the top surface of the wound dressing. A bottom layer of the fluidic connector 116 may comprise the sealing surface 216. The fluidic connector 116 may further comprise an upper surface vertically spaced from the sealing surface 216, which in some cases is defined by a separate upper layer of the fluidic connector. In other embodiments the upper surface and the lower surface may be formed from the same piece of material. The sealing surface 216 may comprise at least one aperture 229 therein to communicate with the wound dressing. The filter 214 may be positioned across the opening 229 in the sealing surface, and may span the entire opening 229. The sealing surface 216 may be configured for sealing the fluidic connector to the cover layer of the wound dressing, and may comprise an adhesive or weld. The sealing surface 216 may be placed over an orifice in the cover layer with optional spacer elements 215 configured to create a gap between the filter 214 and the transmission layer 226. In other embodiments, the sealing surface 216 may be positioned over an orifice in the cover layer and an aperture in the absorbent layer 220, permitting the fluidic connector 116 to provide air flow through the transmission layer 226. The bridge 211 may comprise a first fluid passage 212 in communication with a source of negative pressure, the first fluid passage 212 comprising a porous material, such as a 3D knitted material, which may be the same or different than the porous layer 226 described previously. The bridge 211 can be encapsulated by at least one flexible film layer 208, 210 having a proximal and distal end and configured to surround the first fluid passage 212, the distal end of the flexible film being connected the sealing surface 216. The filter 214 is configured to substantially prevent wound exudate from entering the bridge, and spacer elements 215 are configured to prevent the fluidic connector from contacting the transmission layer 226. These elements will be described in greater detail below.

Some implementations may further comprise an optional second fluid passage positioned above the first fluid passage 212. For example, an air leak may be disposed at the proximal end of the top layer that is configured to provide an air path into the first fluid passage 212 and dressing 155 similar to the suction adapter as described in U.S. Pat. No. 8,801,685, which is incorporated by reference herein in its entirety.

The fluid passage 212 can be constructed from a compliant material that is flexible and that also permits fluid to pass through it if the spacer is kinked or folded over. Suitable materials for the fluid passage 212 include without limitation foams, including open-cell foams such as polyethylene or polyurethane foam, meshes, 3D knitted fabrics, non-woven materials, and fluid channels. The fluid passage 212 may be constructed from materials similar to those described above in relation to the transmission layer 226. Advantageously, such materials used in the fluid passage 212 not only permit greater patient comfort, but may also provide greater kink resistance, such that the fluid passage 212 is still able to transfer fluid from the wound toward the source of negative pressure while being kinked or bent.

The fluid passage 212 may be comprised of a wicking fabric, for example a knitted or woven spacer fabric (such as a knitted polyester 3D fabric, Baltex 7970®, or Gehring 879®) or a nonwoven fabric. These materials selected can be suited to channeling wound exudate away from the wound and for transmitting negative pressure or vented air to the wound site, and may also confer a degree of kinking or occlusion resistance to the fluid passage 212. The wicking fabric may have a three-dimensional structure, which in some cases may aid in wicking fluid or transmitting negative pressure. In certain embodiments, including wicking fabrics, these materials remain open and capable of communicating negative pressure to a wound area under the typical pressures used in negative pressure therapy, for example between −40 to −150 mmHg. The wicking fabric may comprise several layers of material stacked or layered over each other, which may in some cases be useful in preventing the fluid passage 212 from collapsing under the application of negative pressure. In other embodiments, the wicking fabric used in the fluid passage 212 may be between 1.5 mm and 6 mm; more preferably, the wicking fabric may be between 3 mm and 6 mm thick, and may be comprised of either one or several individual layers of wicking fabric. In other embodiments, the fluid passage 212 may be between 1.2-3 mm thick, and preferably thicker than 1.5 mm. For example a suction adapter used with a dressing which retains liquid such as wound exudate, may employ hydrophobic layers in the fluid passage 212, and only gases may travel through the fluid passage 212. Additionally, and as described previously, the materials used in the system can be conformable and soft, which may help to avoid pressure ulcers and other complications which may result from a wound treatment system being pressed against the skin of a patient.

In some cases, the filter element 214 is impermeable to liquids, but permeable to gases, and is provided to act as a liquid barrier and to ensure that no liquids are able to escape from the wound dressing 155. The filter element 214 may also function as a bacterial barrier. Typically the pore size is 0.2 μm. Suitable materials for the filter material of the filter element 214 include 0.2 micron Gore™ expanded PTFE from the MMT range, PALL Versapore™ 200R, and Donaldson™ TX6628. Larger pore sizes can also be used but these may require a secondary filter layer to ensure full bioburden containment. As wound fluid contains lipids it is preferable, though not essential, to use an oleophobic filter membrane for example 1.0 micron MMT-332 prior to 0.2 micron MMT-323. This prevents the lipids from blocking the hydrophobic filter. The filter element can be attached or sealed to the port or the cover film over the orifice. For example, the filter element 214 may be molded into the fluidic connector 116, or may be adhered to one or both of the top of the cover layer and bottom of the suction adapter 160 using an adhesive such as, but not limited to, a UV cured adhesive.

It will be understood that other types of material could be used for the filter element 214. More generally a microporous membrane can be used which is a thin, flat sheet of polymeric material, this contains billions of microscopic pores. Depending upon the membrane chosen these pores can range in size from 0.01 to more than 10 micrometers. Microporous membranes are available in both hydrophilic (water filtering) and hydrophobic (water repellent) forms. In some cases, filter element 214 comprises a support layer and an acrylic co-polymer membrane formed on the support layer. In some cases, the wound dressing 155 uses microporous hydrophobic membranes (MHMs). Numerous polymers may be employed to form MHMs. For example, the MHMs may be formed from one or more of PTFE, polypropylene, PVDF and acrylic copolymer. All of these optional polymers can be treated in order to obtain specific surface characteristics that can be both hydrophobic and oleophobic. As such these will repel liquids with low surface tensions such as multi-vitamin infusions, lipids, surfactants, oils and organic solvents.

MHMs block liquids whilst allowing air to flow through the membranes. They are also highly efficient air filters eliminating potentially infectious aerosols and particles. A single piece of MHM is well known as an option to replace mechanical valves or vents. Incorporation of MHMs can thus reduce product assembly costs improving profits and costs/benefit ratio to a patient.

The filter element 214 may also include an odor absorbent material, for example activated charcoal, carbon fiber cloth or Vitec Carbotec-RT Q2003073 foam, or the like. For example, an odor absorbent material may form a layer of the filter element 214 or may be sandwiched between microporous hydrophobic membranes within the filter element. The filter element 214 thus enables gas to be exhausted through the orifice. Liquid, particulates and pathogens however are contained in the dressing.

The wound dressing 155 may comprise spacer elements 215 in conjunction with the fluidic connector 116 and the filter 214. With the addition of such spacer elements 215 the fluidic connector 116 and filter 214 may be supported out of direct contact with the absorbent layer 220 or the transmission layer 226. The absorbent layer 220 may also act as an additional spacer element to keep the filter 214 from contacting the transmission layer 226. Accordingly, with such a configuration contact of the filter 214 with the transmission layer 226 and wound fluids during use may thus be minimized.

Similar to the embodiments of wound dressings described above, some wound dressings comprise a perforated wound contact layer with silicone adhesive on the skin-contact face and acrylic adhesive on the reverse. Above this bordered layer sits a transmission layer or a 3D spacer fabric pad. Above the transmission layer, sits an absorbent layer. The absorbent layer can include a superabsorbent non-woven (NW) pad. The absorbent layer can over-border the transmission layer by approximately 5 mm at the perimeter. The absorbent layer can have an aperture or through-hole toward one end. The aperture can be about 10 mm in diameter. Over the transmission layer and absorbent layer lies a backing layer. The backing layer can be a high moisture vapor transmission rate (MVTR) film, pattern coated with acrylic adhesive. The high MVTR film and wound contact layer encapsulate the transmission layer and absorbent layer, creating a perimeter border of approximately 20 mm. The backing layer can have a 10 mm aperture that overlies the aperture in the absorbent layer. Above the hole can be bonded a fluidic connector that comprises a liquid-impermeable, gas-permeable semi-permeable membrane (SPM) or filter that overlies the aforementioned apertures.

Figure 1C:
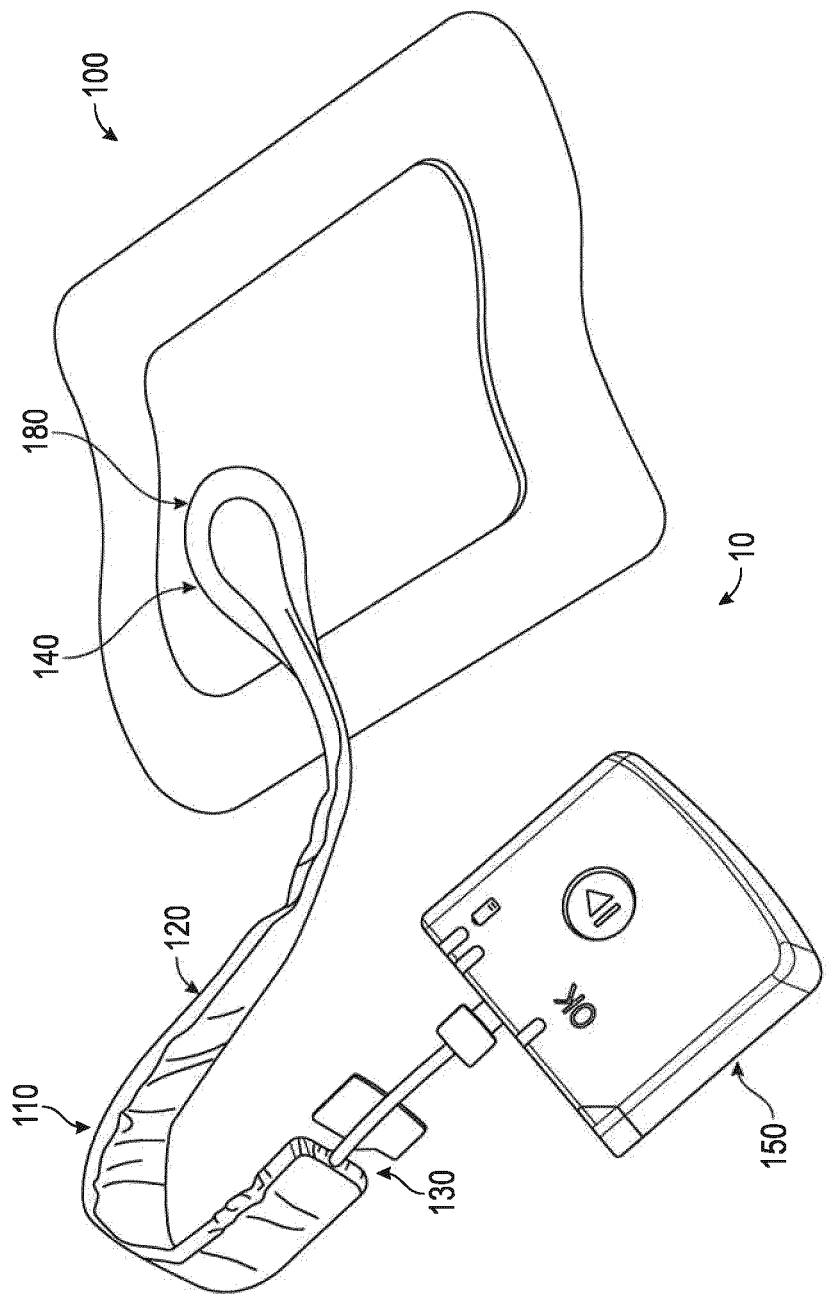
FIG. 1C illustrates a negative pressure wound treatment system employing a flexible fluidic connector and a wound dressing capable of absorbing and storing wound exudate.
Figure 1D:
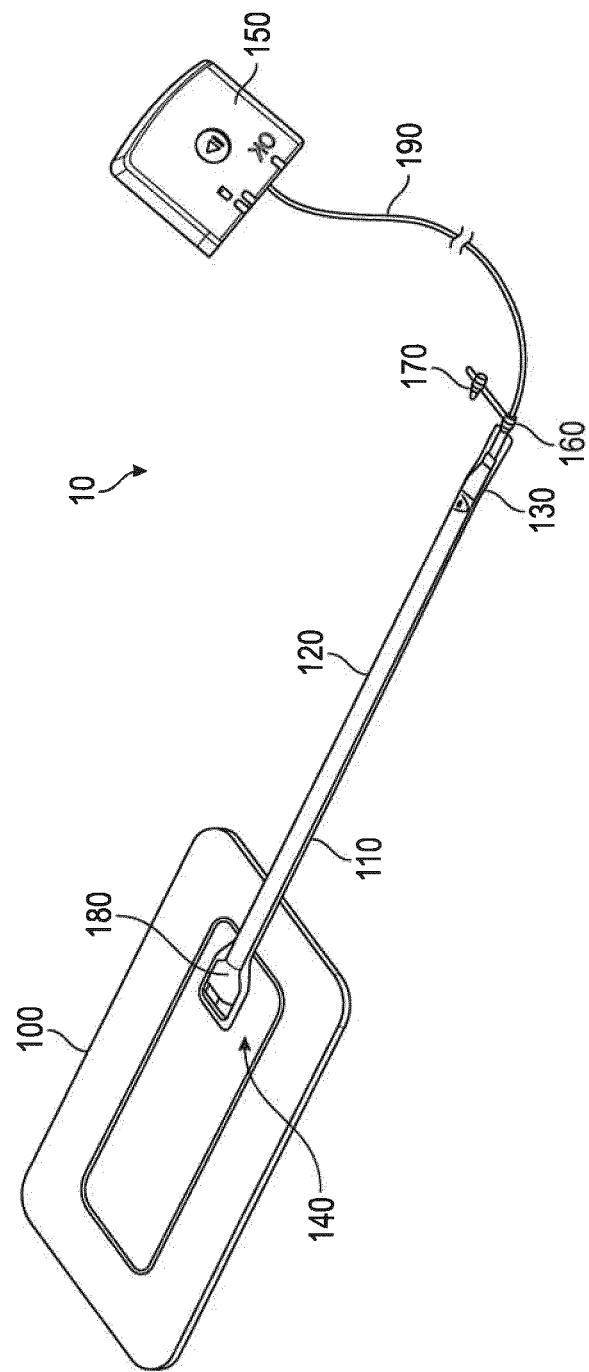
FIG. 1D illustrates a negative pressure wound treatment system employing a flexible fluidic connector.

FIGS. 1C-1D illustrate embodiments of a negative pressure wound treatment system 10 employing a wound dressing 100 in conjunction with a fluidic connector 110. Here, the fluidic connector 110 may comprise an elongate conduit, for example, a bridge 120 having a proximal end 130 and a distal end 140, and an applicator 180 at the distal end 140 of the bridge 120. An optional coupling 160 can be disposed at the proximal end 130 of the bridge 120. A cap 170 may be provided with the system (and can in some cases, as illustrated, be attached to the coupling 160). The cap 170 can be useful in preventing fluids from leaking out of the proximal end 130. The system 10 may include a source of negative pressure such as a pump or negative pressure unit 150 capable of supplying negative pressure. The pump may comprise a canister or other container for the storage of wound exudates and other fluids that may be removed from the wound. A canister or container may also be provided separate from the pump. In some cases, such as illustrated in FIGS. 1A-1B, the pump 150 can be a canisterless pump such as the PICO™ pump, as sold by Smith & Nephew. The pump 150 may be connected to the coupling 160 via a tube 190, or the pump 150 may be connected directly to the coupling 160 or directly to the bridge 120. In use, the dressing 100 is placed over a suitably-prepared wound, which may in some cases be filled with a wound packing material such as foam or gauze. The applicator 180 of the fluidic connector 110 has a sealing surface that is placed over an aperture in the dressing 100 and is sealed to the top surface of the dressing 100. Either before, during, or after connection of the fluidic connector 110 to the dressing 100, the pump 150 is connected via the tube 190 to the coupling 160, or is connected directly to the coupling 160 or to the bridge 120. The pump is then activated, thereby supplying negative pressure to the wound. Application of negative pressure may be applied until a desired level of healing of the wound is achieved.

Figure 1E:
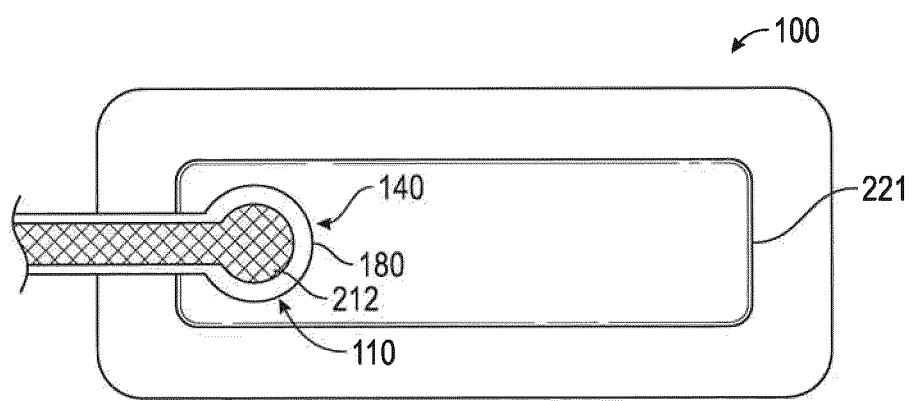
FIG. 1E illustrates a negative pressure wound treatment system employing a flexible fluidic connector and a wound dressing capable of absorbing and storing wound exudate.

As shown in FIG. 1E, the fluidic connector 110 comprises an enlarged distal end, or head 140 that is in fluidic communication with the dressing 100 as will be described in further detail below. In one embodiment, the enlarged distal end has a round or circular shape. The head 140 is illustrated here as being positioned near an edge of the dressing 100, but may also be positioned at any location on the dressing. For example, some implementations may provide for a centrally or off-centered location not on or near an edge or corner of the dressing 100. The dressing 100 may comprise two or more fluidic connectors 110, each comprising one or more heads 140, in fluidic communication therewith. In an embodiment, the head 140 may measure 30 mm along its widest edge. The head 140 forms at least in part the applicator 180, described above, that is configured to seal against a top surface of the wound dressing.

Figure 1F:
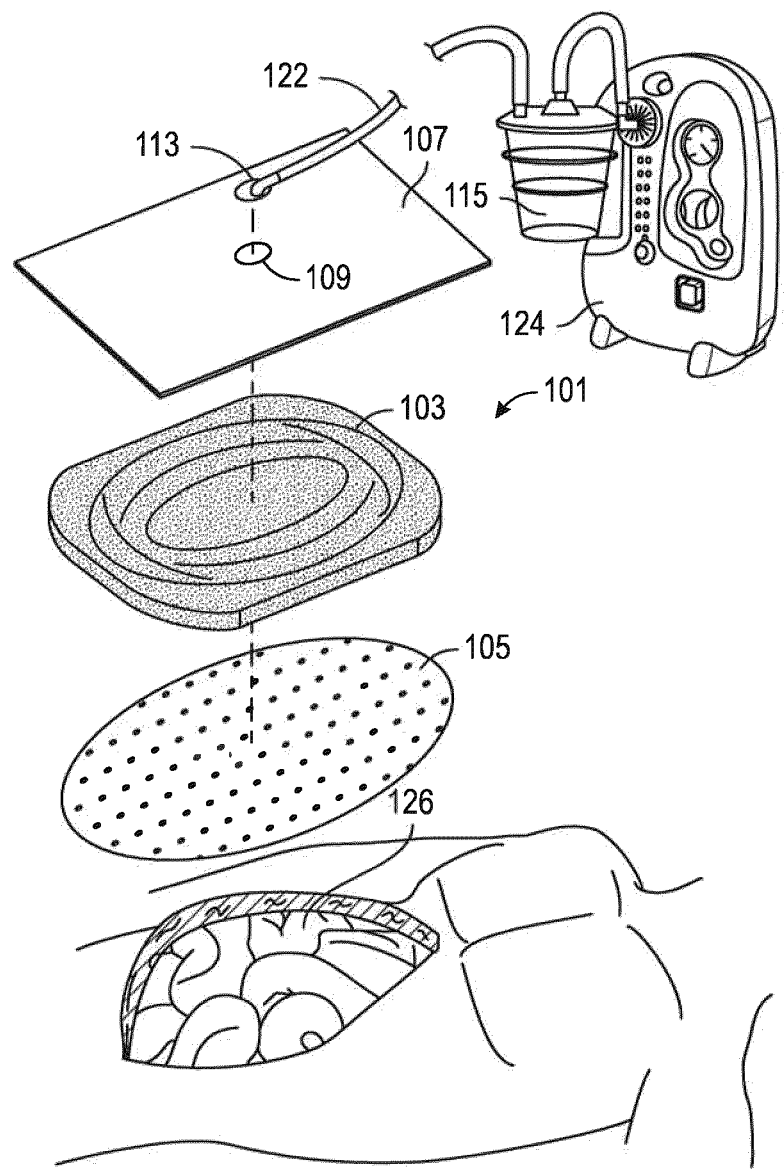
FIG. 1F illustrates of a negative pressure wound therapy system.

Turning to FIG. 1F, treatment of other wound types, such as larger abdominal wounds, with negative pressure in certain embodiments uses a negative pressure treatment system 102 as illustrated schematically here. In this embodiment, a wound 126, illustrated here as an abdominal wound, may benefit from treatment with negative pressure. Such abdominal wounds may be a result of, for example, an accident or due to surgical intervention. In some cases, medical conditions such as abdominal compartment syndrome, abdominal hypertension, sepsis, or fluid edema may require decompression of the abdomen with a surgical incision through the abdominal wall to expose the peritoneal space, after which the opening may need to be maintained in an open, accessible state until the condition resolves. Other conditions may also necessitate that an opening—particularly in the abdominal cavity—remain open, for example if multiple surgical procedures are required (possibly incidental to trauma), or there is evidence of clinical conditions such as peritonitis or necrotizing fasciitis.

In cases where there is a wound, particularly in the abdomen, management of possible complications relating to the exposure of organs and the peritoneal space is desired, whether or not the wound is to remain open or if it will be closed. Therapy, preferably using the application of negative pressure, can be targeted to minimize the risk of infection, while promoting tissue viability and the removal of deleterious substances from the wound. The application of reduced or negative pressure to a wound has been found to generally promote faster healing, increased blood flow, decreased bacterial burden, increased rate of granulation tissue formation, to stimulate the proliferation of fibroblasts, stimulate the proliferation of endothelial cells, close chronic open wounds, inhibit burn penetration, and/or enhance flap and graft attachment, among other things. It has also been reported that wounds that have exhibited positive response to treatment by the application of negative pressure include infected open wounds, decubitus ulcers, dehisced incisions, partial thickness burns, and various lesions to which flaps or grafts have been attached. Consequently, the application of negative pressure to a wound 106 can be beneficial to a patient.

Accordingly, certain embodiments provide for a wound contact layer 105 to be placed over the wound 126. The wound contact layer can also be referred to as an organ protection layer and/or a tissue protection layer. Preferably, the wound contact layer 105 can be a thin, flexible material which will not adhere to the wound or the exposed viscera in close proximity. For example, polymers such as polyurethane, polyethylene, polytetrafluoroethylene, or blends thereof may be used. In one embodiment, the wound contact layer is permeable. For example, the wound contact layer 105 can be provided with openings, such as holes, slits, or channels, to allow the removal of fluids from the wound 126 or the transmittal of negative pressure to the wound 126. Additional embodiments of the wound contact layer 105 are described in further detail below.

Certain embodiments of the negative pressure treatment system 102 may also use a porous wound filler 103, which can be disposed over the wound contact layer 105. This pad 103 can be constructed from a porous material, for example foam, that is soft, resiliently flexible, and generally conformable to the wound 126. Such a foam can include an open-celled and reticulated foam made, for example, of a polymer. Suitable foams include foams composed of, for example, polyurethane, silicone, and polyvinyl alcohol. Preferably, this pad 103 can channel wound exudate and other fluids through itself when negative pressure is applied to the wound. Some pads 103 may include preformed channels or openings for such purposes. In certain embodiments, the pad 103 may have a thickness between about one inch and about two inches. The pad may also have a length of between about 16 and 17 inches, and a width of between about 11 and 12 inches. In other embodiments, the thickness, width, and/or length can have other suitable values. Other embodiments of wound fillers that may be used in place of or in addition to the pad 103 are discussed in further detail below.

Preferably, a drape 107 is used to seal the wound 126. The drape 107 can be at least partially liquid impermeable, such that at least a partial negative pressure may be maintained at the wound. Suitable materials for the drape 107 include, without limitation, synthetic polymeric materials that do not significantly absorb aqueous fluids, including polyolefins such as polyethylene and polypropylene, polyurethanes, polysiloxanes, polyamides, polyesters, and other copolymers and mixtures thereof. The materials used in the drape may be hydrophobic or hydrophilic. Examples of suitable materials include Transeal® available from DeRoyal and OpSite® available from Smith & Nephew. In order to aid patient comfort and avoid skin maceration, the drapes in certain embodiments are at least partly breathable, such that water vapor is able to pass through without remaining trapped under the dressing. An adhesive layer may be provided on at least a portion the underside of the drape 107 to secure the drape to the skin of the patient, although certain embodiments may instead use a separate adhesive or adhesive strip. Optionally, a release layer may be disposed over the adhesive layer to protect it prior to use and to facilitate handling the drape 107; in some cases, the release layer may be composed of multiple sections.

The negative pressure system 102 can be connected to a source of negative pressure, for example a pump 114. One example of a suitable pump is the RENASYS EZ pump available from Smith & Nephew. The drape 107 may be connected to the source of negative pressure 114 via a conduit 122. The conduit 122 may be connected to a port 113 situated over an aperture 109 in the drape 107, or else the conduit 122 may be connected directly through the aperture 109 without the use of a port. In a further alternative, the conduit may pass underneath the drape and extend from a side of the drape. U.S. Pat. No. 7,524,315 discloses other similar aspects of negative pressure systems and is hereby incorporated by reference in its entirety and should be considered a part of this specification.

In many applications, a container or other storage unit 115 may be interposed between the source of negative pressure 124 and the conduit 122 so as to permit wound exudate and other fluids removed from the wound to be stored without entering the source of negative pressure. Certain types of negative pressure sources—for example, peristaltic pumps—may also permit a container 115 to be placed after the pump 124. Some implementations may also use a filter to prevent fluids, aerosols, and other microbial contaminants from leaving the container 115 and/or entering the source of negative pressure 124. Further embodiments may also include a shut-off valve or occluding hydrophobic and/or oleophobic filter in the container to prevent overflow; other embodiments may include sensing means, such as capacitive sensors or other fluid level detectors that act to stop or shut off the source of negative pressure should the level of fluid in the container be nearing capacity. At the pump exhaust, it may also be preferable to provide an odor filter, such as an activated charcoal canister.

FIG. 1G illustrates various embodiments of a wound dressing that can be used for healing a wound without negative pressure. As shown in the dressings of FIG. 1G, the wound dressings can have multiple layers similar to the dressings described with reference to FIGS. 1C-1F except the dressings of FIG. 1G do not include a port or fluidic connector. The wound dressings of FIG. 1G can include a cover layer and wound contact layer as described herein. The wound dressing can include various layers positioned between the wound contact layer and cover layer. For example, the dressing can include one or more absorbent layers and/or one or more transmission layers as described herein with reference to FIGS. 1C-1F. Additionally, some implementations related to wound treatment comprising a wound dressing described herein may also be used in combination or in addition to those described in U.S. Application Publication No. 2014/0249495, filed May 21, 2014, entitled "WOUND DRESSING AND METHOD OF TREATMENT" the disclosure of which are hereby incorporated by reference in its entirety, including further details relating to embodiments of wound dressings, the wound dressing components and principles, and the materials used for the wound dressings.

Wound Dressing with Sensors

A wound dressing that incorporates a number of sensors can be utilized in order to monitor characteristics of a wound as it heals. Collecting data from the wounds that heal well, and from those that do not, can provide useful insights towards identifying measurands to indicate whether a wound is on a healing trajectory.

Figure 2:
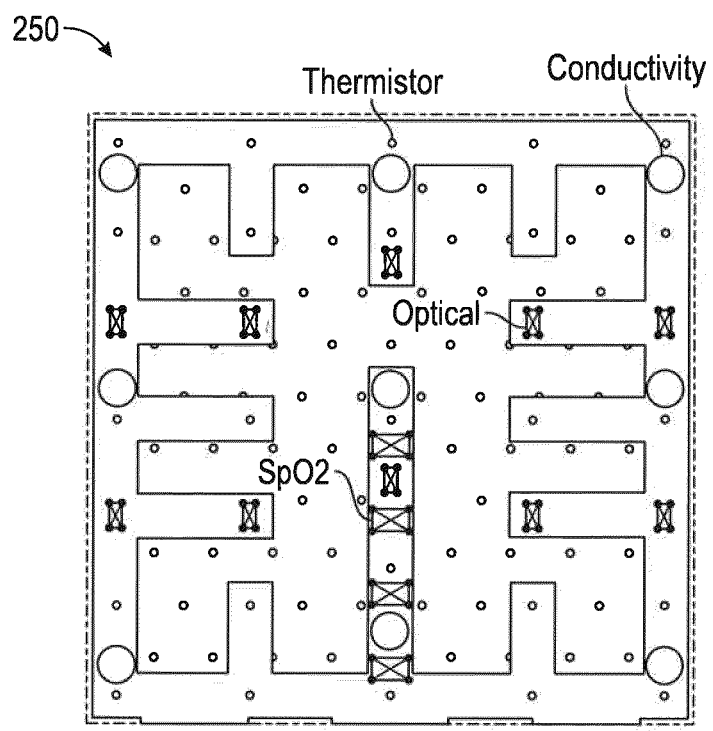
FIG. 2 illustrates a sensor array illustrating the sensor placement incorporated into a wound dressing.
Figure 3A:
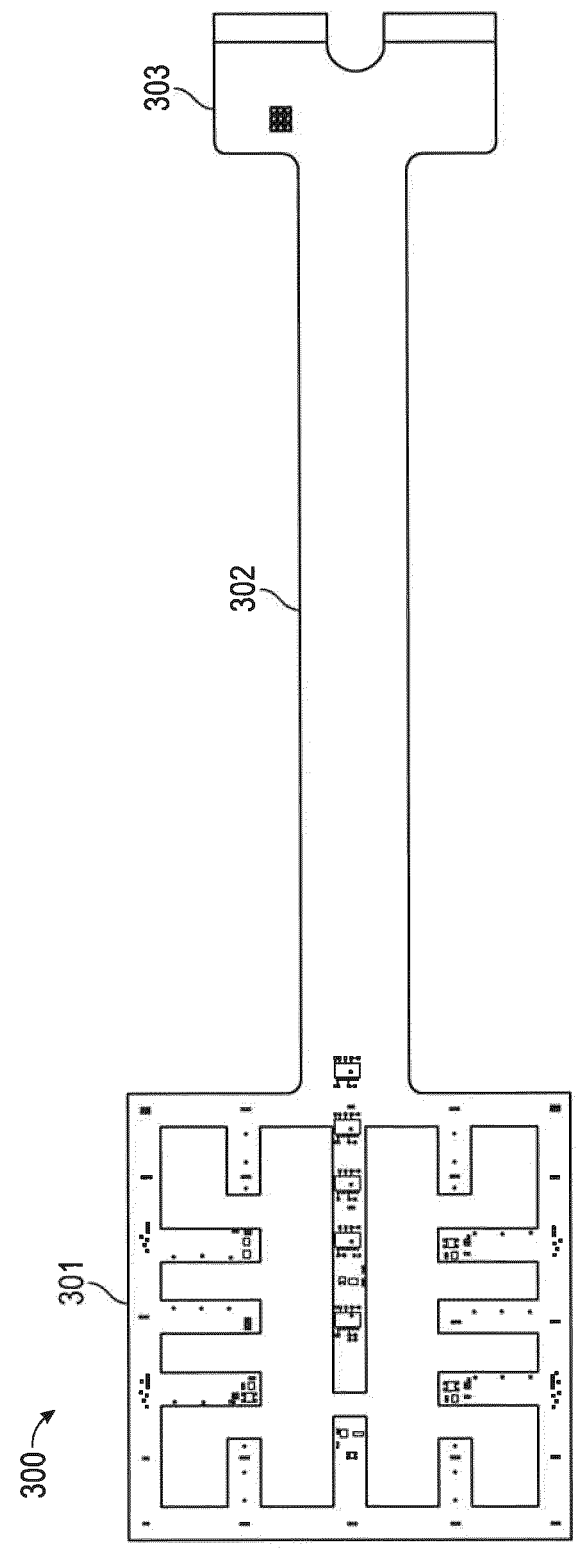
FIG. 3A illustrates a flexible sensor array including a sensor array portion, a tail portion and a connector pad end portion according.

In some implementations, a number of sensor technologies can be used in wound dressings or one or more components forming part of an overall wound dressing assembly. For example, as illustrated in FIGS. 2 and 3D, which depict wound dressings 250 and 320 with sensor arrays, one or more sensors can be incorporated onto or into a wound contact layer, which may be a perforated wound contact layer as shown in FIG. 3D. The substrates in FIGS. 2 and 3D is illustrated as having a square shape, but it will be appreciated that the substrates may have other shapes such as rectangular, circular, oval, etc. The sensor integrated substrate can be provided as an individual material layer that is placed over the wound area and then covered by a wound dressing assembly or components of a wound dressing assembly, such as gauze, foam or other wound packing material, a superabsorbent layer, a drape, a fully integrated dressing like the Pico or Allevyn Life dressing, etc. In other embodiments, the sensor integrated substrate may be part of a single unit dressing such as described herein.

The sensor-integrated substrate can be placed in contact with the wound and will allow fluid to pass through the substrate while causing little to no damage to the tissue in the wound. The sensor-integrated substrate can be made of a flexible material such as silicone and can incorporate antimicrobials or other therapeutic agents known in the art. The sensor-integrated substrate can incorporate adhesives that adhere to wet or dry tissue. The sensors or sensor array can be incorporated into or encapsulated within other components of the wound dressing such as the absorbent layer or spacer layer described above.

As shown in FIGS. 2 and 3D, five sensors can be used, including, for instance, sensors for temperature (such as, 25 thermistor sensors, in a 5×5 array, ~20 mm pitch), oxygen saturation or SpO2 (such as, 4 or 5 SpO2 sensors, in a single line from the center of the substrate to the edge thereof, 10 mm pitch), tissue color (such as, 10 optical sensors, in 2×5 array, ~20 mm pitch; not all 5 sensors in each row of the array need be aligned), pH (such as, by measuring color of a pH sensitive pad, optionally using the same optical sensors as for tissue color), and conductivity (such as, 9 conductivity contacts, in a 3×3 array, ~40 mm pitch). As shown in FIG. 3A, the SpO2 sensors can be arranged in a single line from the center of or near the center of the substrate to the edge of the substrate. The line of SpO2 sensors can allow the sensor to take measurements in the middle of the wound, at the edge or the wound, or on intact skin to measure changes between the various regions. The substrate or sensor array can be larger than the size of the wound to cover the entire surface area of the wound as well as the surrounding intact skin. The larger size of the substrate and/or sensor array and the multiple sensors can provide more information about the wound area than if the sensor was only placed in the center of the wound or in only one area at a time.

The sensors can be incorporated onto flexible circuit boards formed of flexible polymers including polyamide, polyimide (PI), polyester, polyethylene naphthalate (PEN), polyetherimide (PEI), along with various fluropolymers (FEP) and copolymers, or any material known in the art. The sensor array can be incorporated into a two-layer flexible circuit. The circuit board can be a multi-layer flexible circuit board. These flexible circuits can be incorporated into any layer of the wound dressing. A flexible circuit can be incorporated into a wound contact layer. For example, the flexible circuit can be incorporated into a wound contact layer similar to the wound contact layer described with reference to FIG. 1B. The wound contact layer can have cutouts or slits that allow for one or more sensors to protrude out of the lower surface of the wound contact layer and contact the wound area directly.

A sensor-integrated wound contact layer can include a first and second wound contact layer with the flexible circuit board sandwiched between the two layers of wound contact layer material. The first wound contact layer has a lower surface intended to be in contact with the wound and an upper surface intended to be in contact with flexible circuit board. The second wound contact layer has a lower surface intended to be in contact with the flexible circuit board and an upper surface intended to be in contact with a wound dressings or one or more components forming part of an overall wound dressing assembly. The upper surface of the first wound contact layer and the lower surface of the second wound contact layer can be adhered together with the flexible circuit board sandwiched between the two layers.

The one or more sensors of the flexible circuit board can be fully encapsulated or covered by the wound contact layers to prevent contact with moisture or fluid in the wound. The first wound contact layer can have cutouts or slits that allow for one or more sensors to protrude out of the lower surface and contact the wound area directly. For example, the one or more SpO2 sensors as shown in FIG. 3D are shown protruding out the bottom surface of the wound contact layer. The SpO2 sensors can be mounted directly on a lower surface of the first wound contact layer. Some or all of the sensors and electrical or electronic components may be potted or encapsulated (for example, rendered waterproof or liquid-proof) with a polymer, for example, silicon or epoxy based polymers. The encapsulation with a polymer can prevent ingress of fluid and leaching of chemicals from the components. The wound contact layer material can seal the components from water ingress and leaching of chemicals.

Gathering and processing information related to the wound can utilize three components, including a sensor array, a control or processing module, and software. These components are described in more detail herein.

FIG. 3A illustrates a flexible sensor array circuit board 300 that includes a sensor array portion 301, a tail portion 302, and a connector pad end portion 303. The sensor array portion 301 can include the sensors and associated circuitry. The sensor array circuit board 300 can include a long tail portion 302 extending from the sensor array portion 301. The connector pad end portion 303 can be enabled to connect to a control module or other processing unit to receive the data from the sensor array circuit. The long tail portion 302 can allow the control module to be placed distant from the wound, such as for example in a more convenient location away from the wound.

Figure 3B:
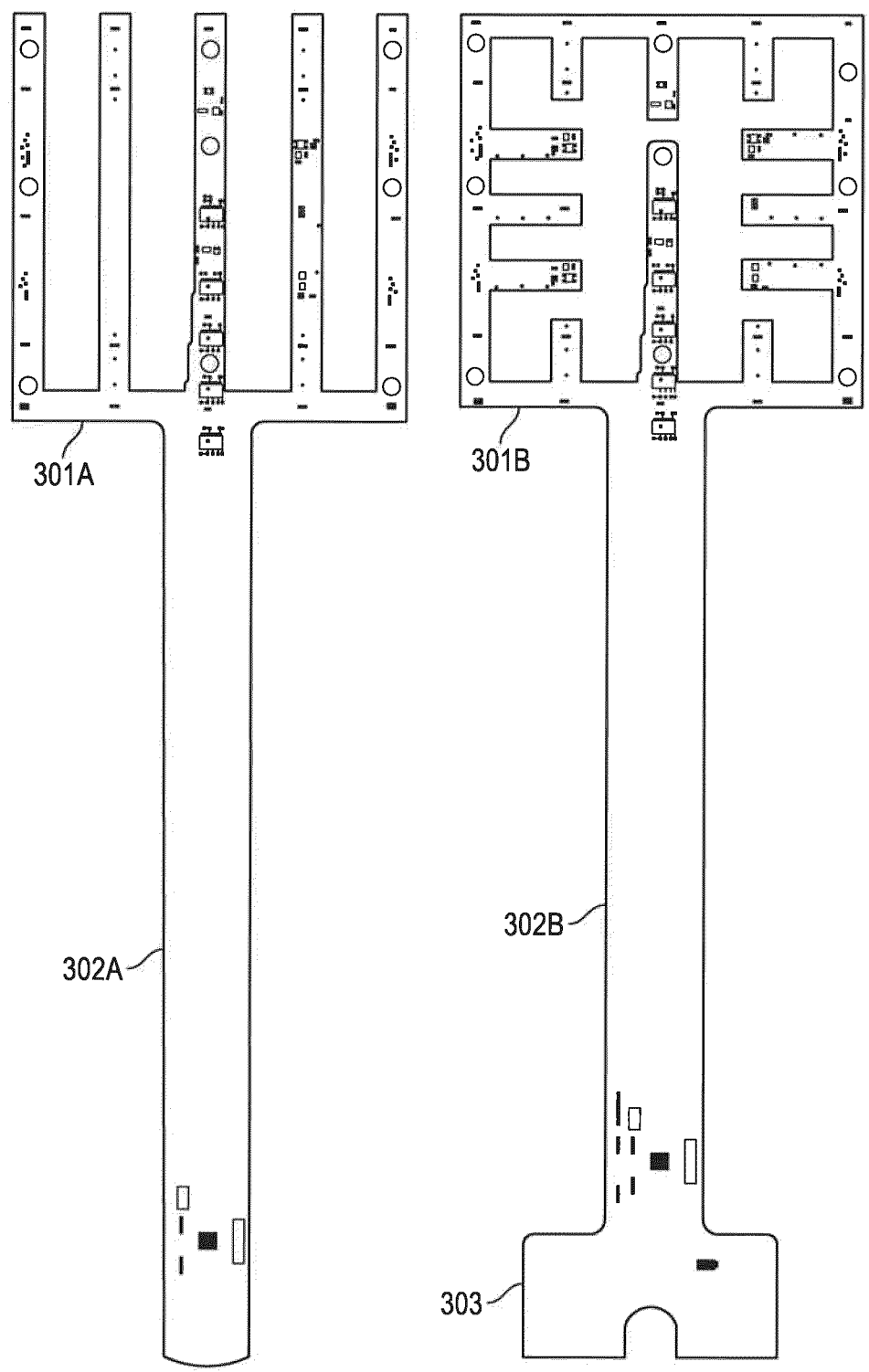
FIG. 3B illustrates flexible circuit boards with different sensor array geometries.
Figure 3B:
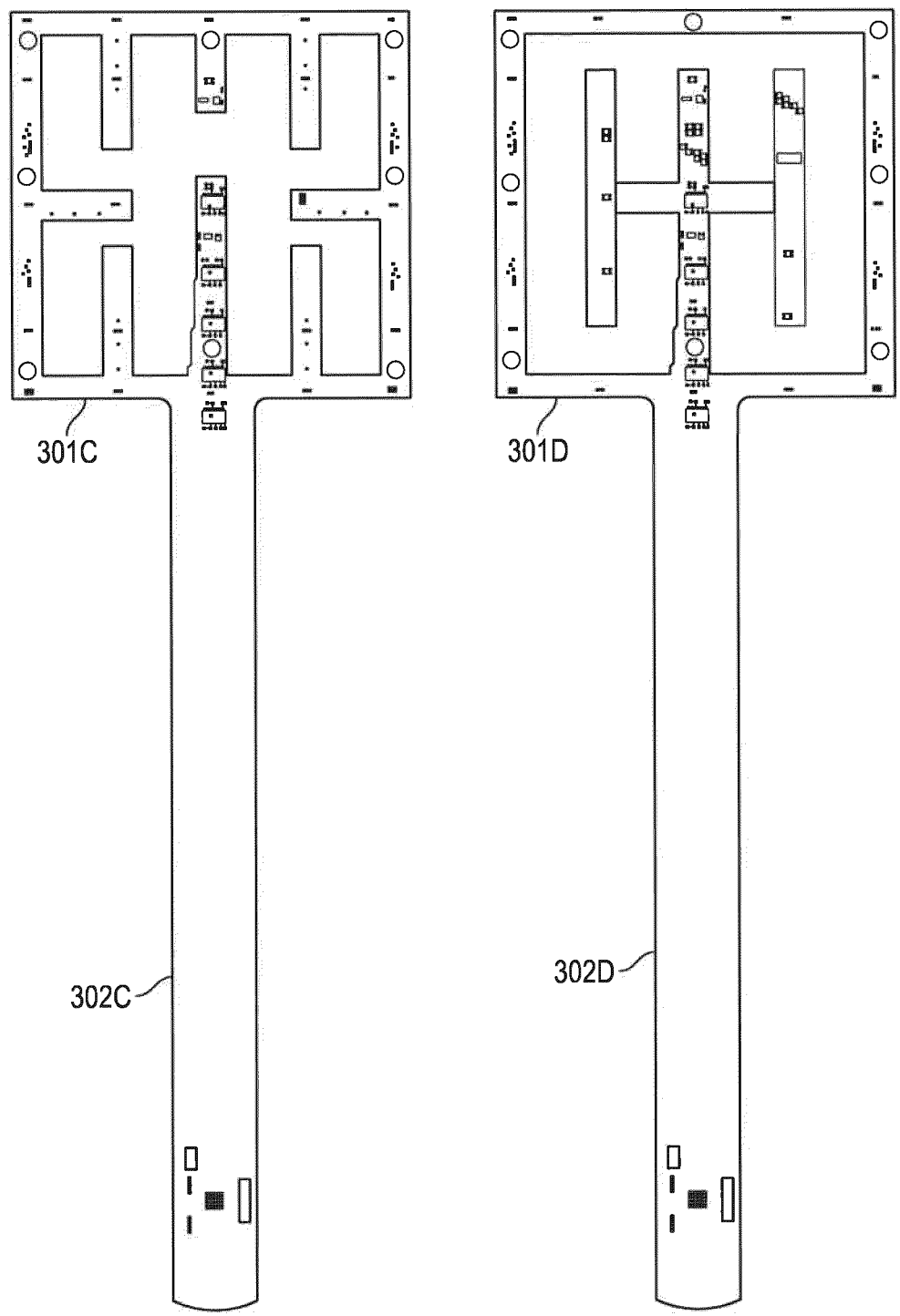

FIG. 3B illustrates embodiments of the flexible circuit boards with four different sensor array geometries 301A, 301B, 301C, and 301D. The illustrated implementations include tail portions 302A, 302B. 302C, and 302D. In some cases, four different sensor array geometries shown can be implemented in flexible circuits. While FIG. 3B show four different sensor array formats and configurations, the design 301B and 302B also includes the connector pads end portion 303 configured to provide electrical or electronic connection between the sponsor array 301B and a control module. One or more of the designs in 301A, 301C, or 301D can also include a connector pads end portion, such as the portion 303, to allow flexible circuit boards 301A, 301C, or 301D to communicate with a control module or other processing unit. In some cases, the sensor array communicates with the control module wirelessly and the tail portion may be omitted.

Figure 3C:
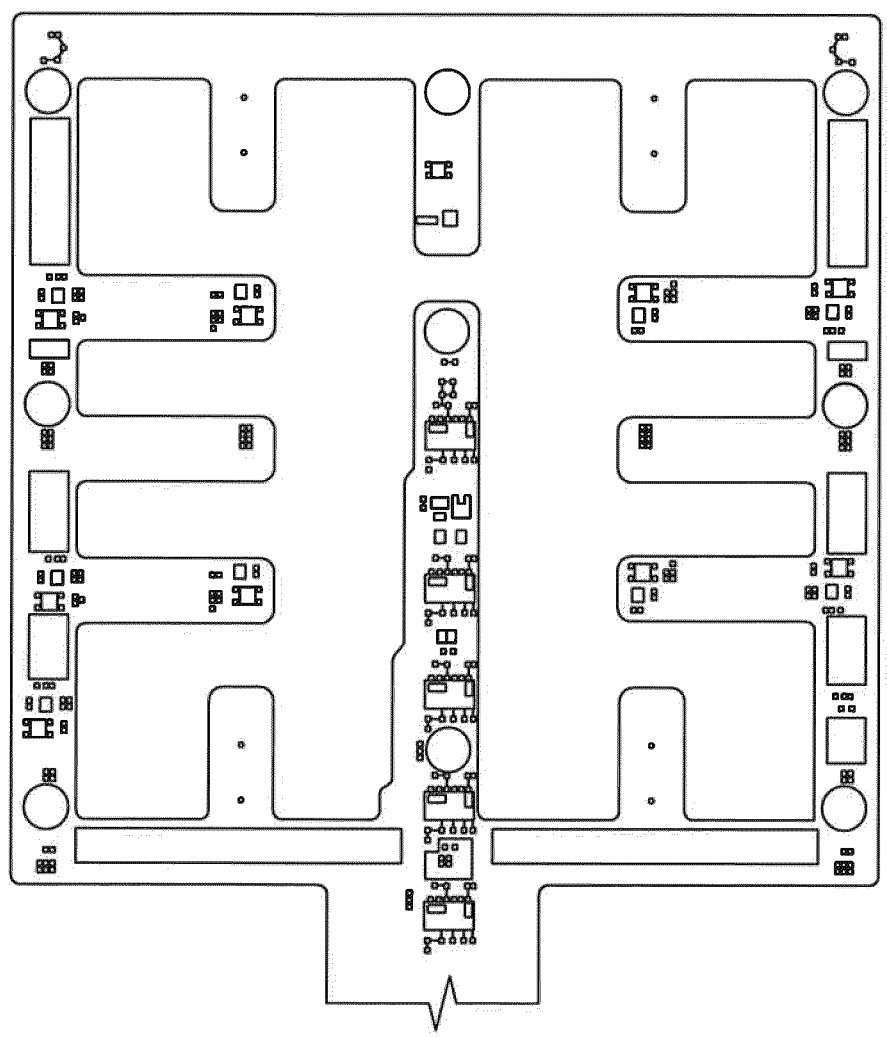
FIG. 3C illustrates the sensor array portion of a sensor array shown in FIG. 3B.
Figure 3D:
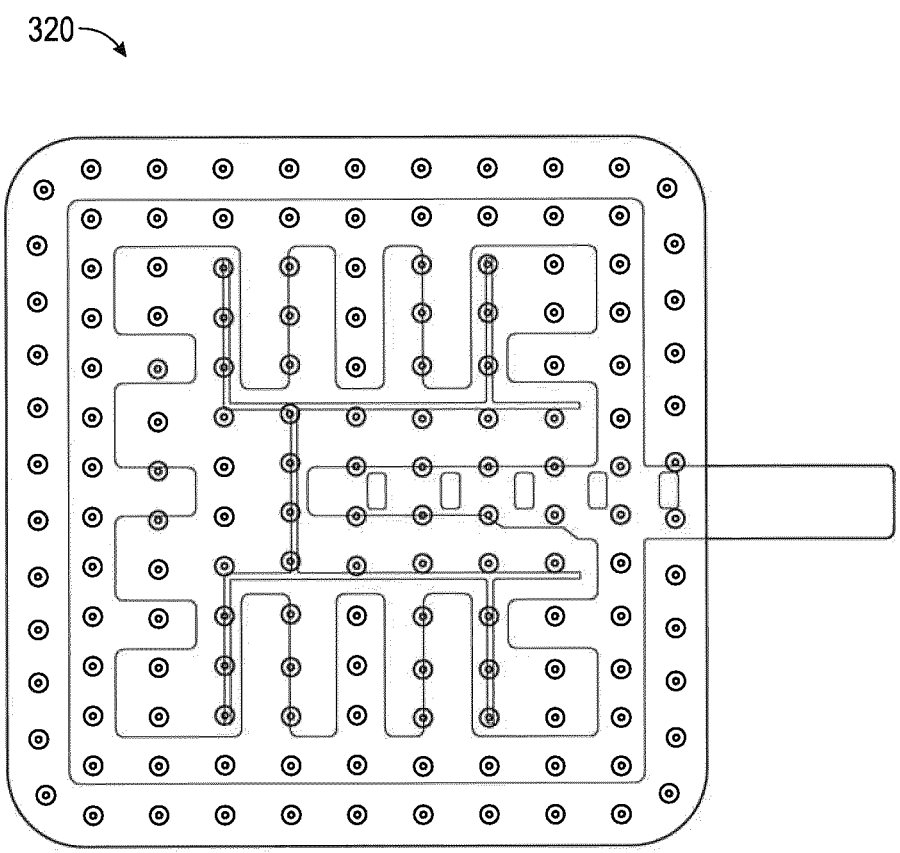
FIG. 3D illustrates a flexible sensor array incorporated into a perforated wound contact layer.

FIG. 3C shows the sensor array portion 301B of the sensor array design shown of FIG. 3B in more detail. In any one or more of the embodiments of FIG. 2 or 3A-3D, the sensor array portion can include a plurality of portions that extend either around a perimeter of a wound dressing component such as a wound contact layer, or inward from an outer edge of the wound dressing component. For example, the illustrated embodiments include a plurality of linearly extending portions that may be parallel to edges of a wound dressing component, and in some cases, follow the entire perimeter of the wound dressing component. The sensor array portion may comprise a first plurality of parallel linearly extending portions that are perpendicular to a second plurality of parallel linearly extending portions. These linearly extending portions may also have different lengths and may extend inward to different locations within an interior of a wound dressing component. The sensor array portion preferably does not cover the entire wound dressing component, so that gaps are formed between portions of the sensor array. As shown in FIG. 2, this allows some, and possibly a majority of the wound dressing component to be uncovered by the sensor array. For example, for a perforated wound contact layer as shown in FIGS. 2 and 3D, the sensor array portion 301 may not block a majority of the perforations in the wound contact layer. The sensor array may also be perforated or shaped to match the perforations in the wound contact layer to minimize the blocking of perforations to fluid flow.

FIG. 3D illustrates a flexible sensor array incorporated into a perforated wound contact layer 320. As is illustrated, the sensor array can be sandwiched between two films or wound contact layers. The wound contact layers can have perforations formed as slits or holes as described herein that are small enough to help prevent tissue ingrowth into the wound dressing while allowing wound exudate to flow into the dressing. The wound contact layers can have one or more slits that increase flexibility of the wound contact layer with integrated sensor array. One of the wound contact layers can have extra cut outs to accommodate the sensors so that they can contact the skin directly.

Connectivity for the sensor array can vary depending on the various sensors and sensor array designs utilized. For example, as shown in FIG. 3B, a total of 79 connections can be used to connect the components of the sensor array. The sensor arrays can be terminated in two parallel 40-way 0.5 mm pitch Flat Flexible Cable (FFC) contact surfaces, with terminals on the top surface, designed to be connected to an FFC connector such as Molex 54104-4031.

One or more of thermistors, conductivity sensors, SpO2 sensors, or color sensors can be used on the sensor array to provide information relating to conditions of the wound. The sensor array and individual sensors can assist a clinician in monitoring the healing of the wound. The one or more sensors can operate individually or in coordination with each other to provide data relating to the wound and wound healing characteristics.

Temperature sensors can use thermocouples or thermistors to measure temperature. The thermistors can be used to measure or track the temperature of the underlying wound or the thermal environment within the wound dressing. The thermometry sensors can be calibrated and the data obtained from the sensors can be processed to provide information about the wound environment. An ambient sensor measuring ambient air temperature can also be used to assist in eliminating problems associated with environment temperature shifts.

Optical sensors can be used to measure wound appearance using an RGB sensor (for example, a red, green, blue, and clear (RGBC) sensor or red, green blue, and white (RGBW) sensor) with an illumination source. In some cases, both the RGB sensor and the illumination source would be pressed up against the skin, such that light would penetrate into the tissue and take on the spectral features of the tissue itself.

Light propagation in tissue can be dominated by two major phenomena, scattering and attenuation. For attenuation, as light passes through tissue, its intensity may be lost due to absorption by various components of the tissue. Blue light tends to be attenuated heavily, whilst light at the red end of the spectrum tends to be attenuated least.

Scattering processes can be more complex, and can have various "regimes" which must be considered. The first aspect of scattering is based on the size of the scattering center compared with the wavelength of incident light. If the scattering center is much smaller than the wavelength of light, then Rayleigh scattering can be assumed. If the scattering center is on the order of the wavelength of light, then a more detailed Mie scattering formulation must be considered. Another factor involved in scattering light is the distance between input and output of the scattering media. If the mean free path of the light (the distance between scattering events) is much larger than the distance travelled, then ballistic photon transport is assumed. In the case of tissue, scatting events are approximately 100 microns apart—so a 1 mm path distance would effectively randomize the photon direction and the system would enter a diffusive regime.

Ultra bright light emitting diodes (LEDs), an RGB sensor, and polyester optical filters can be used as components of the optical sensors to measure through tissue color differentiation. For example, because surface color can be measured from reflected light, a color can be measured from light which has passed through the tissue first for a given geometry. This can include color sensing from diffuse scattered light, from an LED in contact with the skin. In some cases, an LED can be used with an RGB sensor nearby to detect the light which has diffused through the tissue. The optical sensors can image with diffuse internal light or surface reflected light.

Additionally, the optical sensors can be used to measure autofluorescence. Autoflourescense is used because the tissue is absorbing light at one wavelength, and emitting at another. Additionally, dead tissue may not auto-fluoresce and so this could be a very strong indication as to if the tissue is healthy or not. Due to blue light (or even UV light) having such a short penetration depth, it may be very useful for example to have a UV light with a red sensitive photodiode nearby (or some other wavelength shifted band) to act as a binary test for healthy tissue, which would auto-fluoresce at a very particular wavelength.

Conductivity sensors can be used to determine the difference between living and dead tissue or to show a change in impedance due to a wound being opened up in morbid tissue. Conductivity sensors can include Ag/AgCl electrodes and an impedance analyzer. The conductivity sensors can be used to measure the change of impedance of a region of wound growth by measuring the impedance of the surrounding tissue/area. The sensor array can utilize conductivity sensors to measure the change in conductivity on perimeter electrodes due to a wound size or wound shape change. Conductivity sensors can be used in the wound bed or on the perimeter of the wound.

In some cases, pH changing pads can be used as a pH sensor. A spectrometer and a broadband white light source can be used to measure the spectral response of the pH dye. The illumination and imaging can be provided on the surface of the wound dressing that is in contact with the wound and at the same side as the fluid application, the bottom surface. Alternatively, the illumination and imaging source can be provided on the surface of the wound dressing opposite the bottom surface and away from fluid application or the top surface of the dressing.

In some cases, pulse oximetry SpO2 sensors can be used. To measure how oxygenated the blood is and the pulsatile blood flow can be observed. Pulse oximetry measurements work by taking a time resolved measurement of light absorption/transmission in tissue at two different optical wavelengths. When hemoglobin becomes oxygenated, its absorption spectrum changes with regards to non-oxygenated blood. By taking a measurement at two different wavelengths, one gains a ratio metric measure of how oxygenated the blood is.

The components in the sensor array can be connected through multiple connections. The thermistors can be arranged in groups of five. Each thermistor is nominally 10 kΩ, and each group of five has a common ground. There are five groups of thermistors, giving a total of 30 connections. In some cases, there can be nine conductivity terminals. Each conductivity terminal can require one connection, giving a total of 9 connections. In some cases, there can be five SpO2 sensors. Each SpO2 sensor requires three connections, plus power and ground (these are covered separately), giving a total of 15 connections. In some cases, there can be 10 color sensors. Each color sensor comprises an RGB LED and an RGB photodiode. Each color sensor requires six connections, however five of these are common to every sensor, giving a total of 15 connections. Power and ground are considered separately. In some cases, there can be 5 pH sensors. The pH sensors can be a color-change discs, and can be sensed using the color sensors described above. Therefore, the pH sensors require no additional connections. There can be three power rails, and seven ground return signals, giving a total of 10 common connections. In some cases, the sensor array can include 25 thermistors (Murata NCP15WB473E03RC), 9 conductivity terminal, 5 SpO2 (ADPD144RI), 10 RGB LED (such as KPTF-1616RGBC-13), 10 RGB Color Sensor, 10 FET, a printed circuit board (PCB), and an assembly.

A control module can be used to interface with the sensor array. In some cases, the control module can contain a power source, such as batteries, and electronics to drive the sensors. The control module can also log data at appropriate intervals and allow data transfer to an external computing device, such as a personal computer (PC). The control module can be customized to have various features depending on the sensors used in the sensor array and the data collected by the sensors. The control module can be comfortable enough and small enough to be worn continuously for several weeks. The control module can be positioned near the wound dressing or on the wound dressing. The control module can be positioned in a remote location from the wound dressing and accompanying sensor array. The control module can communicate with the sensor array and wound dressing through electrical wires or through wireless communication whether positioned on the dressing, near the dressing, or remote from the wound dressing. The control module can be adapted to be utilized with different sensor arrays and can enable easy replacement of the sensor array.

The control module can include various requirements and combination of features including but not limited to the features listed in Table 1 below.

TABLE 1

Figure 3E:
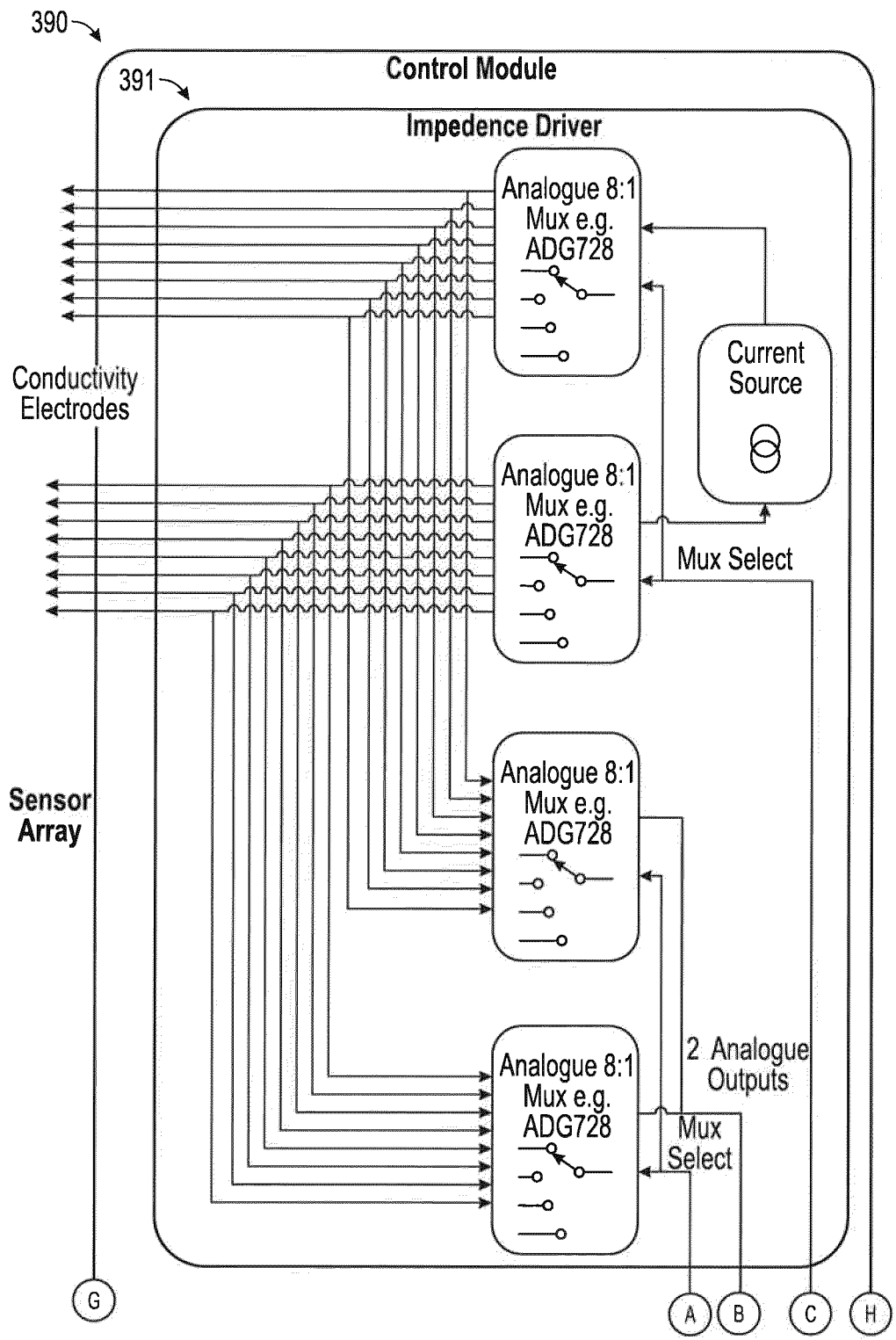
FIG. 3E illustrates a control module.
Figure 3E:
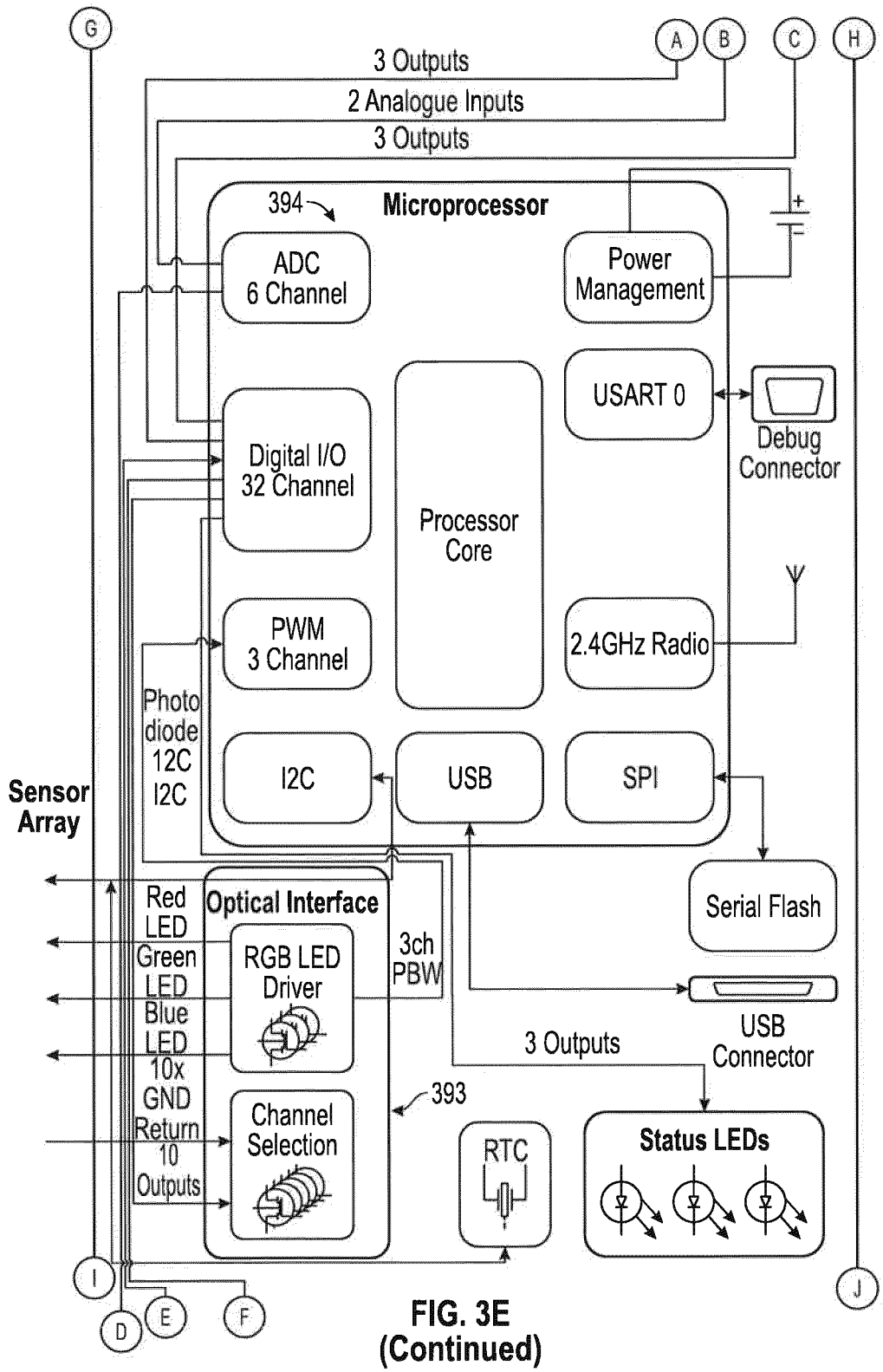
Figure 3E:
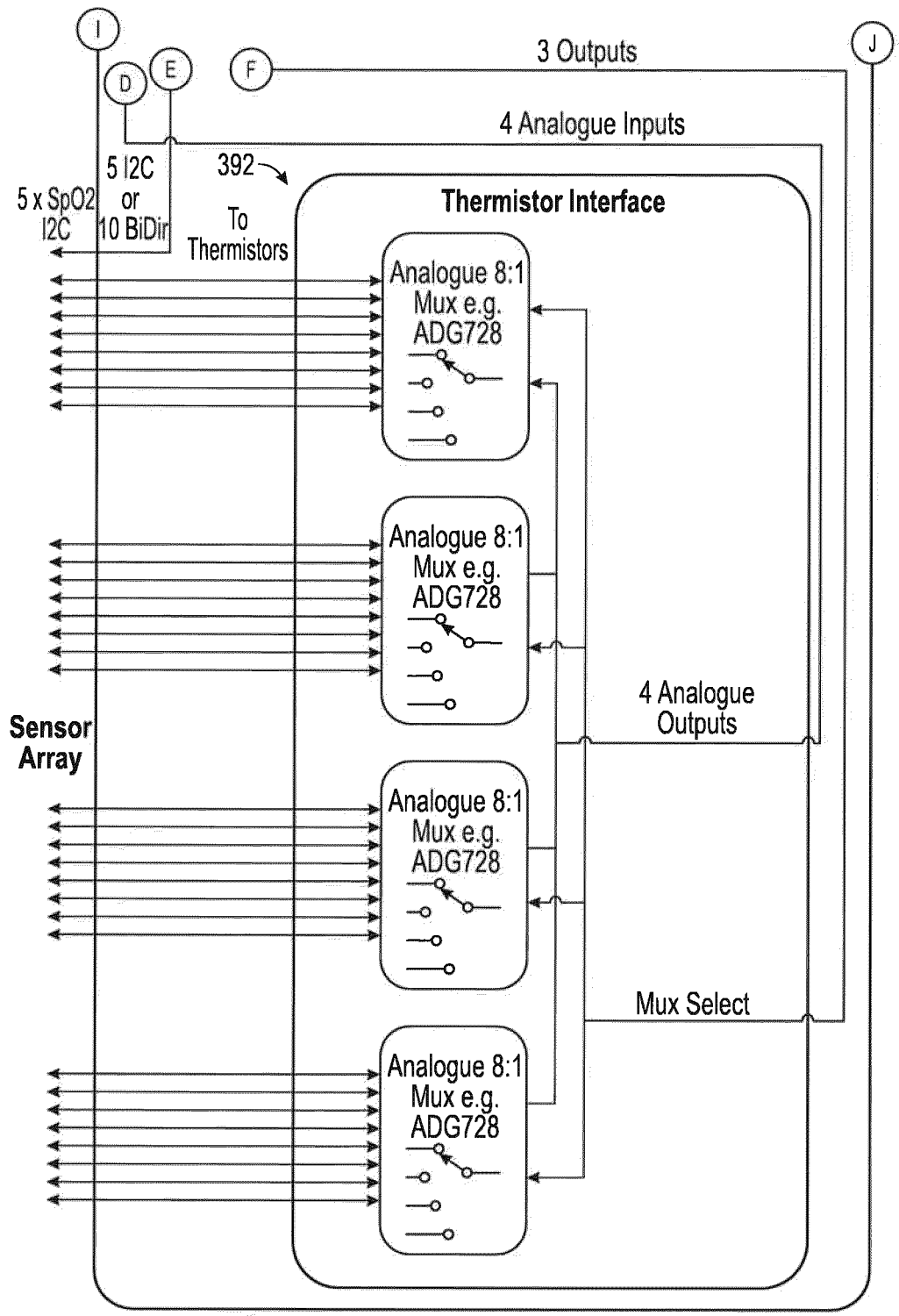

OPTIONAL FEATURES FOR CONTROL MODULE 7 day operation from a single set of batteries
28 day local, non-volatile, storage capacity
Easy to charge, or to replace battery
Wireless link to PC/tablet (such as Bluetooth)
Wired link to PC (optional, micro-USB)
Drive electronics for thermistors
Drive electronics for conductivity sensors
Drive electronics for optical sensors
Drive electronics for SpO2 sensors
Power management
Real Time Clock (RTC) to allow accurate data logging, and correlation with other measurands
Ability to change sample rates and intervals (useful for SpO2) for each sensor
Indication of status via LED, such as (Green: Awake; Flashing green: Charging; Blue: Wireless link established; Flashing blue: Wireless data transfer; Yellow: Wired link established; Flashing yellow: Wired data transfer; Red: Battery low; Flashing red: Battery very low FIG. 3E illustrates a block diagram 330 of a control module. The block diagram of the control module includes a conductivity driver box 391 displaying features of the conductivity driver. Box 392 shows the features of the thermistor interface and box 393 shows the features of the optical interface. The control module can include a controller or microprocessor with features similar to those shown in box 394. Real time clock (RTC), Status LEDs, USB connector, Serial Flash, and Debug Connector can be included as features of the control module as shown in FIG. 3E.

In some cases, the microprocessor can have one or more of the following features: 2.4 GHz or another suitable frequency radio (either integrated, or external); Supplied Bluetooth software stack; SPI interface; USB (or UART for external USB driver); I2C; 3 channel PWM; 32 GPIO; or 6-channel ADC. In some cases, the device can require at least 48 I/O pins or possibly more due to banking limitations. Bluetooth stack typically requires ~20 kB on-board Flash, so a minimum of 32 kB can be required. In some cases, 64 kB can be required if complex data processing is considered. The processor core can be ARM Cortex M4 or a similar processor core. In some cases, the parts can include ST's STM32L433LC or STM32F302R8, which would require an external radio, or NXP's Kinetis KW range including integrated radio.

The control module can include a memory component where the amount of local storage depends on the sample rate and resolution of the sensors. For example, an estimated data requirement of 256 Mb (32 MB) can be met by using a serial Flash device from a number of manufacturers (Micron, Spansion).

The control module can utilize one or more analogue switches. Analogue switches with good on resistance and reasonable bandwidth can be used. For example, Analog Devices' ADG72 or NXP's NX3L4051HR can be used. Based on the initial system architecture, 8 of these will be required.

The control module can incorporate a power source, such as a battery. For example a 300 mWh/day battery can be used. For 7 days this is 2100 mWh. This could be provided by: a 10 days, non-rechargeable, ER14250 (14.5 mm diameter×25 mm) LiSOCl2 cell; or a 7 days, rechargeable, Li 14500 (14.5 mm diameter×500 mm) Li-Ion.

The control module can incorporate a real time clock (RTC). The RTC can be chosen from any RTC devices with crystal. The control module can also include miscellaneous resistors, capacitors, connectors, charge controllers, and other power supplies.

The PCB of the control module can be a 4-layer board, approximately 50 mm×20 mm, or 25 mm×40 mm. The type of PCB used can be largely driven by connection requirements to sensor array.

The enclosure of the control module can be a two part moulding, with clip features to allow easy access for changing sensor arrays or batteries.

The data collected through the sensor array can be passed through the control module and processed by host software. The software may be executed on a processing device. The processing device can be a PC, tablet, smartphone, or other computer capable of running host software. The processing device executing the software can be in communication with the control module through electrical wires or through wireless communication. The software may be configured to provide access to the data held on the control module, but not to perform big-data analysis. The host software can include an interface to the control module via Bluetooth or USB. Host software can read the status of control module, download logged data from control module, upload sample rate control to control module, convert data from control module into format suitable for processing by big-data analysis engine, or upload data to cloud for processing by analysis engine.

The software may be developed for PC (Windows/Linux), tablet or smartphone (Android/iOS), or for multiple platforms.

In some cases, a source of negative pressure (such as a pump) and some or all other components of the topical negative pressure system, such as power source(s), sensor(s), connector(s), user interface component(s) (such as button(s), switch(es), speaker(s), screen(s), etc.) and the like, can be integral with the wound dressing. In some cases, the components can be integrated below, within, on top of, or adjacent to the backing layer. The wound dressing can include a second cover layer or a second filter layer for positioning over the layers of the wound dressing and any of the integrated components. The second cover layer can be the upper most layer of the dressing or can be a separate envelope that enclosed the integrated components of the topical negative pressure system.

As used herein the upper layer, top layer, or layer above refers to a layer furthest from the surface of the skin or wound while the dressing is in use and positioned over the wound. Accordingly, the lower surface, lower layer, bottom layer, or layer below refers to the layer that is closest to the surface of the skin or wound while the dressing is in use and positioned over the wound.

Substrate Supporting Sensors

A wound dressing that incorporates a number of electronic components, including one or more sensors, can be utilized in order to monitor characteristics of a wound. Collecting and analyzing data from a wound can provide useful insights towards determining whether a wound is on a healing trajectory, selecting proper therapy, determining whether the wound has healed, or the like.

Figure 4A:
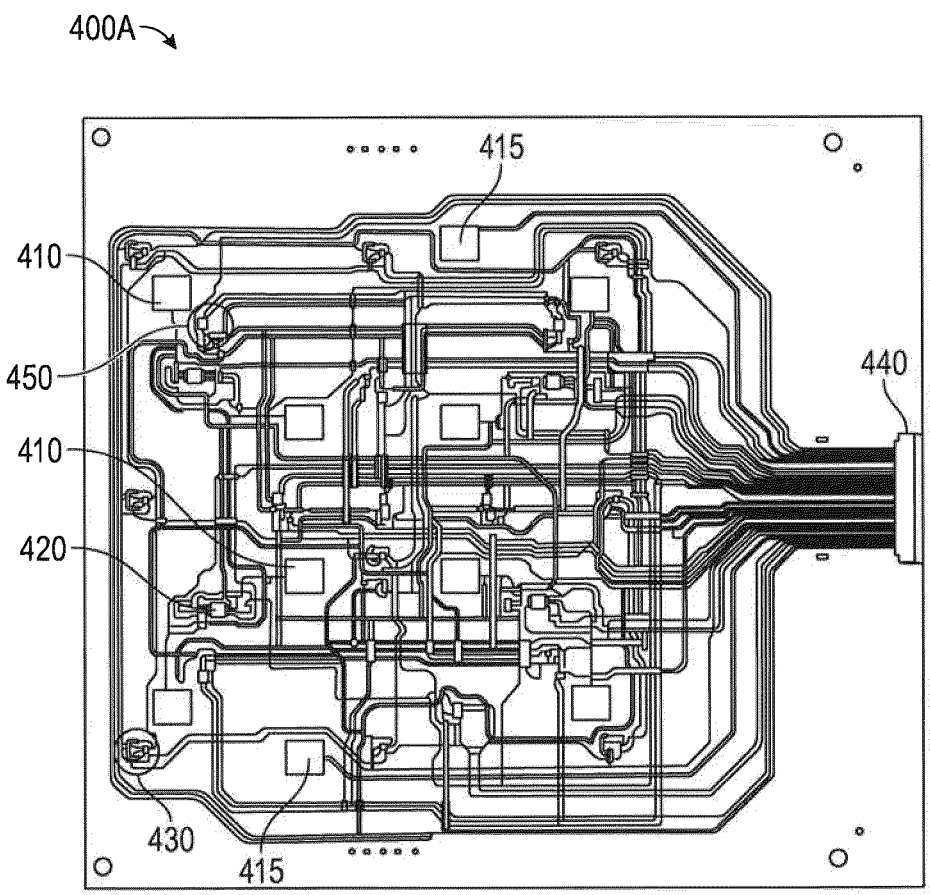
FIG. 4A illustrates a perspective view of a substrate supporting electronic components.
Figure 4B:
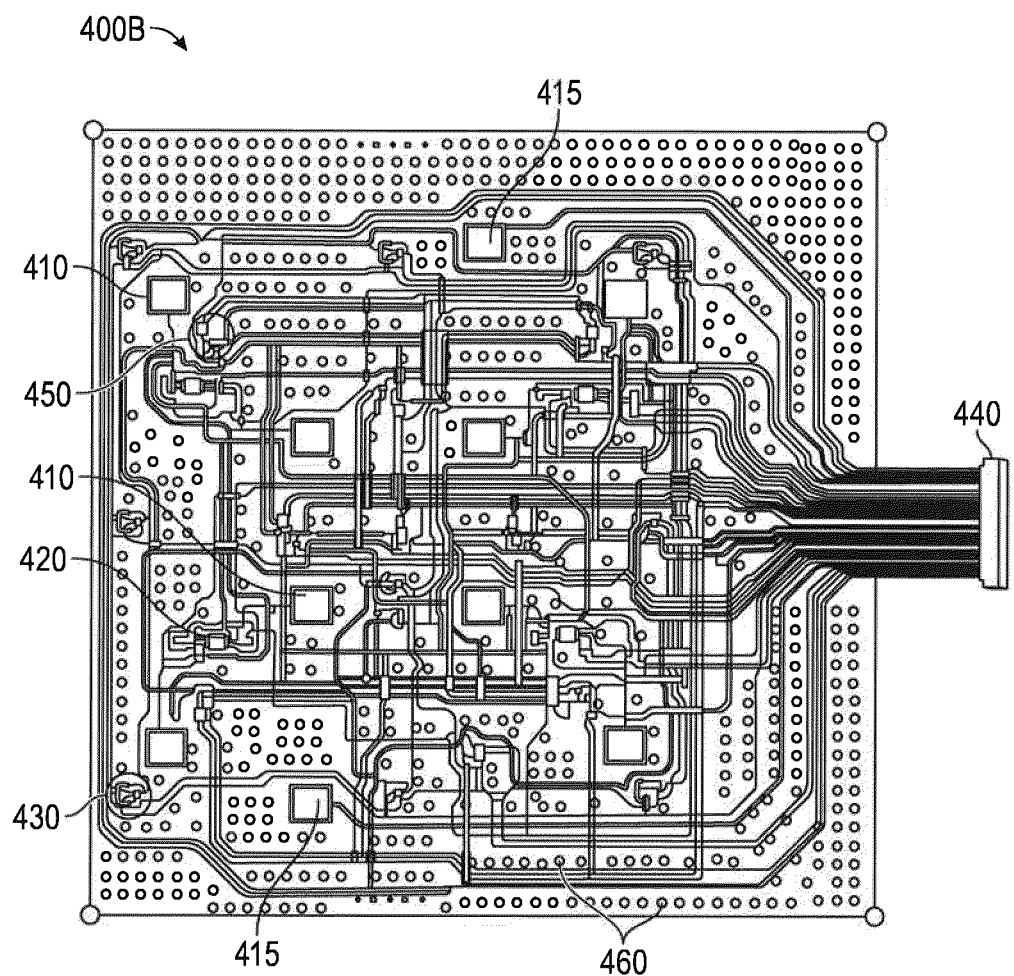
FIG. 4B illustrates perspective view of a perforated substrate supporting electronic components.

In some implementations, a number of sensor technologies can be used in wound dressings or one or more components forming part of an overall wound dressing apparatus. For example, as illustrated in FIGS. 4A-4B, one or more sensors can be incorporated onto or into a substrate (such substrate can be referred to as "sensor integrated substrate"). The substrate illustrated as having a square shape, but it will be appreciated that the substrate may have other shapes such as rectangular, circular, oval, etc. In some cases, a substrate supporting one or more sensors can be provided as an individual material layer that is placed directly or indirectly over or in a wound. The sensor integrated substrate can be part of a larger wound dressing apparatus. In some cases, the sensor integrated substrate is part of a single unit dressing. Additionally or alternatively, the sensor integrated substrate can be placed directly or indirectly over or in the wound and then covered by a secondary wound dressing, which can include one or more of gauze, foam or other wound packing material, a super-absorbent layer, a drape, a fully integrated dressing like the Pico or Allevyn Life dressing manufactured by Smith & Nephew, or the like.

The sensor integrated substrate can be placed in contact with a wound and can allow fluid to pass through the substrate while causing little to no damage to the tissue in the wound. The substrate can be flexible, elastic, extensible, or stretchable or substantially flexible, elastic, extensible, or stretchable in order to conform to or cover the wound. For example, the substrate can be made from a stretchable or substantially stretchable material, such as one or more of polyurethane, thermoplastic polyurethane (TPU), silicone, polycarbonate, polyethylene, polyimide, polyamide, polyester, polyethelene tetraphthalate (PET), polybutalene tetreaphthalate (PBT), polyethylene naphthalate (PEN), polyetherimide (PEI), along with various fluropolymers (FEP) and copolymers, or another suitable material.

In some cases, the substrate can include one or more flexible circuit boards, which can be formed of flexible polymers, including polyamide, polyimide (PI), polyester, polyethylene naphthalate (PEN), polyetherimide (PEI), along with various fluropolymers (FEP) and copolymers, or the like. One or more sensors can be incorporated into a two-layer flexible circuit. In some scenarios, the one or more circuit boards can be a multi-layer flexible circuit board.

In some cases, the sensor integrated substrate can incorporate adhesive, such as a wound contact layer as described herein, that adheres to wet or dry tissue. In some cases, one or more sensors, which can be positioned one or more flexible circuits, can be incorporated into any layer of the wound dressing. For example, a wound contact layer can have cutouts or slits that allow for one or more sensors to protrude out of the lower surface of the wound contact layer and contact the wound directly. In some situations, one or more sensors can be incorporated into or encapsulated within other components of a wound dressing, such as an absorbent layer.

As shown in FIG. 4A, a sensor integrated substrate 400A can support a plurality of electronic components and a plurality of electronic connections interconnecting at least some of the components. The electronic components can be one or more of any electronic components described herein, such as a sensor, amplifier, capacitor, resistor, inductor, controller, processor, or the like. The electronic connections can electrically connect one or more of the electronic components. The electronic connections can be can be tracks printed on the substrate, such as using copper, conductive ink (such as silver ink, graphite ink, etc.), or the like. At least some of the electronic connections can be flexible or stretchable or substantially flexible or stretchable.

The plurality of electronic components can include one or more impedance or conductivity sensors or electrodes 410, which can be arranged in an outer 4×4 grid and an inner 4×4 grid as illustrated in FIGS. 4A-4B. Sensors 410 are illustrated as pads configured to measure impedance or conductivity of tissue across any pair of the pads. Two (or more) excitation pads or electrodes 415 can be arranged as illustrated to provide the excitation signal across the pads, which is conducted by the tissue and responsive to which impedance or conductance of the tissue can be measured across the pads 410. For example, FIG. 9 illustrates current density between two excitation pads 415 in response to an excitation signal being applied to the pads 415. The current density is heaviest or strongest in an area 902 between the excitation pads 415. The current density becomes lighter or weaker in areas away from the excitation pads 415. As illustrated in FIG. 9, in area 904 adjacent to the area 902, the current density is heavier than in an outer area 906.

By measuring electrical signal(s) between one or more combinations of the sensors 410 (and/or 415), relative current density and consequently impedance or conductance across one or more of the wound, perimeter of the wound, or tissue or areas surrounding the wound can be determined. For example, measuring voltage between multiple different pairs of the sensors 410 (and/or pads 415) can facilitate determination of the impedance or conductance across one or more of the wound, perimeter of the wound, or tissue or areas surrounding the wound. Electrical components or circuits, such as one or more amplifiers 420, can be used to measure impedance or conductance of the tissue. Impedance or conductance measurements can be used to identify living and dead tissue, monitor progress of healing, or the like. The arrangement of the pads 410 in the inner and outer grids can be used to measure the impedance or conductance of the wound, perimeter of the wound, or tissue or areas surrounding the wound.

The plurality of electronic components can include one or more temperature sensors 430 configured to measure temperature of the wound or surrounding tissue. For example, nine temperature sensors arranged around the perimeter of the substrate 400A. One or more temperature sensors can include one or more thermocouples or thermistors. One or more temperature sensors can be calibrated and the data obtained from the one or more sensors can be processed to provide information about the wound environment. In some cases, an ambient sensor measuring ambient air temperature can also be used to assist in eliminating problems associated with environment temperature shifts.

The plurality of electronic components can include one or more optical sensors 450. One or more optical sensors 450 can be configured to measure wound appearance or image the wound. In some cases, a light source or illumination source that emits light and a light sensor or detector that detects light reflected by the wound are used as one or more optical sensors. The light source can be a light emitting diode (LED), such as one or more of white LED, red, green, blue (RGB) LED, ultraviolet (UV) LED, or the like. The light sensor can be one or more of an RGB sensor configured to detect color, infrared (IR) color sensor, UV sensor, or the like. In some cases, both the light source and detector would be pressed up against the skin, such that light would penetrate into the tissue and take on the spectral features of the tissue itself. In some scenarios, one or more optical sensor can include an imaging device, such as a charge-coupled device (CCD), CMOS image sensor, or the like.

In some cases, ultra bright LEDs, an RGB sensor, and polyester optical filters can be used as components of the one or more optical sensors to measure through tissue color differentiation. For example, because surface color can be measured from reflected light, a color can be measured from light which has passed through the tissue first for a given geometry. This can include color sensing from diffuse scattered light, from an LED in contact with the skin, or the like. An LED can be used with a proximal RGB sensor to detect the light which has diffused through the tissue. The optical sensors can image with diffuse internal light or surface reflected light.

One or more of the plurality of electronic components can be controlled by a control module. The control module can receive and process one or more measurements obtained by the one or more sensors. An external control module can be connected to at least some of the plurality of electronic components via a connector 440. In some cases, the connector 440 can be positioned at the end of a conductive track portion as illustrated in FIG. 4B or attached to the conductive track portion at a position away from the end as illustrated in FIG. 4A (such as, attached to the top of the track portion with glue). The control module can include one or more controllers or microprocessors, memory, or the like. In some cases, one or more controllers can be positioned on the substrate, and the connector 440 is not used. In some cases, data and commands can be communicated wirelessly, such as by a transceiver positioned on the substrate, and the connector 440 is not used.

In some cases, additional or alternative sensors can be positioned on the substrate, such as one or more pH sensors, pressure sensors, perfusion sensors, or the like.

In some cases, a substrate can be perforated as illustrated in FIG. 4B. A plurality of perforations 460 can be formed in the substrate 400B, allowing fluid to pass through the substrate. It may be advantageous to use a perforated substrate in conjunction with application of negative pressure wound therapy, during which reduced pressure is applied to the wound covered by a dressing and which causes removal of fluid (such as wound exudate) from the wound. Perforations 460 can be formed around a plurality of electronic components and connections as illustrated in FIG. 4B. Perforations 460 can be formed as slits or holes. In some cases, perforations 460 can be small enough to help prevent tissue ingrowth while allowing fluid to pass through the substrate.

In some cases, any of the wound dressings or wound dressing components described herein can be part of a kit that also includes a negative pressure wound therapy device. One or more components of the kit, such as the sensor integrated substrate, secondary dressing, or the negative pressure wound therapy device can be sterile.

Any of the embodiments disclosed herein can be used with any of the embodiments described in International Patent Publication No. WO2017/195038, titled "SENSOR ENABLED WOUND MONITORING AND THERAPY APPARATUS," International Patent Publication No. WO2018/189265, titled "COMPONENT STRESS RELIEF FOR SENSOR ENABLED NEGATIVE PRESSURE WOUND THERAPY DRESSINGS," International Patent Application No. PCT/EP2018/069886, titled "SKEWING PADS FOR IMPEDANCE MEASUREMENT," and International Patent Application No. PCT/EP2018/075815, titled "SENSOR POSITIONING AND OPTICAL SENSING FOR SENSOR ENABLED WOUND THERAPY DRESSINGS AND SYSTEMS," each of which is incorporated by reference in its entirety.

Encapsulation and Stress Relief

In some cases, while it may be desirable for a substrate to be stretchable or substantially stretchable to better conform to or cover the wound, at least some of the electronic components or connections may not be stretchable or flexible. In such instances, undesirable or excessive localized strain or stress may be exerted on the one or more electronic components, such as on the supporting area or mountings of an electronic component, when the substrate is positioned in or over the wound. For example, such stress can be due to patient movement, changes in the shape or size of the wound (such as, due to its healing), or the like. Such stress may cause movement, dislodgment, or malfunction of the one or more electronic components or connections (for example, creation of an open circuit from a pin or another connector becoming disconnected). Alternatively or additionally, it may be desirable to maintain the position of one or more electronic components, such as one or more sensors, in the same or substantially same location or region with respect to the wound (such as, in contact with the wound) so that measurements collected by the one or more electronic components accurately capture changes over time in the same or substantially same location or region of the wound. While the surface of the stretchable substrate may move when, for example, the patient moves, it may be desirable to maintain same or substantially same locations of one or more electronic components relative to the wound.

To address these problems, in some cases, non-stretchable or substantially non-stretchable coating (such coating can sometimes be referred to as "hard coat") can be applied to one or more electronic components, one or more electronic connections, or the like. Hard coat can provide one or more of reinforcement or stress relief for one or more electronic components, one or more electronic connections, or the like. Hard coating can be formed from acrylated or modified urethane material. For example, hard coat can be one or more of Dymax 1901-M, Dymax 9001-E, Dymax 20351, Dymax 20558, Henkel Loctite 3211, or another suitable material. Hard coat can have viscosity from about 13,500 cP to 50,000 cP before being cured or from about 3,600 cP to about 6,600 cP before being cured. In some cases, hard coat can have viscosity of no more than about 50,000 cP. Hard coat can have hardness from about D40 to about D65 and/or linear shrinkage of about 1.5-2.5%.

As described herein, one or more coatings can be applied to encapsulate or coat one or more of the substrate or components supported by the substrate, such as the electronic connections or the electronic components. Such coating(s) can provide biocompatibility, shield or protect the electronics from coming into contact with fluids, provide padding for the electronic components to increase patient comfort, or the like. As used herein, biocompatible can mean being in compliance with one or more applicable standards, such as ISO 10993 or USP Class VI. Such coating cam be sometimes referred to as "conformal coat" or "soft coat." Soft coat can be stretchable or substantially stretchable. Soft coat can be hydrophobic or substantially hydrophobic. Soft coat can be non-conductive.

Soft coat can be formed from one or more suitable polymers, adhesives, such as 1072-M adhesive (for example, Dymax 1072-M), 1165-M adhesive (such as, Dymax 1165-M), parylene (such as, Parylene C), silicones, epoxies, urethanes, acrylated urethanes, acrylated urethane alternatives (such as, Henkel Loctite 3381), or other suitable biocompatible and substantially stretchable materials. Soft coat can be thin coating, for example, from about 80 microns or less up to several millimeters or more. Soft coat can have hardness lower than about A100, A80, A50 or lower. Soft coat can have elongation at break higher than about 100%, 200%, 300% or more. Soft coat can have viscosity of about 8,000-14,500 centipoise (cP). In some cases, coating can have viscosity no less than about 3,000 cP. In some cases, coating can have viscosity less than about 3,000 cP.

Any of the hard or soft coats described herein can be applied by one or more of laminating, adhering, welding (for instance, ultrasonic welding), curing by one or more of light, UV, thermal (such as, heat), or the like. Any of the hard or soft coat described herein can be transparent or substantially transparent to facilitate optical sensing. Any of the coatings described herein can retain bond strength when subjected to sterilization, such as EtO sterilization. Any of the coatings described herein can be modified to fluoresce, such as under UV light.

Measuring Impedance or Conductance

Electronic components or electronic connections, such as sensors, connections, or the like, can be placed or positioned on or embedded in one or more wound dressing components, which can be placed at a wound site, such as in or on the wound, skin, or both the wound and the skin. From data associated with the one or more electronic components or connections, a processor (or multiple processors) can determine one or more physiological characteristics associated with the patient.

In some cases, the one or more physiological characteristics can include impedance or a conductance of tissue, for example tissue that is associated with a wound of the patient. A determination of impedance or a conductance of tissue can provide several advantages. For example, the impedance or the conductance of the tissue can be indicative of characteristics related to health or healing of the tissue (such as, lower impedance or higher conductance can be indicative of presence of fluid, such as exudate or blood, with blood having lower impedance than exudate). As another example, an impedance or a conductance analysis can be used as a diagnostic tool, for example, being usable to differentiate tissues, such as those in a healed state from those in a partially healed state (such as, higher impedance can be indicative or dead tissue). Furthermore, in many instances, patterns or changes in impedance or conductance or variables associated with impedance or conductance can be utilized to develop models indicative of a health status of a wound. For example, some changes in impedance or conductance over time may be suggestive of healing, while others may be suggestive of the tissue worsening in health. For instance, increase in impedance can indicate healing, which can be due to decreased production of exudate as the wound is healing.

Notwithstanding the advantages of determining impedance or conductance of a patient's tissue, accurate and reliable impedance measurements or conductance measurements can be difficult to obtain. For example, to obtain an impedance or conductive measurement, a system can generate and transmit an electrical signal through the patient's tissue, while also measuring the electrical signal after it has passed through the tissue. In theory, using the generated electrical signal and the measured electrical signal, an electronic circuit, such as a processor, can determine an impedance or conductive measurement. However, in many cases, the generated electrical signal is not identical to the electrical signal that is actually transmitted through the patient's tissue. This can be a result of many factors including, but not limited to, distortion of the electrical signal by one or more components of the circuitry that measures impedance or conductance. For example, an electronic circuit that the generated electrical signal is communicated through prior to being applied to the tissue can introduce distortion or noise due to, for example, thermal noise, coupling or environmental factors. In some cases, distortion or noise can be become significant, for example, due to attenuation caused by low capacitance coupling of the signal to the tissue, which can reduce the signal amplitude. The use of amplifiers is necessary to increase the signal amplitude for measurement, unfortunately the amplifiers also amplify the noise. In some cases, such distortion or noise can be caused by or amplified by parasitic capacitance. Parasitic capacitance is generally an unavoidable and usually unwanted capacitance that is introduced by electronic components, such as a capacitance of two adjacent traces. Parasitic capacitance is associated with conductors such as wires and PCB tracks as well as components traces, some coatings, among other things. Distortions or noise, such as due to parasitic capacitance, can become more of an issue as a signal frequency increases. Additionally or alternatively, distortions or noise can become particularly pronounced or amplified when the electrical signal is of a low intensity or magnitude, which may be the case in order to prevent or minimize the risk of injury or discomfort to the patient.

Systems, methods, and apparatuses are disclosed which can provide accurate and reliable impedance or conductance measurements of any type of human or animal tissue. For example, systems, methods, and apparatuses can include a measurement circuit that can measure the electrical signal after it has been communicated through at least a portion of the electronic circuit. The measurement can correspond to the electrical signal before it is applied to the tissue. Using the measurement of the electrical signal after it has been communicated through at least a portion of the electronic circuit and a measurement of the electrical signal after it passes through at least a portion of the tissue, a processor can determine an impedance of conductance of the tissue. In some cases, measuring the excitation signal after it has been communicated through at least a portion of the electronic circuit removes or compensations for distortion or noise due to, for example, capacitance of the electronic circuit from the determined impedance or conductance of the tissue. By removing distortion or noise from the impedance measurement, measurement accuracy can be increased. In addition, implementations disclosed herein can provide for safe impedance or conductance measurements by minimizing or eliminating the risk of injury or discomfort to a patient. This can be achieved, for example, by using AC coupling (which can provide return path for electrical current) rather than DC coupling, and thereby minimizing or preventing the risk of applying unwanted or unsafe electrical signals to tissue. In addition to or alternatively, DC coupling may involve the one or more excitation or sensor pads coming into contact with the tissue, which may not be possible when the electrical components are encapsulated, for example, with non-conductive coating as described herein.

Figure 5:
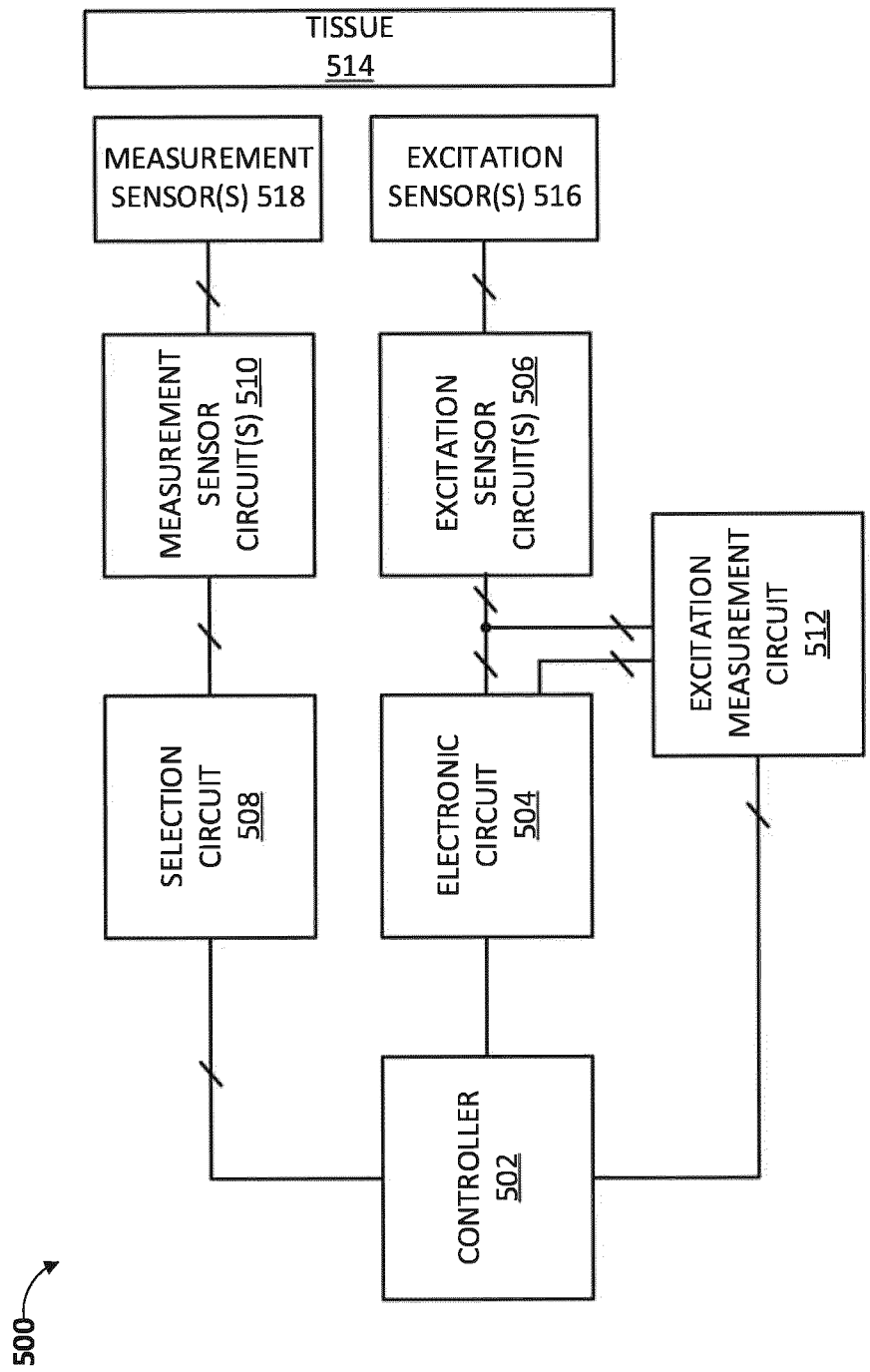
FIG. 5 is a schematic diagram of a wound monitoring and/or therapy system for determining impedance or conductance of tissue of a patient.

FIG. 5 is a schematic diagram of a monitoring and/or therapy system 500 for determining impedance or capacitance of tissue of a patient (such as wound tissue). As illustrated, the monitoring and/or therapy system 500 can include a controller 502, an electronic circuit 504, one or more excitation sensor or pad circuits 506, a selection circuit 508, one or more measurement sensor circuits 510, an excitation measurement circuit 512, one or more excitation pads 516 (which can be same as or similar to the pads 415), and one or more measurement sensors 518 (which can be same as or similar to the pads 410). However, it will be understood that the monitoring and/or therapy system 500 can include fewer or more components as desired. For example, the monitoring and/or therapy system 500 may not include a selection circuit 508. Furthermore, in some cases, some of these separate components may be combined in a variety of ways to achieve particular design objectives. For example, the selection circuit 508, the measurement sensor circuit(s) 510, the electronic circuit 504, the excitation measurement circuit 512, or the excitation pad circuit(s) 506 may be combined with controller 502 components, for example, to save cost or improve performance. Any two or more of the controller 502, electronic circuit 504, excitation pad circuit(s) 506, selection circuit 508, measurement sensor circuit(s) 510, excitation measurement circuit 512, excitation pad(s) 516, or measurement sensor(s) 518 can be in electrical communication.

The controller 502 can be an implementation of the control module of FIG. 3E or any other control modules, controllers, or electronic circuitry configured to implement programmable control or hardwired control described herein. The controller 502 can generate one or more excitation signals to be applied to tissue 514 by the excitation pad(s) 516. The one or more excitation signals can be any of a variety of signals. For example, the excitation signals can include one or more of a sinusoidal wave, a square wave, or a pulse width modulation (PWM) pulse, among other signals. An excitation signal generated by the controller 502 can have a frequency between 1 kHz and 1200 kHz, 5 kHz to 600 kHz, between 37 kHz and 70 kHz, or about 50 kHz. In some cases, at lower frequencies the coupling pad impedance increases, while at higher frequencies the tissue impedance reduces. Both can result in a lower voltage for measuring. It will be understood that the controller 502 can generate an excitation signal having any of a wide spectrum of frequencies. In some cases, an excitation signal generated by the controller 502 is less than 5V. For example, a peak-to-peak voltage of the excitation signal can be less than 3.3V or less than 1V. However, it will be understood that the controller 502 can generate an excitation signal having various other voltages. The controller 502 can include a processor or microcontroller. The controller 502 can maintain a real-time clock.

The excitation pad circuits(s) 506 can be connected to excitation pad(s) 516 (sometimes referred to as drive pads, excitation sensors, or excitation electrodes) that apply the excitation signal(s) from the controller 502 to the tissue 514 of a patient. In use, the excitation pad(s) 516 can be proximate to tissue 514, which in some cases can include at least a portion of a wound or wound site. Some or all of the excitation pad(s) 516 can be integrated into a substrate or wound dressing using any of the approaches described herein. For example, one or more of the excitation pads can be positioned on a flexible circuit board, a substantially flexible substrate, or the like. As described herein, the excitation pad(s) can be capacitively-coupled with no direct conductive pathway to the tissue. The one or more excitation pads 516 can be individually or collectively referred to as an excitation pad 516, excitation pad(s) 516, or excitation pads 516. As described herein in more detail, the excitation pad(s) 516 can be utilized in combination with one or more of the measurement sensors 518 to determine an impedance or conductance associated with the tissue 514.

The one or more excitation pad circuits 506 can be electrically coupled to the one or more excitation pads 516 such that an excitation signal is communicated through an excitation pad circuit 506 prior to being applied to tissue 514 by an excitation pad 516. In some cases, the system 500 includes a separate excitation pad circuit 506 for each excitation pad 516. As another example, the system 500 can include an excitation pad circuit 506 for a set of two or more excitation pads 516. The one or more excitation pad circuits 506 can be individually or collectively referred to as excitation pad circuit 506, excitation pad circuit(s) 506, or excitation pad circuits 506. An excitation pad circuit 506 may be combined with an excitation pad 516, and the combined excitation pad and excitation pad circuit can be individually or collectively referred to as excitation pad 516, excitation pad(s) 516, or excitation pads 516.

The measurement sensor(s) 518 (sometimes referred to as measurement pads or measurement electrodes) can measure or detect a voltage or current. The measurement sensor(s) 518 can be proximate to tissue 514, which in some cases can include at least a portion of a wound. For example, some or all of the measurement sensor(s) 518 can be integrated into a wound dressing using any of the approaches described herein. For instance, one or more of the measurement pads can be positioned on a flexible circuit board or a substantially flexible substrate. The measurement sensor(s) 518 can be positioned in a space separating two or more excitation pads 516. In use, the measurement sensor(s) 518 measure or detect a voltage or current responsive to the excitation signal(s) applied to the tissue 514 by the excitation pad(s) 516. The one or more measurement sensors 518 can be individually or collectively referred to as a measurement sensor(s) 518, measurement sensor(s) 518, or measurement sensors 518. As described herein in more detail, the measurement sensor(s) 518 can be utilized in combination with the excitation pad(s) 516 to determine an impedance or conductance associated with the tissue 514.

The one or more measurement sensor circuits 510 can be electrically coupled to the measurement sensor(s) 518 such that a measurement or signal is communicated through a measurement sensor circuit 510 prior to being communicated to a selection circuit 508 or the controller 502. In some cases, the system 500 includes a separate measurement sensor circuit 510 for each measurement sensor 518. As another example, the system 500 can include an excitation pad circuit 506 for a set of two or more measurement sensors 518. The one or more measurement sensor circuits 510 can be individually or collectively referred to as a measurement sensor circuit 510, measurement sensor circuit(s) 510, or measurement sensor circuits 510. A measurement sensor circuit 510 may be combined with a measurement sensor 518, and the combined measurement sensor and measurement sensor circuit can be individually or collectively referred to as a measurement sensor(s) 518, measurement sensor(s) 518, or measurement sensors 518.

The electronic circuit 504 can be utilized to communicate the excitation signal(s) generated by the controller 502 to the excitation pad(s) 516. As described herein, the electronic circuit 504 can be configured to condition the excitation signal(s) generated by the controller 502. In some cases, the electronic circuit 504 merely includes the electronic pathway from the controller 502 to the excitation pad 506. However, as described herein, the electronic circuit 504 can include various active or passive electronic components. The electronic circuit 504 can distort or otherwise affect the excitation signal(s) from the time that the excitation signal(s) are generated by the controller 502 to the time that the excitation signal(s) are applied by the excitation pad(s) 516. For example, as illustrated in FIG. 5, the electronic circuit 504 can be positioned between the controller 502 and the excitation pad(s) 516 such that the excitation signal(s) are communicated to the electronic circuit 504 prior to being applied to the tissue 514 via the excitation pad(s) 516. In some cases, the electronic circuit 504 can introduce distortion or noise that affects the excitation signal(s). This can be due to capacitance of the electronic circuit 504, such as parasitic capacitance. For example, the electronic circuit 504 can include one or more wires, PCB tracks, or traces or passive or active electronic components, among other things, that can distort the excitation signal(s). Distortion of the excitation signal(s) can be particularly pronounced or amplified when the excitation signal(s) are of low intensity or magnitude, which may be the case in order to prevent or minimize the risk of injury or discomfort to the patient. The excitation signal can be 1V to 5V peak to peak. In some cases, the excitation signal is less than 1V peak-to-peak. In some cases, the excitation signal is greater than 5V peak-to-peak.

The selection circuit 508 can be electrically coupled to the controller 502 and each of the measurement sensor circuit(s) 510 or measurement sensor(s) 518. In some cases, the system 500 includes a plurality of measurement sensors 518, and the selection circuit 508 can select one or more of the plurality of measurement sensor(s) 518 (or measurements from those sensors). For example, the selection circuit 508 can include one or more multiplexors, each multiplexor having multiple inputs (e.g., an input associated with each of the measurement sensor(s) 518), a single output, and one or more select lines that can be used to select which input to send to the output. The controller 502 can provide the multiplexors with one or more signals for the select lines, which can be used by the multiplexors to select which input line to send to the output. The selection circuit 508 can communicate one or more signals to the controller 502 that correspond to the output(s) of the multiplexor(s).

The excitation measurement circuit 512 can be in electrical communication with the controller 502, the electronic circuit 504, the excitation pad circuit(s) 506, or the excitation pad(s) 516. The excitation measurement circuit 512 can measure an excitation signal after the excitation signal has been communicated through at least a portion of the electronic circuit 504. The excitation measurement circuit 512 can measure an excitation signal before it is applied to the tissue via the plurality of excitation pad(s) 516. The measurement(s) of the excitation measurement circuit 512 can be obtained by the controller 502 and, in some cases, can be utilized by the controller 502 to determine impedance or conductance of the tissue 514. For example, the controller 502 can determine impedance or conductance based at least in part on the measurement(s) of the excitation measurement circuit 512 and the selected signal of the selection circuit 508.

The excitation measurement circuit 512 can measure a voltage of an excitation signal, a current of an excitation signal, or both. In some cases, the excitation measurement circuit 512 measures the excitation signal(s) corresponding to each excitation pad 516. For example, the system 500 can include two or more excitation pads 516, and the excitation measurement circuit 512 can measure a current and/or a voltage of the particular excitation signal(s) corresponding to each of the excitation pads 516. In some cases, the excitation signal is a differential signal. In cases such as these, the excitation measurement circuit 512 can measure a voltage or current associated with each portion (e.g., positive portion or negative portion) of the differential signal.

Although illustrated as separate components for ease of reference, one or more of the circuits of the system 500 can be part of the control module that includes the controller 502. For example, one or more of the electronic circuit 504, selection circuit 508, excitation measurement circuit 512, and excitation pad circuit(s) 506 can be included in the control module.

Figure 6A:
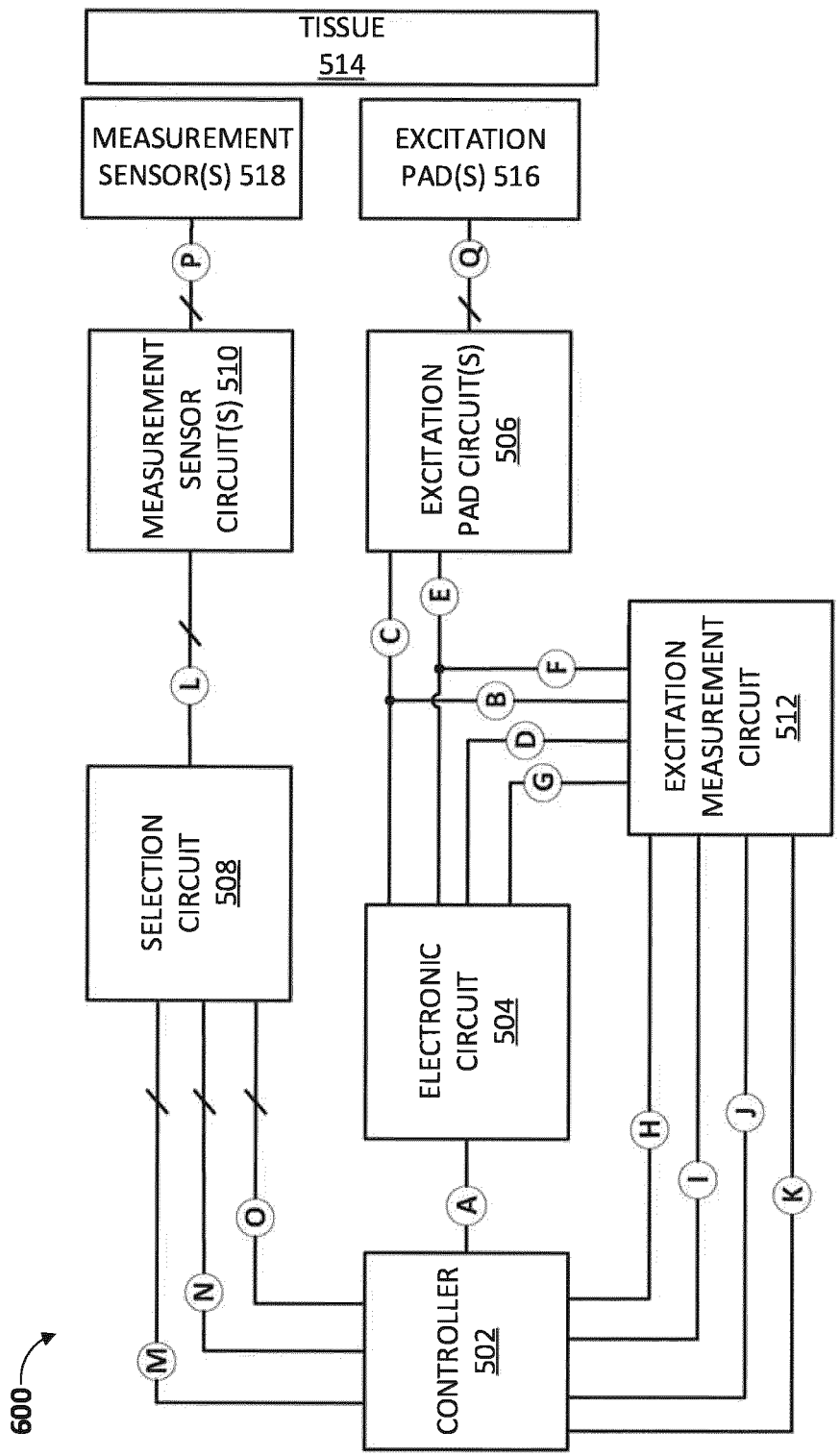
FIG. 6A is a schematic diagram of a wound monitoring and/or therapy system for determining impedance or conductance of tissue of a patient.

FIG. 6A is a schematic diagram of a monitoring and/or therapy system 600 for determining impedance or conductance of tissue of a patient. Similar to FIG. 5, the monitoring and/or therapy system 600 includes a controller 502, an electronic circuit 504, one or more excitation pad circuits 506, a selection circuit 508, one or more measurement sensor circuits 510, and excitation measurement circuit 512, one or more excitation pads 516, and one or more measurement sensors 518. As illustrated in FIG. 6A, the diagram shows various paths A-Q, which are included for illustration purposes to reduce the complexity of a comparison between the schematic diagram of FIG. 6A and the detailed schematic diagrams for FIGS. 6B-6E. Paths A-Q are shown for illustration purposely only.

Figure 6B:
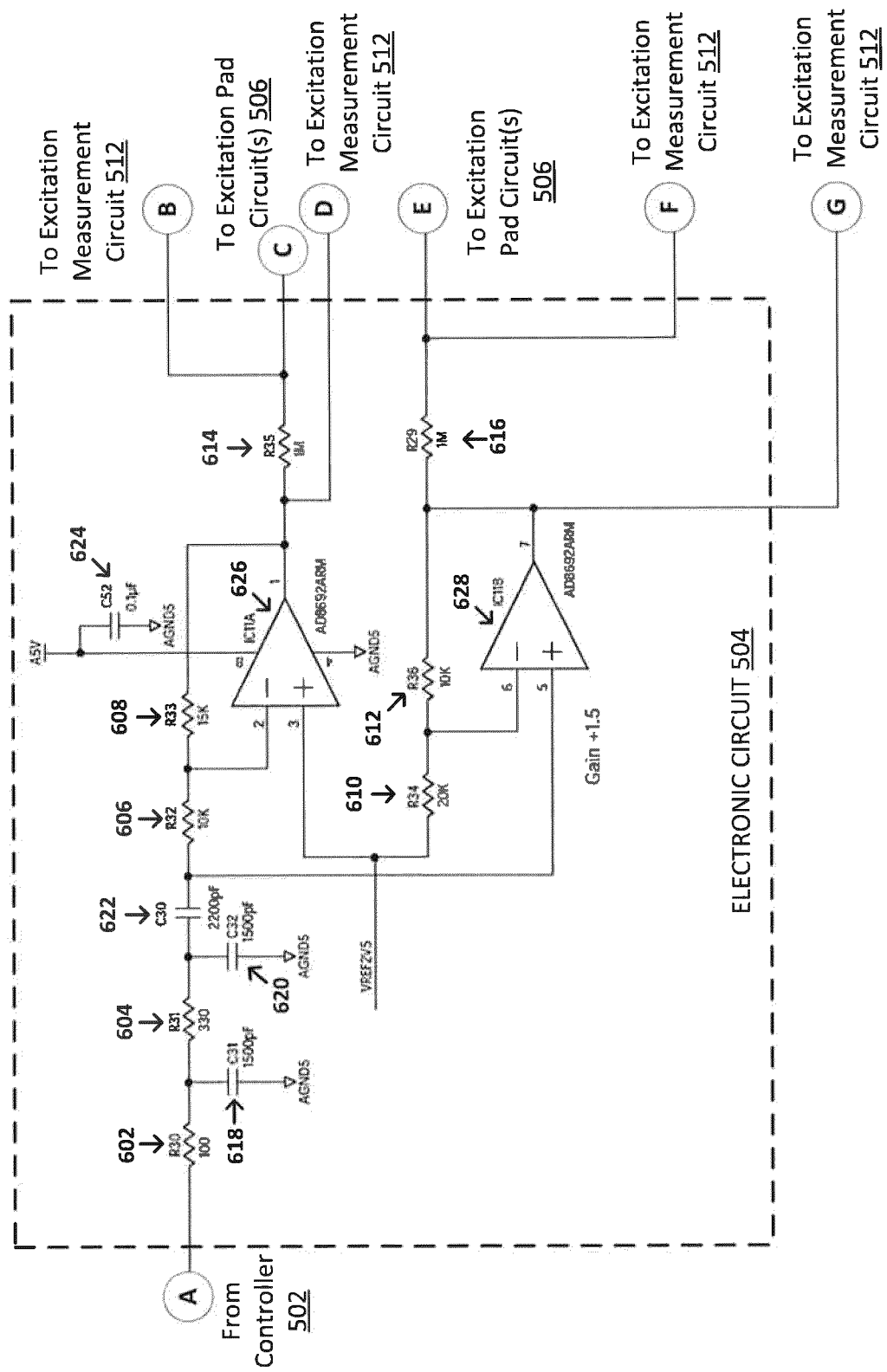
FIG. 6B is an example detailed schematic diagram of the electronic circuit 504 of the wound monitoring and/or therapy system of FIG. 6A.

FIG. 6B is an example detailed schematic diagram of the electronic circuit 504 of the monitoring and/or therapy system 600 of FIG. 6A. As illustrated, the electronic circuit 504 can include a plurality of resistors 602, 604, 606, 608, 610, 612, 614, 614, a plurality of capacitors 618, 620, 622, 624, and two operational amplifiers 626, 628. The electronic circuit 504 can be configured to condition an excitation signal received from the controller 502, such as by one or more of filtering or buffering the excitation signal. For example, the input from controller 502 can include a stepped sine wave from a digital to analog converter in the controller 502. As illustrated, the resistors 602, 604 and capacitors 618, 620 can be arranged to form a second order passive filter. In some cases, the resistors 602, 604 and capacitors 618, 620 can be a low pass filter that attenuates the steps of the input signal, leaving a smother sine wave by reducing the amplitude of the harmonics. Furthermore, in some cases, the capacitor 622 can block the remaining DC component of the input signal. The electronic circuit 504 can be configured to provide a differential voltage or current corresponding to the excitation signal received from the controller 502. For example, operational amplifiers 626, 628 can be arranged in the electronic circuit 504 such that the electronic circuit 504 provides a differential output across resistors 614 and 616. The output across resistor 614 can correspond to a positive portion of the differential output, while the output across resistor 616 can correspond to a negative portion of the differential output. The output across resistor 614 can correspond to a negative portion of the differential output, while the output across resistor 616 can correspond to a positive portion of the differential output. In some cases, amplifier 626 can be an inverting amplifier with a gain of 1.5 or amplifier 628 can be a non-inverting amplifier with a gain of 1.5, thereby resulting in a differential signal. The voltage developed across resistors 614 and 616 can be used to measure the current being applied to the tissue.

As noted by paths C and F, the differential output (for example, including the negative and positive portions of the differential pair) can be provided to the excitation pad circuit(s) 506, such that the excitation pad(s) can 516 can apply the differential output to the tissue 514. Furthermore, as described in more detail herein, the electronic circuit 504 can include one or more connections to the excitation measurement circuit 512, noted by paths C, D, F, and G.

The electronic circuit 504 can include fewer, more, or different components as desired. For example, the electronic circuit 504 does not include one or both of resistor 612 or resistor 616, as one or both can introduce capacitive noise into the excitation signal, for example due to long traces. Resistor 612 or resistor 616 can be included in another circuit of the system 500, such as the excitation measurement circuit 512 or the excitation pad circuit(s) 506.

Figure 6C:
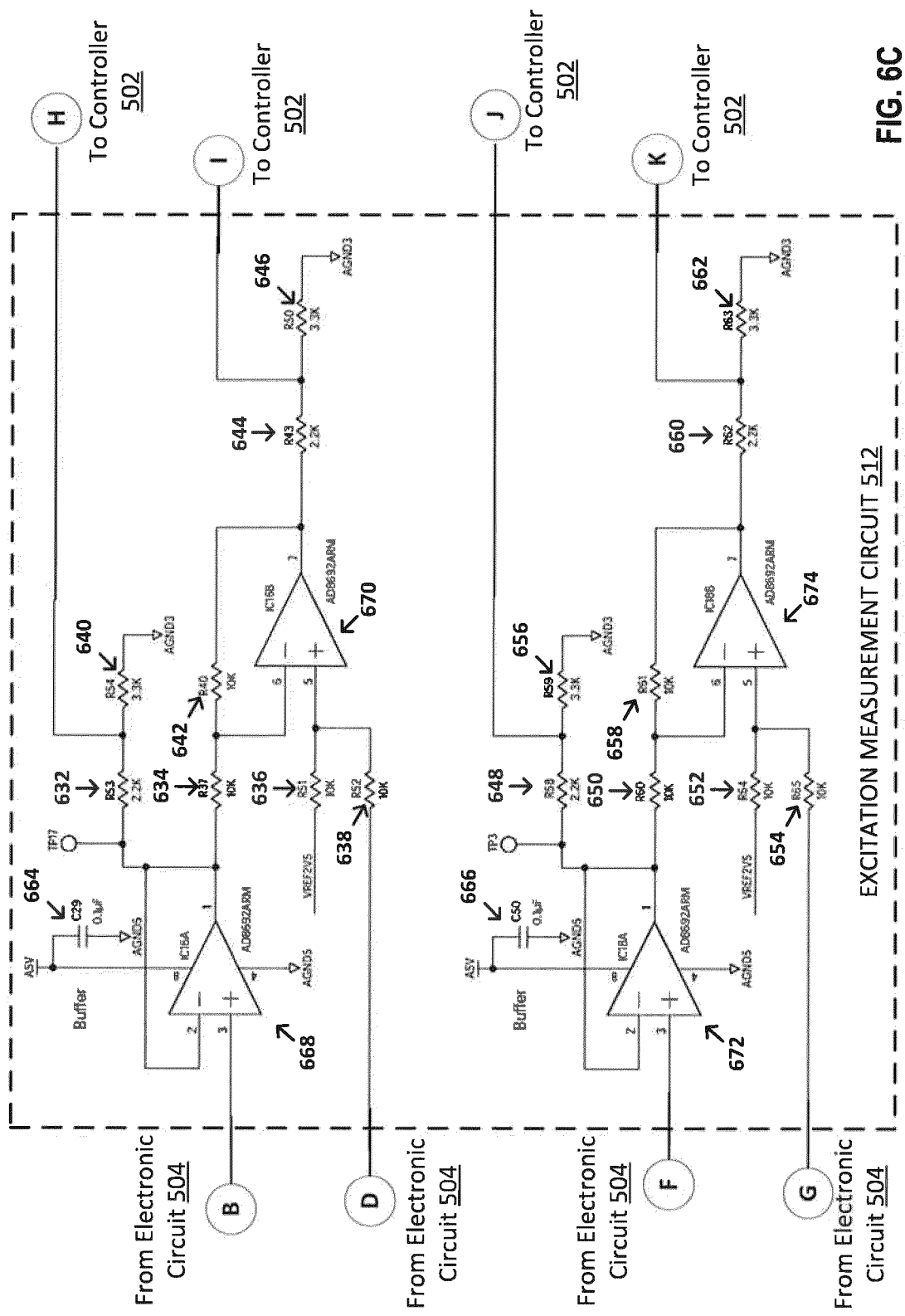
FIG. 6C is an example detailed schematic diagram of the excitation measurement circuit of the wound monitoring and/or therapy system of FIG. 6A.

FIG. 6C is an example detailed schematic diagram of the excitation measurement circuit 512 of the monitoring and/or therapy system 600 of FIG. 6A. As illustrated, the excitation measurement circuit 512 can include a plurality of resistors 632, 634, 636, 638, 640, 642, 644, 648, 650, 652, 654, 656, 658, 660, 662, a plurality of capacitors 664, 666, and a plurality of operational amplifiers 668, 670, 672, 674.

The excitation measurement circuit 512 can be configured to buffer the differential output of the electronic circuit 504. Furthermore, the excitation measurement circuit 512 can be configured to output, to the controller 502, a current or voltage measurement of each of the negative and positive portion of the differential output of the electronic circuit 504.

For example, operational amplifiers 668 or 670 can buffer voltage or current output from the positive portions of the differential output of the electronic circuit 504. The excitation measurement circuit 512 can output, to the controller 502 (e.g., via path H), a voltage corresponding to the positive portion of the differential output of the electronic circuit 504. The excitation measurement circuit 512 can output, to the controller 502 (e.g., via path I), a current corresponding to the positive portion of the differential output of the electronic circuit 504.

As another example, operational amplifiers 672 or 674 can buffer voltage or current output from the negative portion of the differential output of the electronic circuit 504. The excitation measurement circuit 512 can output, to the controller 502 (e.g., via path H), a voltage corresponding to the negative portion of the differential output of the electronic circuit 504. The excitation measurement circuit 512 can output, to the controller 502 (e.g., via path I), a current corresponding to the negative portion of the differential output of the electronic circuit 504.

The excitation measurement circuit 512 can include fewer, more, or different components as desired. For example, the excitation measurement circuit 512 does not include one or both of operational amplifier 668 or operational amplifier 672, for example because they may introduce capacitive or other noise.

Figure 6D:
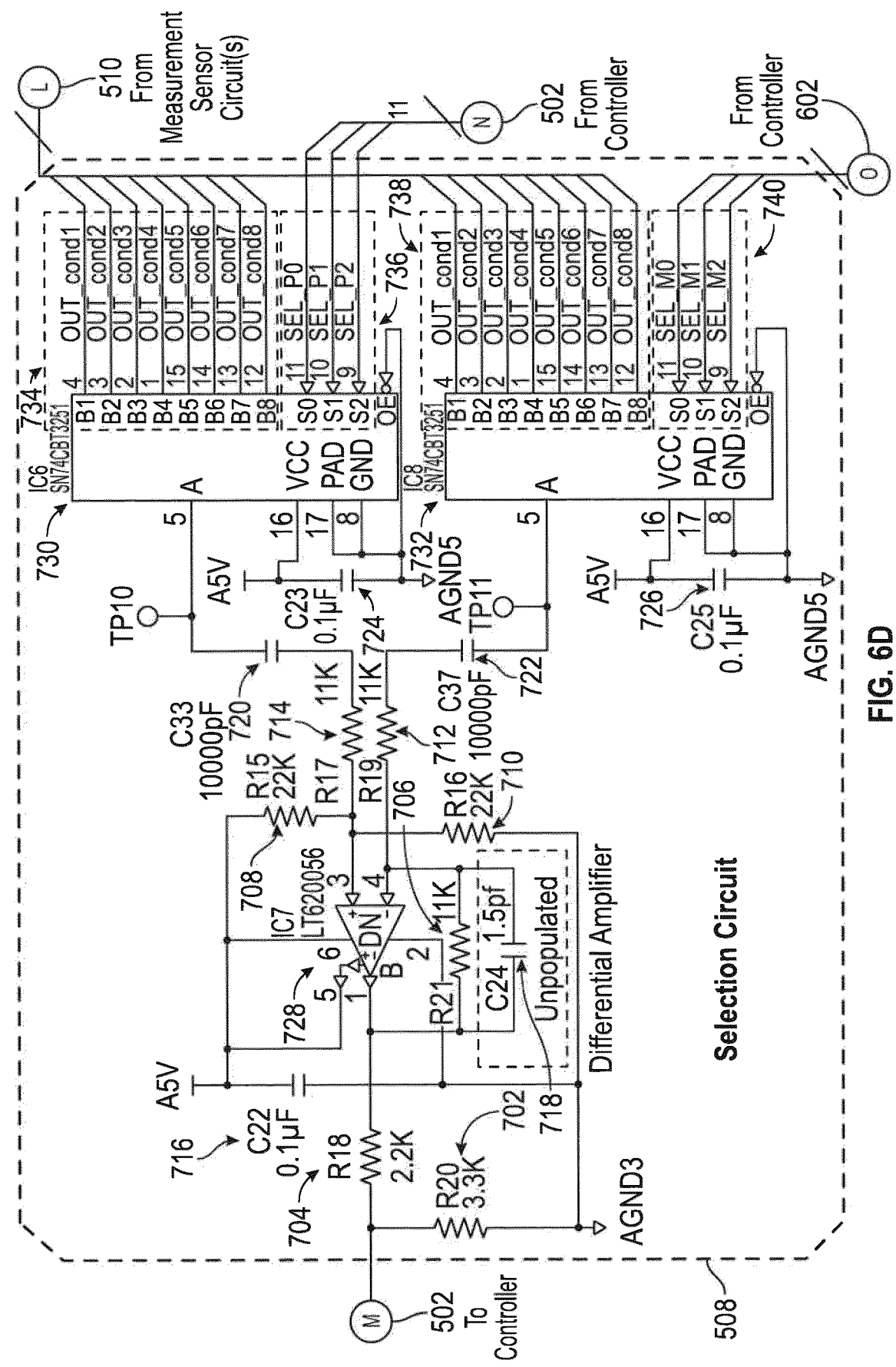
FIG. 6D is an example detailed schematic diagram of the selection circuit of the wound monitoring and/or therapy system of FIG. 6A.

FIG. 6D is an example detailed schematic diagram of the selection circuit 504 of the monitoring and/or therapy system 600 of FIG. 6A. As illustrated, the selection circuit 504 can include a plurality of resistors 702, 704, 706, 708, 710, 712, 714, a plurality of capacitors 716, 718, 720, 722, 724, 726, an operational amplifier 728, and a pair of multiplexers 730, 732. The multiplexer 730 can receive a plurality of inputs 734. Each of the inputs 734 correspond to signals obtained by different measurement sensors 518. In this example, the eight inputs 734 correspond to eight different signals obtained by eight different measurement sensors 518. However, it will be understood that the multiplexer 730 can have fewer or more inputs 734. Similarly, the system can include fewer or more measurement sensors 518. The multiplexer 730 can further receive a plurality of select signals or lines 736 from the controller 502, and the multiplexer 730 can select one of the inputs 734 for output based on select lines 736.

The multiplexer 732 can receive a plurality of inputs 738, which in this example are the same eight inputs that multiplexor 730 receives, and can select one of the inputs 738 for output based on select lines 740, which can be received from the controller 502. It will be understood that the multiplexer 732 can have fewer or more inputs 738. Similarly, the system can include fewer or more measurement sensors 518.

A differential amplifier 728 can receive the output signals from each of the multiplexors 730, 732 and amplify a difference between the two signals. In some cases, the capacitors 720 and 722 are provided before the differential amplifier 728, for example, to achieve capacitive coupling. The capacitors 720 and 722 can block DC or low frequency from the input of the differential amplifier 728. The selection circuit 504 can output a signal to the controller 502. The selection circuit 504 can include fewer, more, or different components as desired.

Figure 6E:
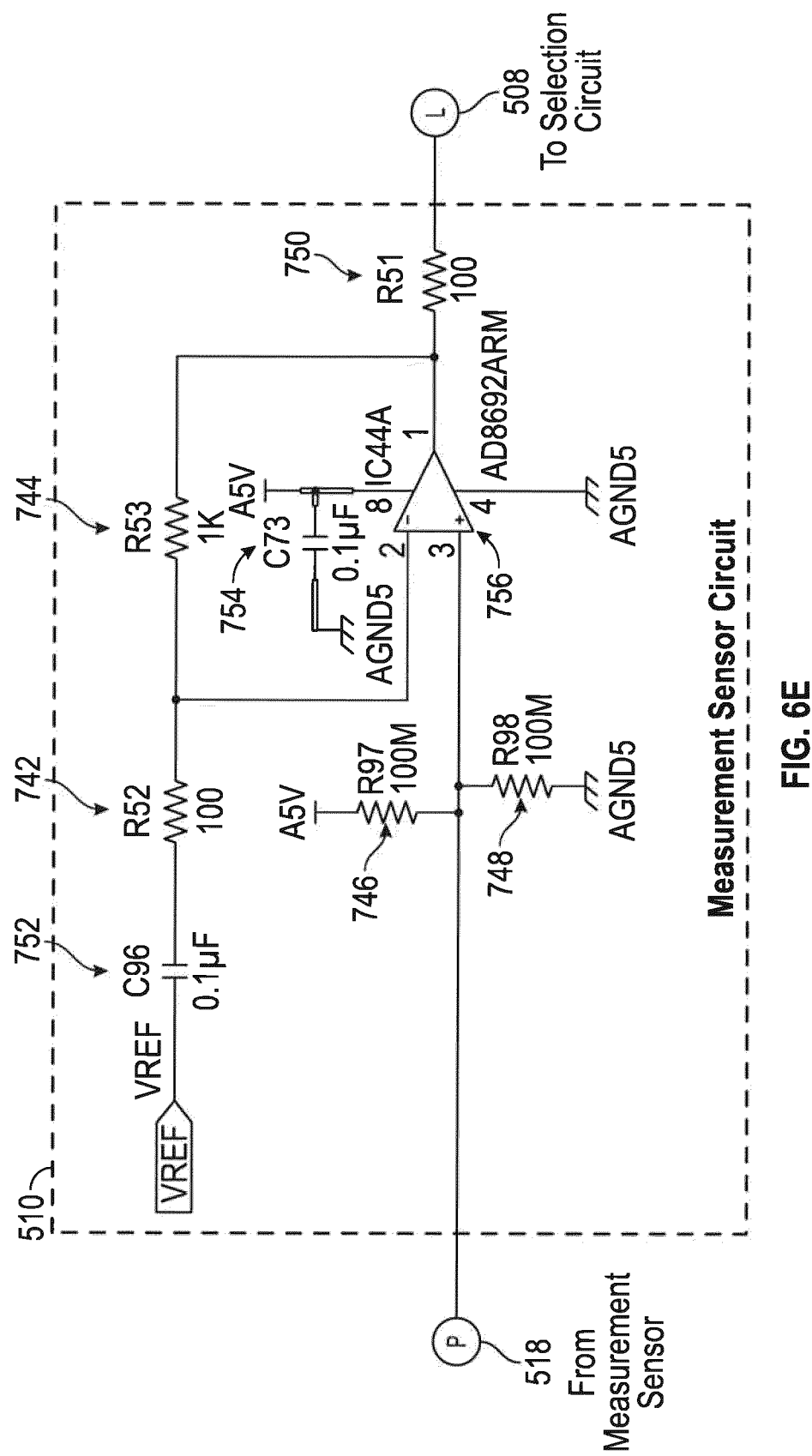
FIG. 6E is an example detailed schematic diagrams of a measurement sensor circuit of the wound monitoring and/or therapy system of FIG. 6A.

FIG. 6E is an example detailed schematic diagrams of a measurement sensor circuit 510 of the monitoring and/or therapy system 600 of FIG. 6A. The measurement sensor circuit 510 can include a plurality of resistors 742, 744, 746, 748, 750, a plurality of capacitors 752, 754, and an operational amplifier 756. The measurement sensor circuit 510 can receive a measurement from a measurement sensor 518. As described herein, the measurement from the measurement sensor 518 can be a voltage or current measurement. The measurement sensor circuit 510 can include fewer, more, or different components as desired.

Figure 7:
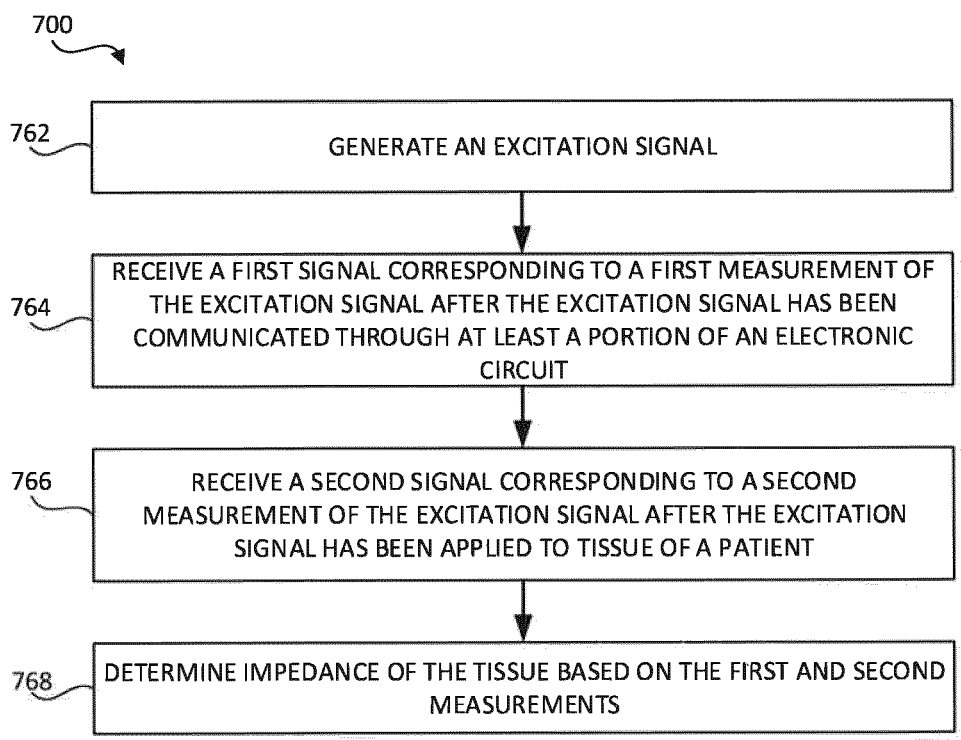
FIG. 7 is a flow diagram illustrative of a routine for determining an impedance or conductance of tissue.

FIG. 7 is a flow diagram illustrative of a process 700 for determining an impedance or conductance of tissue. The elements outlined for routine 700 can be implemented by one or more electronic and/or computing devices that are associated with a monitoring and/or therapy apparatus, such as the controller 502 of FIG. 5.

At block 762, the process 700 can generate an excitation signal. As described herein, the excitation signal can include one or more of a sinusoidal wave, a square wave, or a pulse width modulation (PWM) pulse, among other signals. The excitation signal can have a frequency between 1 kHz and 1200 kHz, 5 kHz to 600 kHz, between 37 kHz and 70 kHz, or about 50 kHz. In some cases, the excitation signal is less than 5V. For example, a peak-to-peak voltage of the excitation signal can be less than 3.3V or less than 1V.

In some cases, the controller 502 communicates the excitation signal to the excitation pads 516. As described herein, the excitation pads 516 can be connected to an electronic circuit 504. For example, the electronic circuit 504 can be positioned between the excitation pads 516 and the controller 502 such that the excitation signal that is generated by the controller 502 is communicated to the excitation pads 516 through the electronic circuit 504. As described herein, the electronic circuit 504 can distort or otherwise affect the excitation signal because of the excitation signal being communicated through the electronic circuit 504.

At block 764, the process 700 can obtain a first signal corresponding to a first measurement of the excitation signal after the excitation signal has been communicated through at least a portion of the electronic circuit 504. As described herein, the system 500 can include an excitation measurement circuit 512 that makes the first measurement. For example, the excitation measurement circuit 512 can measure a current or a voltage of the excitation signal after the excitation signal has been communicated through at least a portion of the electronic circuit 504. The first measurement of the excitation signal can correspond to the measurement of current or voltage by the excitation measurement circuit 512. As described herein, the first measurement of the measurement circuit 512 can correspond to the excitation signal before it is applied to the tissue 514 via the excitation pads 516.

At block 766, the process 700 can obtain a second signal corresponding to a second measurement of the excitation signal after the excitation signal have been applied to tissue of a patient. The second measurement can correspond to a selected one of a plurality of measurements of the measurement sensors 518. For example, as described herein, the system 500 can include measurement sensors 518. The measurement sensors can be positioned at various locations proximate the tissue, and can each measure a current or a voltage of the tissue after the excitation signal has been applied by the excitation pads 516. For example, a particular one of the measurement sensors 518 can be positioned at a particular location that is proximate the tissue 514. Subsequent to the application of the excitation signal by the excitation pads 516, the particular measurement sensor can measurement a current or voltage corresponding to the particular location at which the particular measurement sensor is positioned.

As described herein, the system 500 can include a selection circuit 508 that is electrically connected to the controller 502 and each of the measurement sensor circuits 510 or measurement sensors 518. The controller 502 can communicate one or more selection signals to the selection circuit, and the selection circuit 508 can select one or more of the measurement signals from the measurement sensor circuits 510 or measurement sensors 518 based at least in part on the one or more selection signals received from the controller 502. For example, the selection circuit 508 can include one or more multiplexors 730, 732 and the selection signals from the controller 502 can be used as selection line inputs to the multiplexors 730, 732. The selection circuit can communicate, and the controller 502 can receive, the selected signal.

At block 768, the process 700 can determine an impedance or conductance based at least in part on the first and second signals. In some cases, the process 700 can use Ohm's law (e.g., $V=I*R$) to determine the impedance. For example, the first signal can correspond to a voltage measurement and the second can signal correspond to a current measurement. Accordingly, the impedance can be determined by dividing the voltage measurement by the current measurement. In some cases, conductance is the inverse of impedance. In some cases, the first signal can correspond to a current measurement, the second signal can correspond to a voltage measurement, and the conductance can be determined by dividing the current measurement by the voltage measurement or the impedance can be determined by dividing the voltage measurement by the current measurement.

Example of Measuring Impedance

As an example, the excitation signal generated by the controller 502 can include a 50 kHz square wave. As another example, the excitation signal generated by the controller 502 can include a 50 kHz sinusoidal wave.

The controller 502 can include a digital-to-analog converter (DAC). For example, the controller 502 can generate a digital excitation signal and can covert the digital excitation signal into analog excitation signal(s) before communicating the excitation signal to the excitation pads 516.

The controller 502 can include an analog-to-digital converter (ADC). For example, the second signal received from the selection circuit 508 can include an analog signal. The controller 502 can covert the analog second signal into a digital second signal for further processing. Furthermore, in some cases, the controller 502 can demodulate the digital second signal and decompose the digital second signal into an in-phase component and a quadrature component of the digital second signal. For example, the controller 502 can use IQ-demodulation to determine the 50 kHz component of the second measurement. For example, the controller 502 can demodulate the digital second signal to extract an in-phase (I) and/or quadrature component (Q). In some cases, the controller 502 can demodulate the digital second signal using 50 kHz I and Q clocks (I in phase, Q 90° phase shift). In some cases, the clocks are synchronized to the DAC output.

The demodulation of the digital second signal can produce two output steams. The controller 502 can integrate the two output steams over a period, such between 10 to 100 ms. In some instances, this period can be variable. Furthermore, in some cases, the integrators are not allowed to overflow. In some cases, the total integration time can be a function of the frequency component. For example, in this case, the total integration time can be an integer that is a multiple of 20 uS (the 50 kHz cycle time). In some instances, the I and Q clocks can be a sequence of 1 or −1 toggling at 100 kHz, which can change the multiplication part of the demodulation to an alternate cycle invert. In some cases, I and Q can be digital sine waves, which advantageously reduce harmonics from the measured signal. In some cases, using the methods herein simplifies the computing, for example by removing a need for multiply accumulate operations and replacing them with addition or subtraction operations.

The Q clock can be advanced by 5 uS (1/200 kHz) to give a ¼ cycle phase shift. In some cases, there can be the same number of 1 and −1 steps per cycle to eliminate any DC offset from the output. Furthermore, this can limit the sample rate to a multiple of 200 kHz. In some instances, the controller 502 samples at up to 600 kHz or up to 1 MHz. In some cases, the controller 502 samples in synchronization with the DAC output.

In some cases, an I-output stream is created by multiplying the ADC output by the 50 kHz I clock. In some instances, a Q-output stream is created by multiplying the ADC output by the 50 kHz Q clock. Each stream can be summed into its own register (e.g., signed 32 bit value). In some cases, the random thermal noise will cancel out, while 50 kHz component of I and Q outputs will add up.

Obtained I and Q outputs can be converted to voltage. For example, root mean square measure can be used to obtain the voltage ($V_{rms}=(I^2+Q^2)^{-2}$). Root mean square measure can provide indication of the average measured voltage. Impedance of the tissue can be obtained by dividing the voltage by current of the excitation signal (measured as described herein).

Wound Dressing for Measuring Impedance or Conductance

Figure 8:
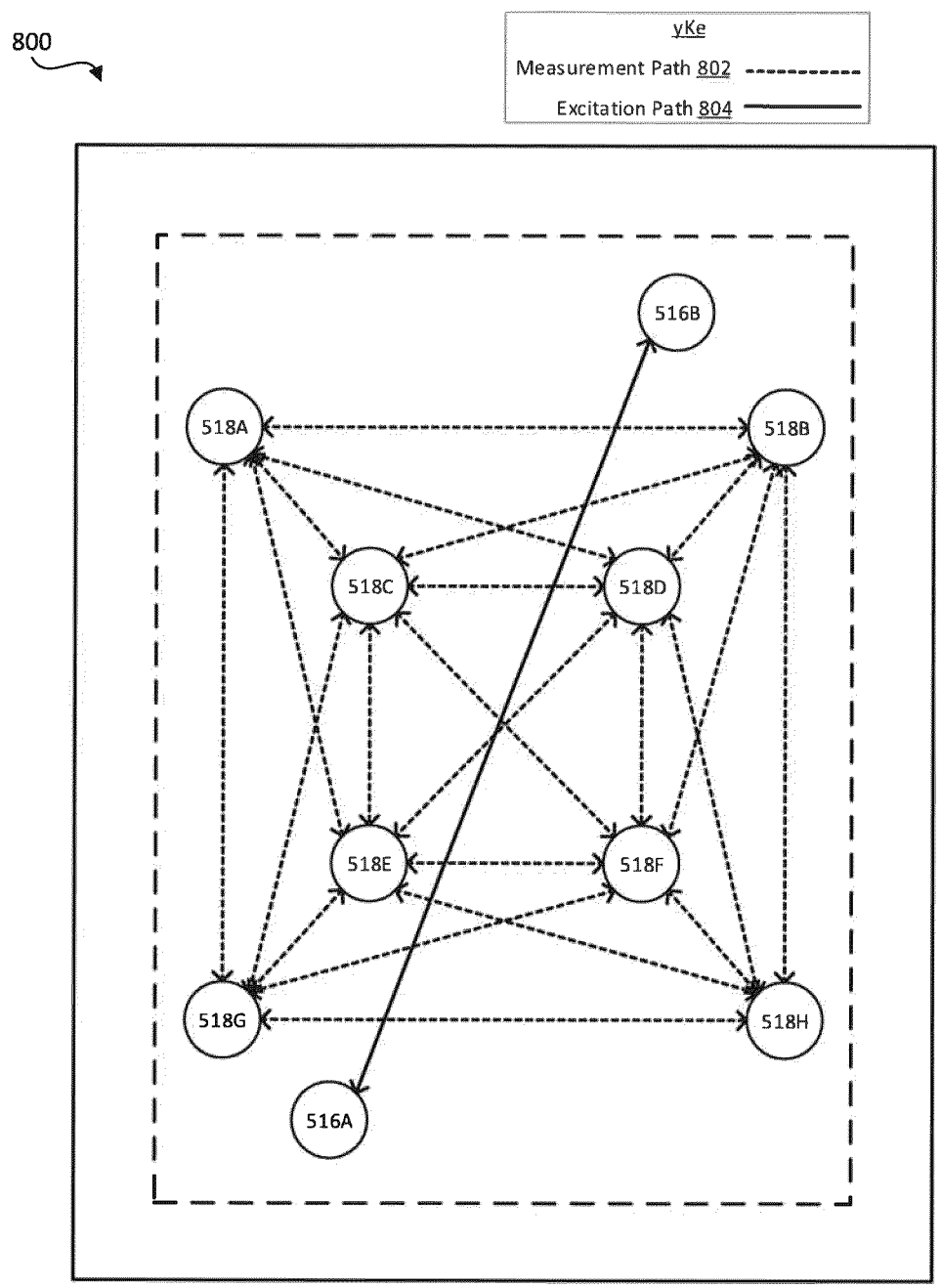
FIG. 8 illustrates an example schematic configuration of a wound dressing.

FIG. 8 illustrates an example schematic configuration of a substrate or wound dressing 800. As illustrated, the substrate or wound dressing 800 can include a plurality of excitation pads 516A, 516B (which can be individually or collectively referred to as excitation pad 516 or excitation pads 516). Furthermore, as illustrated, the substrate or wound dressing 800 can include a plurality of measurement sensors 518A, 518B, 518C, 518D, 518E, 518F (which can be individually or collectively referred to as measurement sensor 518 or measurement sensors 518). At least some of the excitation pads 516 or the measurement sensors 518 can be included integrated into one or more of a flexible circuit board, such as flexible circuit board 301A, 301B, 301C, or 301D, or substrate, such as substrates 400A or 400B. The substrate or wound dressing 800 can be an implementation of any of the substrates disclosed herein (such as, 400A or 400B) or any of the wound dressings disclosed herein (such as, 100 or 155). The substrate or wound dressing 800 will be described with reference to the monitoring and/or therapy system 500.

The excitation pads 516 can be in electrical communication with a controller 502. For example, the controller 502 can generate one or more excitation signals, and the one or more excitation signals can be communicated to the excitation pads 516, for example via an electronic circuit 504. The excitation pads 516 can apply the one or more excitation pads to tissue 514 of a patient so as to create an excitation path 804 between the excitation pads 516.

The excitation pads can be driven using a sinusoidal wave, a square wave, a pulse width modulation (PWM) pulse, or another signal. The excitation pads 516 can be driven by a differential signal. For example, a first excitation 516A can be connected to a positive portion of the differential signal and a second excitation pad 516B can be connected to a negative portion of the differential signal. In some cases, the positive portion of the differential signal and the negative portion of the differential signal are both equal to, and the opposite polarity from, each other.

The measurement sensors 518 can be in electrical communication with the controller 502. For example, each of the measurement sensors 518 can measure a voltage or current, and the measurements from the measurement sensors 518 can be communicated to a selection circuit 508. The selection circuit 508 can select a measurement signal from the measurement signals based on a plurality of select lines received from the controller 502. The selected measurement signal can be communicated to the controller 502.

The measurement sensors 518 can be arranged in a variety of arrangements. For example, the measurement sensors 518 can be arranged in a line. As another example, the measurement sensors 518 can be arranged in a two-by-two arrangement, which can for example appear as a square, rectangle, diamond, or the like. As illustrated in FIG. 8, the measurement sensors 518 can be arranged in a four-by-four configuration or layout. However, it will be understood that the measurement sensors 518 can be arranged or positioned at various locations.

In some cases, it can be advantageous to position the excitation pads 516 or measurement sensors 518 such that a measurable potential difference exists between each of the measurement sensors 518 or the excitation pads 516. For example, in some cases, by providing a measurable difference between the measurement sensors 518, the system 500 can allow for a plurality of impedance measurements.

Any two or more measurement sensors 518 (or one or more measurement sensors 518 and one or more excitation pads 516) can create a measurement path 802. FIG. 8 illustrates various potential measurement paths 802. However, FIG. 8 should not be construed as limited. For example, there can be fewer, more, or different measurement paths, and a measurement path can exist between any two or more measurement sensors 518 or any measurement sensor 818 and excitation pads 516. The measurement sensors 518 or the excitation pads 516 can be arranged or skewed such that no measurement path 812 between any of the measurement sensors is perpendicular to a line 750 connecting the excitation pads 516, which can be referred to an excitation path 804. In some instances, this arrangement or skewing of the measurement sensors 518 can ensure that a measurable potential difference exists between each of the measurement sensors 518 or the excitation pads 516.

Example arrangements, configurations, and systems or apparatuses for determining impedance of tissue are described in International Patent Application No. PCT/EP2018/069886, filed Jul. 23, 2018, entitled "Skewing Pads For Impedance Measurement," the disclosure of which is hereby incorporated by reference in its entirety for all purposes.

Other Variations

In some cases, one or more electronic components can be positioned on the side of a substrate opposite the side that faces the wound. Systems and methods described herein are equally applicable to such wound contact layers. Although certain embodiments described herein relate to wound dressings, systems and methods disclosed herein are not limited to wound dressings or medical applications. Systems and methods disclosed herein are generally applicable to electronic devices in general, such as electronic devices that can be worn by or applied to a user.

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value. Moreover, although blocks of the various processes may be described in terms of determining whether a value meets or does not meet a particular threshold, the blocks can be similarly understood, for example, in terms of a value (i) being below or above a threshold or (ii) satisfying or not satisfying a threshold.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated or disclosed may differ from those shown in the figures. Depending on the embodiment, certain of the steps described above may be removed, others may be added. For example, the actual steps or order of steps taken in the disclosed processes may differ from those shown in the figure. Depending on the embodiment, certain of the steps described above may be removed, others may be added. For instance, the various components illustrated in the figures may be implemented as software or firmware on a processor, controller, ASIC, FPGA, or dedicated hardware. Hardware components, such as controllers, processors, ASICs, FPGAs, and the like, can include logic circuitry. Furthermore, the features and attributes of the specific embodiments disclosed above may be combined in different ways to form additional embodiments, all of which fall within the scope of the present disclosure.

Although the present disclosure includes certain embodiments, examples and applications, it will be understood by those skilled in the art that the present disclosure extends beyond the specifically disclosed embodiments to other alternative embodiments or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z.

Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A monitoring and/or therapy apparatus comprising:
a plurality of excitation pads configured to apply an excitation signal to tissue of a patient, the plurality of excitation pads connected to an electronic circuitry configured to communicate the excitation signal to the plurality of excitation pads, and the plurality of excitation pads configured to apply the excitation signal to the tissue via a plurality of capacitors and without having a direct conductive pathway to the tissue;
a plurality of measurement sensors arranged between the plurality of excitation pads to form a first region and a second region within the first region, each measurement sensor of the plurality of measurement sensors forming a measurement path with any other measurement sensor of the plurality of measurement sensors for measuring a voltage of the tissue in response to application of the excitation signal, and no measurement sensor of the plurality of measurement sensors is configured to apply the excitation signal; and
a controller configured to be in electrical communication with the plurality of excitation pads, the electronic circuitry, and the plurality of measurement sensors, the controller further configured to:
generate the excitation signal,
measure a current of the excitation signal after it has been communicated through at least a portion of the electronic circuitry and before the excitation signal is applied to the tissue via the plurality of excitation pads, and
determine impedance of the tissue based at least in part on the voltage measured by the plurality of measurement sensors and the current of the excitation signal measured after it has been communicated through at least the portion of the electronic circuitry and before the excitation signal is applied to the tissue.

2. The apparatus of claim 1, wherein the portion of the electronic circuitry comprises circuitry configured to condition the excitation signal by one or more of filtering or buffering the excitation signal.

3. The apparatus of claim 1, wherein the apparatus further comprises a selection circuitry connected to each of the plurality of measurement sensors, the selection circuitry configured to select a voltage measured between the plurality of measurement sensors.

4. The apparatus of claim 3, wherein the controller is further configured to receive the selected voltage from the selection circuitry and determine the impedance based at least in part on the selected voltage.

5. The apparatus of claim 3, wherein the controller is further configured to communicate one or more selection signals to the selection circuitry to select the measured voltage.

6. The apparatus of claim 5, wherein the selection circuitry selects the measurement sensor based at least in part on the one or more selection signals received from the controller.

7. The apparatus of claim 1, further comprising an excitation measurement circuitry connected to the controller and the electronic circuitry, wherein the excitation measurement circuitry is configured to measure the current of the excitation signal after it has been communicated through at least the portion of the electronic circuitry.

8. The apparatus of claim 1, wherein the plurality of excitation pads comprises two excitation pads, and wherein the plurality of measurement sensors comprises eight measurement sensors.

9. The apparatus of claim 1, wherein the excitation signal comprises a differential signal.

10. The apparatus of claim 1, wherein the plurality of excitation pads and the plurality of measurement sensors are positioned on a substrate configured to be placed in a wound of the patient.

11. The apparatus of claim 10, wherein the substrate is substantially flexible so as to conform to the wound.

12. The apparatus of claim 1, wherein the electronic circuitry is further configured to at least one of filter or buffer the excitation signal before it is applied to the tissue via the plurality of excitation pads.

13. The apparatus of claim 12, wherein the controller is further configured to measure the current of the excitation signal after the electronic circuitry at least one of filters or buffers the excitation signal.

14. The apparatus of claim 1, wherein the electronic circuitry is further configured to convert the excitation signal into a differential signal.

15. A method of operating a monitoring and/or therapy apparatus comprising a controller, the method comprising, by the controller:
generating an excitation signal and communicating the excitation signal to an electronic circuitry;
obtaining a first plurality of signals corresponding to a first measurement of the excitation signal, wherein the first measurement corresponds to the excitation signal after it has been communicated through at least a portion of the electronic circuitry and before it is applied to tissue of a patient via a plurality of excitation pads that apply the excitation signal to the tissue via a plurality of capacitors and not through a direct conductive pathway to the tissue;
with a plurality of measurement sensors arranged between the plurality of excitation pads to form a first region and a second region within the first region, each measurement sensor of the plurality of measurement sensors forming a measurement path with any other measurement sensor of the plurality of measurement sensors for measuring a second measurement of the tissue in response to application of the excitation signal, and no measurement sensor of the plurality of measurement sensors being configured to apply the excitation signal:
with the plurality of measurement paths, obtaining a second plurality of signals corresponding to the second measurement of the tissue after the excitation signal has been applied to the tissue of the patient; and determining impedance or conductance of the tissue based at least in part on the first plurality of signals and the second plurality of signals.

16. The method of claim 15, further comprising determining the second measurement based on demodulating the second plurality of signals.

17. The method of claim 16, wherein the demodulating comprises decomposing the second plurality of signals into an in-phase component and a quadrature component, and wherein the determining the second measurement comprises adding the in-phase component and the quadrature component.

18. The method of claim 15, wherein the excitation signal comprises a square wave with a frequency of 50 KHz or a sinusoidal wave with a frequency of 50 KHz.

19. The method of claim 15, wherein the plurality of excitation pads and the plurality of measurement sensors configured to obtain the second measurement are positioned on a substrate configured to be placed on the patient.

20. A monitoring and/or therapy apparatus comprising:
a plurality of excitation pads configured to apply an excitation signal to tissue of a patient, the plurality of excitation pads connected to an electronic circuitry configured to communicate the excitation signal to the plurality of excitation pads, and the plurality of excitation pads configured to apply the excitation signal to the tissue via a plurality of capacitors and without having a direct conductive pathway to the tissue, the plurality of excitation pads comprising first and second excitations pads that form an excitation path for applying the excitation signal;
a plurality of measurement sensors arranged between the plurality of excitation pads to form a first region and a second region within the first region, each measurement sensor of the plurality of measurement sensors forming a measurement path with any other measurement sensor of the plurality of measurement sensors for measuring a voltage of the tissue in response to application of the excitation signal; and
a controller configured to be in electrical communication with the plurality of excitation pads, the electronic circuitry, and the plurality of measurement sensors, the controller further configured to:
generate the excitation signal,
obtain measurement of a current of the excitation signal after it has been communicated through at least a portion of the electronic circuitry and before the excitation signal is applied to the tissue via the plurality of excitation pads, and
determine impedance of the tissue based at least in part on the voltage measured by the plurality of measurement sensors and the current of the excitation signal,
wherein each measurement path overlaps with the excitation path at most once.

21. The monitoring and/or therapy apparatus of claim 20, further comprising:
an excitation measurement circuitry connected to the controller and the electronic circuitry and configured to measure the current of the excitation signal after it has been communicated through at least the portion of the electronic circuitry and communicate the current of the excitation signal to the controller,
the excitation measurement circuitry comprising a plurality of amplifiers configured to buffer a positive portion and a negative portion of the current of the excitation signal after it has been communicated through at least the portion of the electronic circuitry.

* * * * *

UNITED STATES PATENT AND TRADEMARK OFFICE
CERTIFICATE OF CORRECTION

| | | |
|---|---|---|
| PATENT NO. | : 12,478,279 B2 | Page 1 of 1 |
| APPLICATION NO. | : 17/440663 | |
| DATED | : November 25, 2025 | |
| INVENTOR(S) | : David Michael Bray et al. | |

It is certified that error appears in the above-identified patent and that said Letters Patent is hereby corrected as shown below:

On the Title Page

On Page 4, Column 1, Line 9, under item (56) U.S. Patent Documents, delete "Vigano'et al." and insert --Vigano' et al.--.

In the Claims

In Column 48, Claim 7, Line 18 (Approx.), delete "measurement circuit ry connected" and insert --measurement circuitry connected--.

In Column 49, Claim 18, Line 21 (Approx.), delete "of 50 KHz or" and insert --of 50 kHz or--.

In Column 49, Claim 18, Line 22 (Approx.), delete "of 50 KHz." and insert --of 50 kHz.--.

In Column 49, Claim 20, Line 30, delete "electronic circuit ry configured" and insert --electronic circuitry configured--.

Signed and Sealed this
Thirteenth Day of January, 2026

John A. Squires
*Director of the United States Patent and Trademark Office*